United States Patent [19]

Grabowski et al.

[11] Patent Number: 4,468,809
[45] Date of Patent: Aug. 28, 1984

[54] MULTIPLE FONT OCR READER

[75] Inventors: John S. Grabowski, Kitchener; Aaron C. Y. Tong, Waterloo, both of Canada

[73] Assignee: NCR Corporation, Dayton, Ohio

[21] Appl. No.: 333,963

[22] Filed: Dec. 23, 1981

[51] Int. Cl.³ .............................................. G06K 9/80
[52] U.S. Cl. ........................................ 382/50; 382/34; 382/48
[58] Field of Search ..................... 382/27, 33, 34, 48, 382/50-54

[56] References Cited

U.S. PATENT DOCUMENTS

| | | | |
|---|---|---|---|
| 3,104,372 | 9/1963 | Rabinow et al. | 382/50 |
| 3,234,513 | 2/1966 | Brust | 382/50 |
| 3,644,890 | 2/1972 | Matthews | 382/50 |
| 3,676,847 | 7/1972 | Partin | 382/50 |
| 3,688,266 | 8/1972 | Watanabe et al. | 382/50 |
| 3,717,848 | 2/1973 | Irvin et al. | 340/146.3 Q |
| 3,737,855 | 6/1973 | Cutaia | 382/50 |
| 3,973,239 | 8/1976 | Kakumoto et al. | 340/146.3 AG |
| 3,992,697 | 11/1976 | Knab et al. | 340/146.3 MA |
| 4,185,271 | 1/1980 | Izawa et al. | 340/146.3 AG |
| 4,298,859 | 11/1981 | Romanski | 340/146.3 MA |

FOREIGN PATENT DOCUMENTS

| | | | |
|---|---|---|---|
| 941505 | 2/1974 | Canada | 354/59 |
| 943251 | 3/1974 | Canada | 354/59 |

OTHER PUBLICATIONS

Yamada et al., "Recognition of Index Numerals in a Traffic Register Meter", Review of the Electrical Communication's Laboratories, vol. 23, Nos. 11-12, Tokyo, Japan, pp. 1215-1223, Nov.-Dec. 1975.
Hall et al., "Analog Thresholding Scheme for Medium Resolution Scanners", IBM Tech. Discl. Bul., vol. 14, No. 6, Nov. 1971.
Intern. Pub. No. WO81/00319, Intern. Application No. PCT/US80/00750, Inventors Todd et al., Published Feb. 5, 1981.

*Primary Examiner*—Leo H. Boudreau
*Attorney, Agent, or Firm*—J. T. Cavender; Casimer K. Salys

[57] ABSTRACT

A multiple font optical character recognition reader system for capturing character patterns by pixel, quantizing and sequencing the data representing multiple pixels, enhancing the character patterns represented by the data, locating characters within the enhanced data, and recognizing the characters. Data representing individual pixels is quantized into white, gray and black levels. During enhancement, gray pixel data is selectively changed to black or white while some black is changed to white, both operations depending on the white, gray or black levels in adjacent pixels. The enhanced data is scanned for a multiplicity of simultaneous conditions which define when a matrix of the data includes a character pattern which is optimally positioned within the matrix. The data matrix containing the character pattern is then sequentially compared to sets of data individually representing templates of potential characters. When optimal matching and threshold conditions are satisfied, a character is classified as recognized.

7 Claims, 67 Drawing Figures

FIG.11
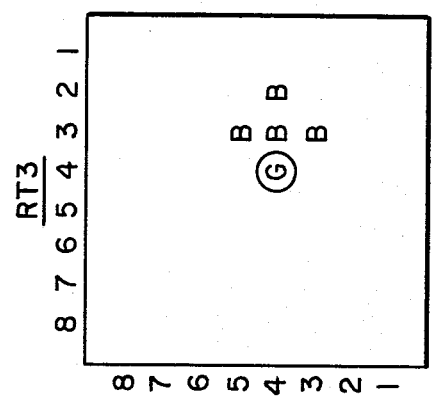
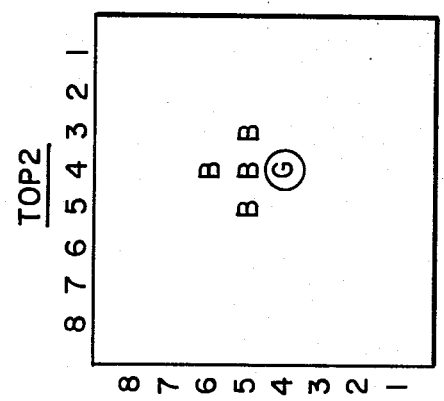
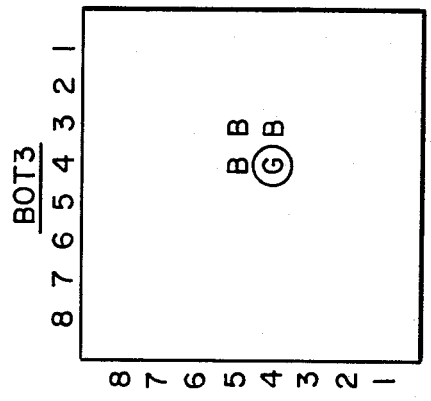
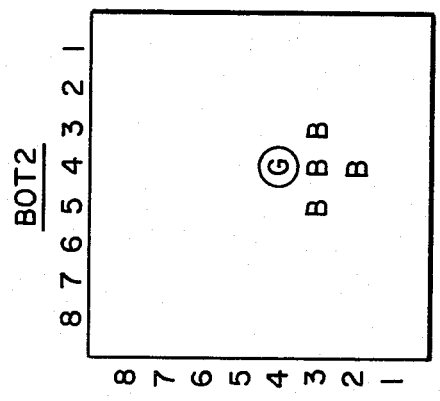
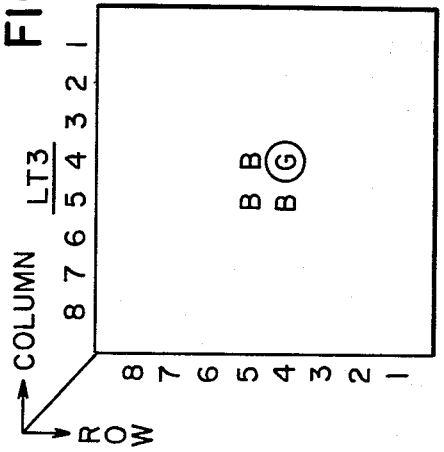
BLANK - DON'T CARE   B - BLACK BIT   G - GRAY BIT   Ⓖ - ENHANCED GRAY BIT (REMOVED)

FIG. 12
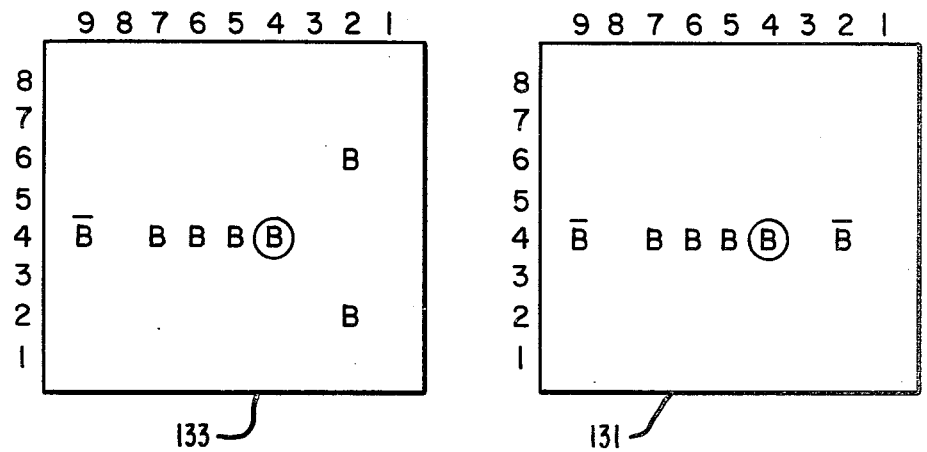
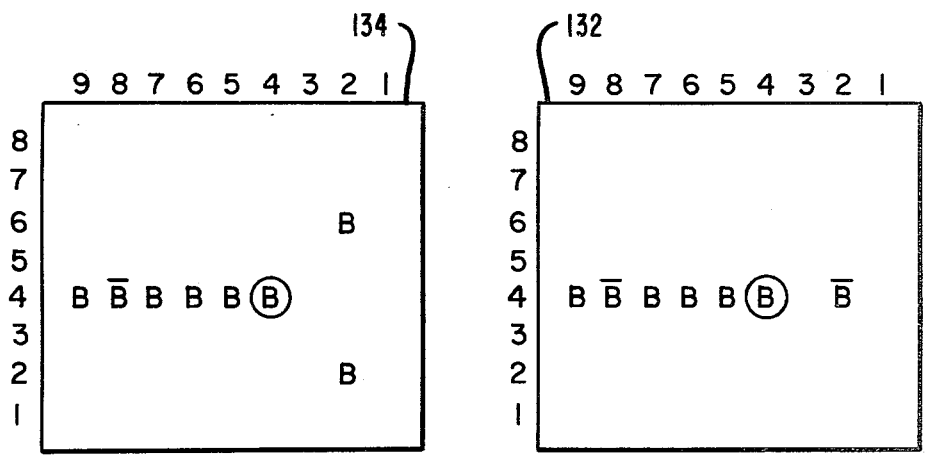
BLANK — DON'T CARE
B — BLACK BIT
B̄ — WHITE OR GRAY BIT
Ⓑ — BLACK BIT REMOVED

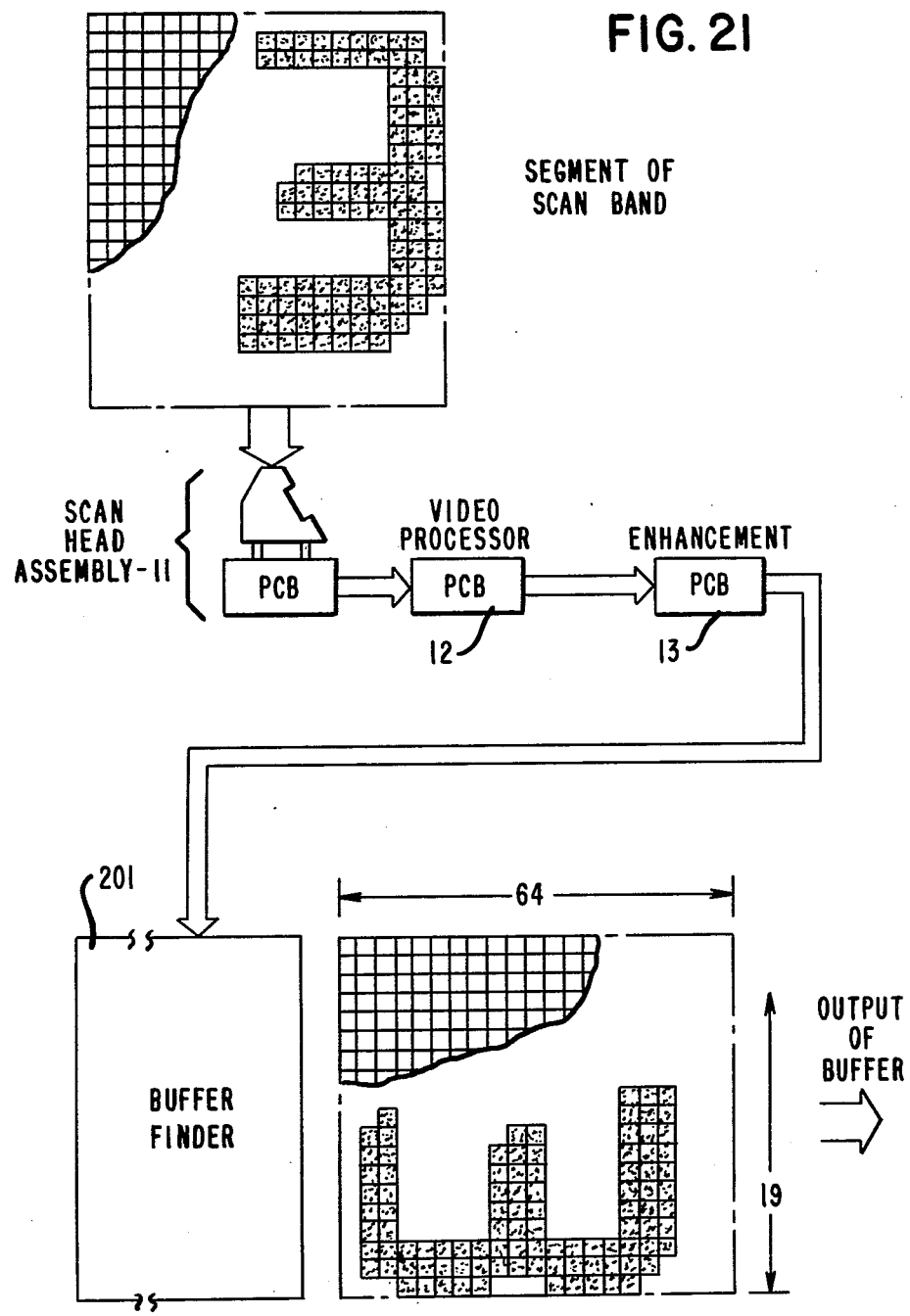

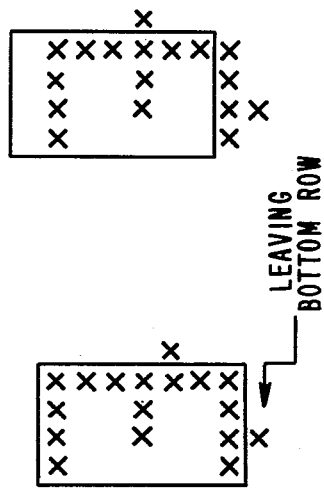
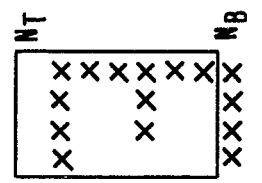
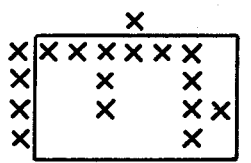
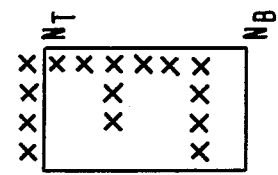
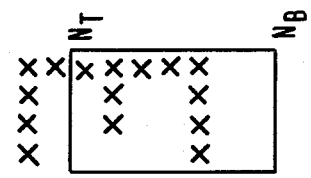
FIG.25
FIG.27

BOT BOUND
NOT SATISFIED

BOT BOUND
SATISFIED

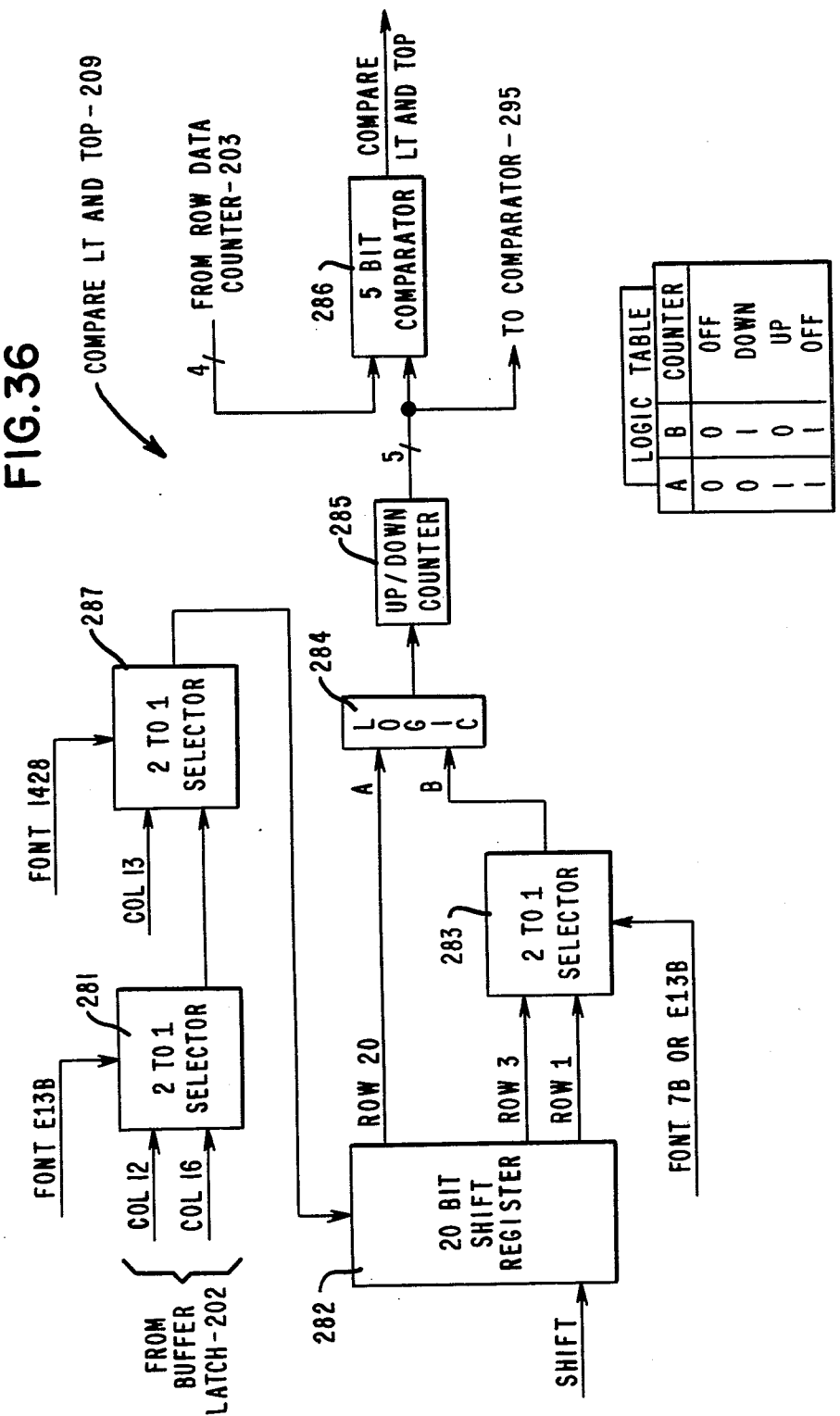

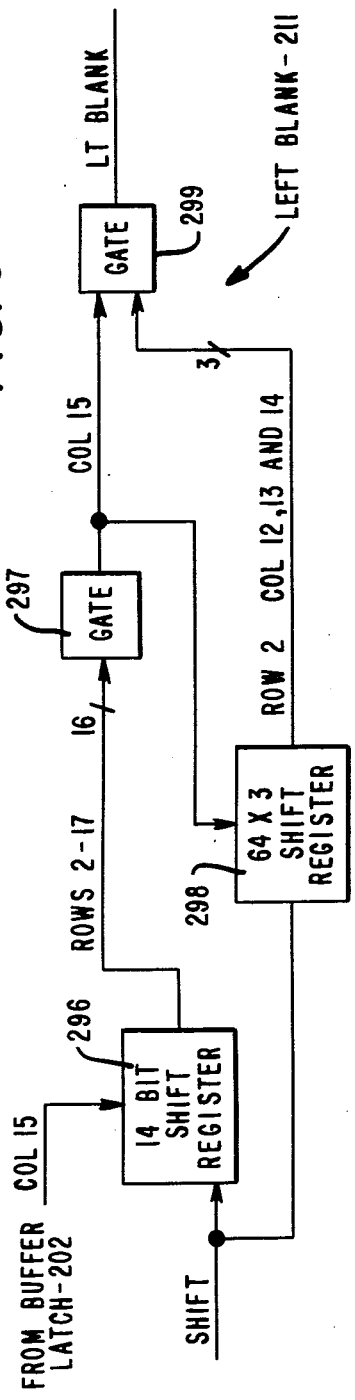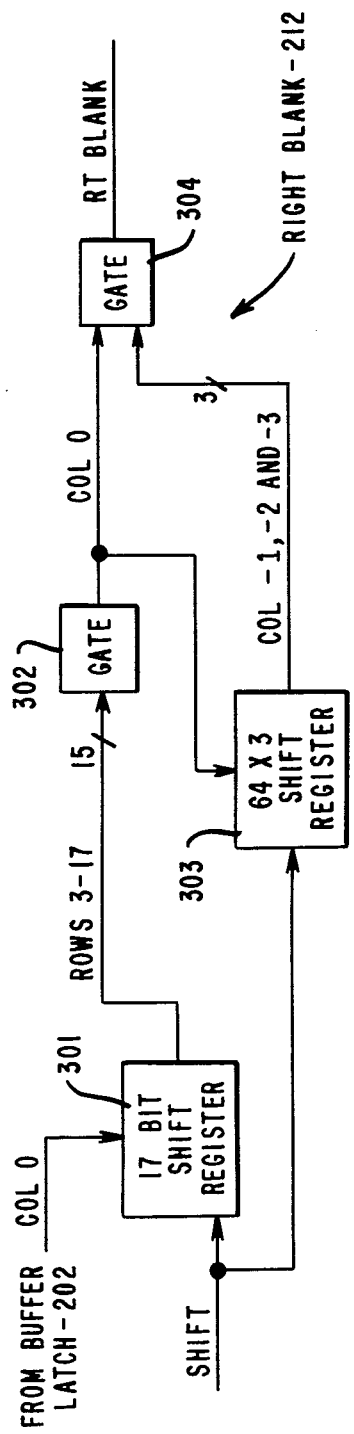

FIG. 48
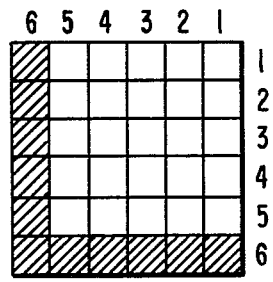
SHIFT 1
(TOP RIGHT)
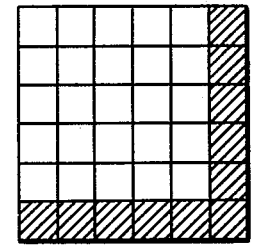
SHIFT 2
(TOP LEFT)
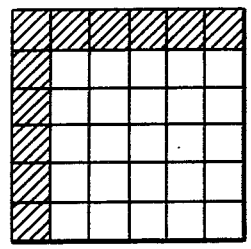
SHIFT 3
(BOTTOM RIGHT)
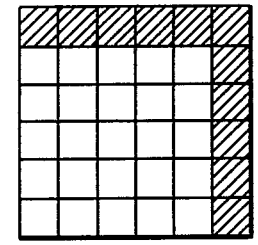
SHIFT 4
(BOTTOM LEFT)
▨ DON'T CARE AREAS

RECOGNITION TIMING-357
(PART 1)

MULTIPLE FONT OCR READER

CROSS-REFERENCE TO RELATED APPLICATIONS

This application is related to copending U.S. patent application Ser. No. 254,838, filed Apr. 16, 1981, on behalf of inventors John Grabowski and ChinChih Shiau, and assigned to the assignee of the present application. Accordingly, the subject matter of the copending application is incorporated herein by reference.

BACKGROUND OF THE INVENTION

The present invention generally relates to optical character recognition systems and more particularly to those systems which are utilized to automatically read symbols or alpha-numeric type characters which have been printed, embossed or otherwise formed on documents such as coupons, checks or invoices. The present system includes features which enhance the effective optical contrast of the patterns representing the characters, locate the characters within a prescribed window, and recognize the characters found, notwithstanding the presence of various extraneous marks.

In recent years there has been a significant trend toward automated data capture from documents by using optical character recognition (OCR) techniques. Such systems generally detect characters by sensing patterned contrasts in document reflectivity and electrically process those detected patterns to determine the characters. Unfortunately, the originators of the diverse documents from which data is to be captured have not only developed a multiplicity of different fonts to represent their data, but also allow significant latitude in the shapes, relative locations and angular orientations of such characters in a sequence. Even further variations occur when the characters are generated by different means. For instance, those generated by typewriters will differ significantly from those that are printed or embossed, notwithstanding the fact that they utilize the same font. The optical data capture function is further complicated by the diverse reflective characteristics encountered, not only from the document material but also from the materials used to form the characters. For example, inks of different colors, textures and amounts produce a significantly different optical reflection even when they appear on the same document material and are formed in the same style of font. Scenic backgrounds, fold lines in the documents, and differences in the reflective characteristics and paper quality of the document materials are further sources of extraneous signals during the location, capture, and recognition of character patterns and the data they represent.

In addition to the exemplary error sources described above, one cannot overlook the intentional or unintentional insertions of extraneous marks into that clear band established for the alpha-numeric characters. A typical example of such marks include signatures, banker stamps and carbon smudges. Consequently, the recognition technique must not only extract characters from an optically noisy background, but must, thereafter, perform reasonable evaluation of the characters to ascertain whether they are suitably represented to obtain an accurate determination of the actual data.

As the rate of processing documents increases, the costs attributable to both detected and undetected errors rise even more rapidly. Therefore, a commercially viable system must be capable of processing documents at a relatively high rate while maintaining exceptionally small rates of error in the data captured.

SUMMARY OF THE INVENTION

The invention described hereinafter pertains to an OCR reader system suitably configured to capture data presented in a variety of fonts on documents which are optically cluttered with a broad range of backgrounds and extraneous optical patterns. This is generally accomplished by enhancing the video patterns extracted during an optical scan of the field within which the characters are to lie, locating the data representing characters, and performing a sequence of template comparisons to match the data patterns of the characters to the corresponding font patterns retained in the system's memory. The latter described recognition process includes a composite of tests which must be satisfied for a character to be selected.

The complete system includes a mechanical document transport assembly and an optical scan head assembly, in addition to the functional groups noted above. The transport moves individual documents through a plane illuminated by a light source mounted in the scan head assembly. An electrically scanned photodiode array, physically oriented perpendicular to the direction the document translates, detects the level of reflected light at prescribed increments of the document's scan band to secure images of character patterns. Each pattern consists of multiple discrete pixels. After appropriate amplification, a video processor board converts the data at each measured pixel into three discrete levels, white, gray and black.

The level data for the pixels is then grouped by matrices of pixels for enhancement. The center pixel in each grouping is adjusted to selectively eliminate gray and black level pixels when the matrices exhibit prescribed patterns. During enhancement, gray pixels are converted to either white or black pixels while black pixels are either retained or converted to white. The cumulative effect of such an enhancement process is to thicken thin character segments and thin thick character segments.

The enhanced pixel data, in binary format of black or white, is then synchronously transferred to a finder board. The function of the finder board is to precisely locate each character within the field of enhanced data so that the recognition process templates can be more accurately positioned. Conceptually, the character finding technique involves an optimal positioning of the character within a window before initiating character recognition. Generally, it consists of analyzing the binary pixel data while the data is in a multi-column shift register. A matrix of data analogous to a window, correspondingly selected to the font, is moved through the data to locate a position completely enclosing a character. The position is established using logic which generally maximizes the number of data bits representing black pixels within the window. Concurrently, the data within the window is analyzed to verify the presence of white pixels along the window boundary. Only after these and various other conditions are satisfied is there an attempt to recognize the character within the window.

The character recognition board performs the template analysis and logic functions by which a matrix of binary data, corresponding to the optically perceived characters, is sequentially compared to the matrix templates, corresponding to the selected font. The templates are stored in an electronic memory using two binary bits per pixel to represent either black, white or don't care states. To some degree, the functions performed by the recognition board are described in the above-cited copending application.

The character recognition board compares each pixel for mismatches between the data in the templates and the optically captured data in the shift register. The comparison is repeated for each of four positions slightly shifted with respect to each other to determine the best match of characters. Before a match between the template and the pattern is declared, the number of matches are compared to satisfy both a threshold and difference standard. If all the conditions are satisfied, a binary code corresponding to the best matched template is sent to buffered storage.

These and the numerous other novel features of the invention will become more apparent upon considering the embodiment described and shown hereinafter.

DESCRIPTION OF THE DRAWINGS

FIGS. 10 and 11 schematically depict the gray enhancement patterns.

FIG. 12 schematically depicts the black elimination patterns.

FIG. 21 schematically depicts a character pattern undergoing column to row conversion.

FIG. 25 schematically depicts the operation of the WINDOW COUNTER and BLK MIN.

FIG. 26 is a schematic block diagram of the WINDOW COUNTER and BLK MIN.

FIG. 27 schematically depicts the operation of the ADD/.

FIG. 36 is a schematic block diagram of the COMPARE LT and TOP.

FIG. 39 is a schematic block diagram of the LEFT BLANK.

FIG. 40 is a schematic block diagram of the RIGHT BLANK.

FIG. 48 schematically depicts the shifting operation of the Recognition board.

DETAILED DESCRIPTION

The OCR Reader System embodying the features of the present invention is comprised of a number of boards which functionally group the various operations. Some of the operations are partially known in the art, while others are described in the previously noted copending patent application. The individual and combined features which constitute the unique and novel contributions disclosed and claimed herein will be distinguished. Generally stated, the prior art comprises the transport assembly, the scan head assembly, and substantial segments of the Video Processor board. The above noted copending application relates to some of the functions performed by the Recognition board. Consequently, the features of the present invention are derived from functions performed by the Enhancement board, the Finder board, segments of the Recognition board, and the composite of the boards as a functional group.

The embodying OCR Reader System also incorporates a variety of features which have only secondary relationship to the invention itself. However, they are included to illustrate the overall flexibility of a system which employs the present invention. A first example is the variety of fonts which can be optically captured and processed with the same system. This includes not only the conventional OCRA, OCRB, 1403, 1428, FARRINGTON 7B (7B), and E13B fonts, but also special customer configured fonts or symbols. Another example includes the remittance processing (RPS) mode, during which the first symbol in the character field automatically selects the font of the succeeding characters. These and other aspects of the invention features will be developed in greater detail hereinafter.

Figure 1:
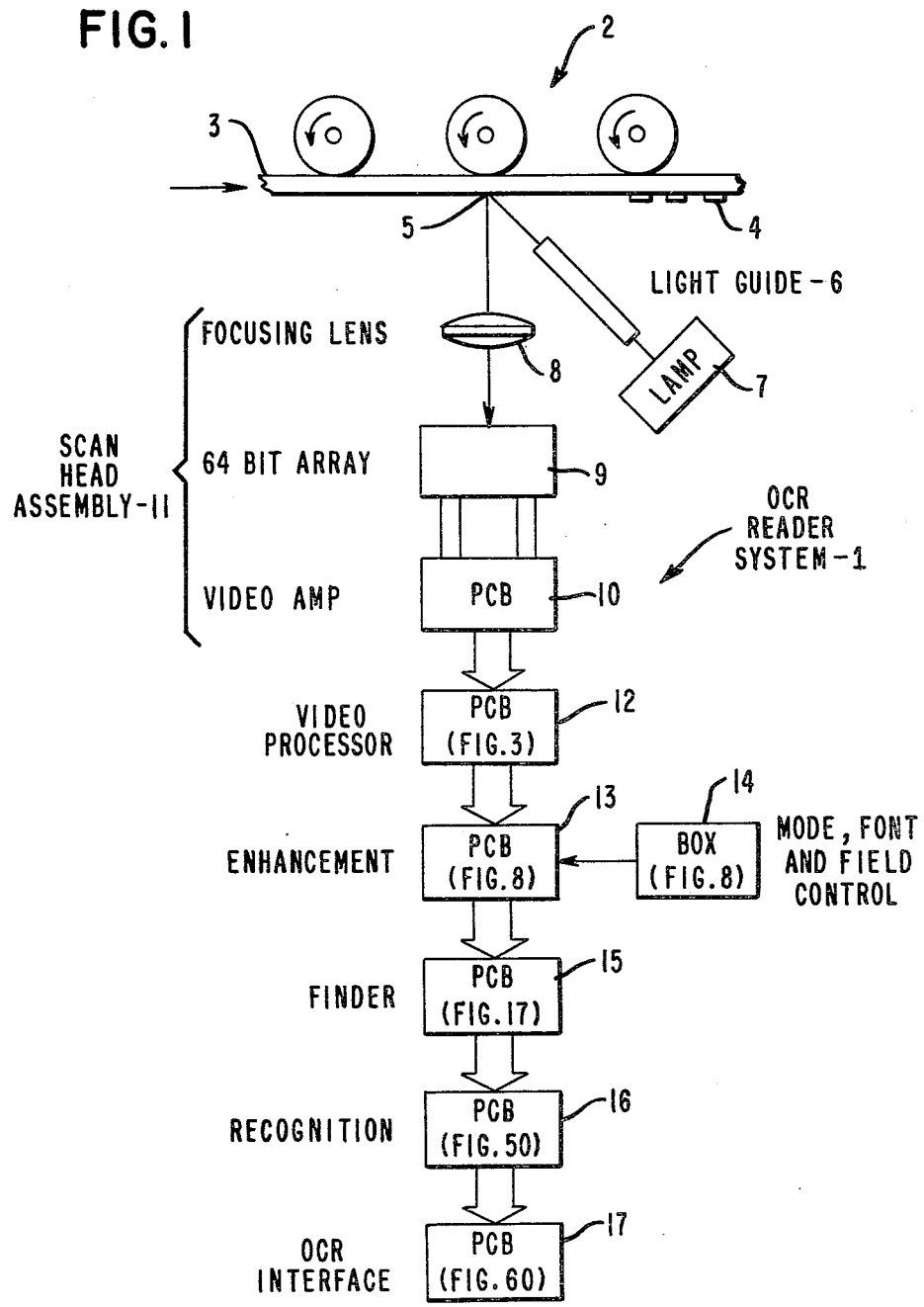
FIG. 1 is a schematic block diagram of the complete OCR Reader System.

Attention is now directed to the schematic block diagram in FIG. 1 of the drawings. FIG. 1 generally illustrates the functional groups which comprise the overall OCR Reader System, designated 1, from both their structural and functional perspectives. In general, the transport moves documents across the face of the scan head. Character patterns on the documents are optically detected and processed to generate video signals, which are then amplified and quantized into binary format. The signals are grouped into matrices for enhancement, character location, and character recognition. Binary coded data representing recognized characters is then conveyed to an interface for further transmission to associated data processing equipment. The mode, font and field controls allow the operator to match the system to the document characteristics. In keeping with the embodiment, the various functions are grouped by printed circuit boards (PCBs).

The document transport assembly used in the embodiment described hereinafter is of a form generally known by those practicing in the art. Similar transport structures have been sold by the NCR Corporation as a Model NCR 7750 DDPS Workstation. Briefly, document transport assembly 2 automatically feeds individual documents 3 to six drive rollers which move the documents past Scan Head Assembly 11 and viewing window to the document encoder and sorter apparatus. The speed of the transport is regulated to move the documents across the reading face of the Scan Head Assembly at a regulated speed of 265 cm per second. The transport is also configured to position the documents in such a way that skewing and depth of field variations are substantially eliminated.

The present Scan Head Assembly is generally known within the art. Accordingly, its structural and functional description will also be abbreviated. As appears in the schematic of FIG. 1, the illuminating section of the Scan Head Assembly 11 includes tungsten-halogen lamp 7 and light guide 6, the latter serving to direct light onto the surface of document 3 in area 5. Images of character patterns 4 are focused by lens 8 onto 64 element linear photodiode array 9. The array is commercially available from E. G & G. Reticon, designated as a model RL-64A Solid State Line Scanner. With this Scan Head Assembly, array 9 covers a total scan band of approximately 11 mm (0.4 in) in 64 segments of approximately 0.16 mm (0.00625 in) each.

Photodiode array 9 is clocked by a two phase signal from Video Processor board 12 at a nominal rate of 1.1 MHz for scanning the photodiodes from bottom to top. The output from the array 9 is a serial group of analog signals related in exact sequence to the respective photodiode positions. Considering the relatively high frequency at which the photodiodes are scanned, each train of photodiode output signals represents a substantially unskewed slice of the scan band. Furthermore, since the scan sequence is restarted approximately two microseconds after the preceding scan is terminated, the 0.16 mm columns lie substantially adjacent to each other along the length of the scan band.

The amplitude of each pulse from each photodiode is substantially proportional to the arithmetic product of the light falling on the corresponding photodiode and the time the photodiode is exposed to the light. The proportionalities are retained when the pulses are converted to video signals in video amplifier board 10. Therefore, the series of analog voltage pulses leaving video amplifier board 10 contains information in terms of both position and reflective amplitude.

The embodying Scan Head Assembly, 11, is housed in an elevator mechanism (not shown) which is manually adjustable in the direction perpendicular to the travel of the document.

VIDEO PROCESSOR BOARD

The distinctive features of the present invention are first evidenced in the structural and functional organization of Video Processor board 12 in FIG. 1. The Video Processor board generally converts the analog signals received from video amplifier 10 into quantized digital signals representing photodiode responses at each location. Each pixel is classified as being black, gray or white. Conversion to digital format is performed by quantizing the video signal voltage pulses into three bands (black, gray or white) defined by two voltage threshold levels. As embodied, the Video Processor board also serves to sense the presence of documents on the transport, supplies the start pulses to the scanner circuit in the photodiode array, and generates the two-phase clock signals for the array. The distinctive features, and their contribution to the complete system, will be described individually hereinafter.

Figure 2:
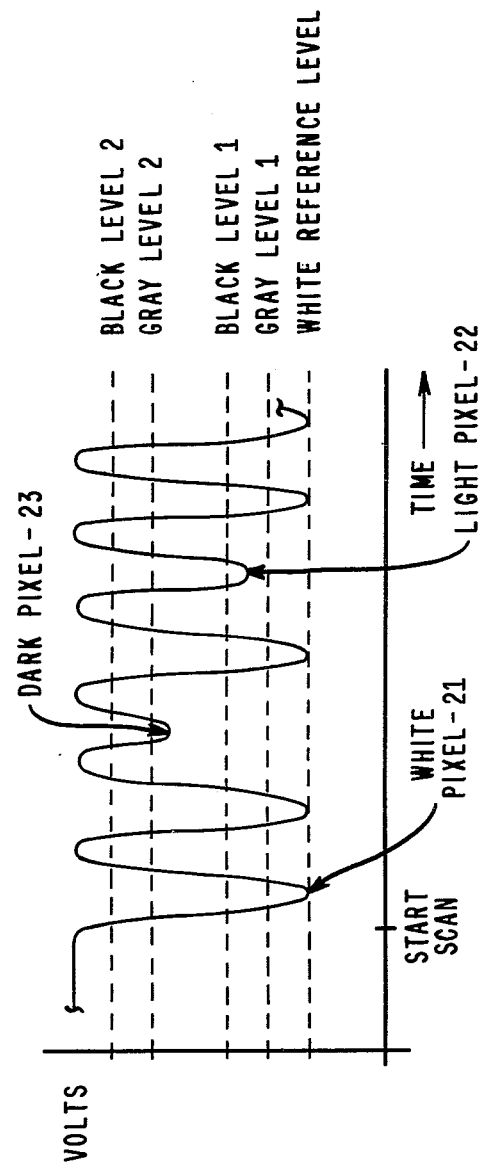
FIG. 2 schematically depicts an analog signal and the quantization levels for gray and black signals.

To understand the quantization performed by Video Processor board 12, reference should be made to FIG. 2 of the drawings. This figure schematically depicts a representative sequence of analog video signals and illustrative threshold levels suitable to quantize the video signal. Each downward excursion of the video signal after the start of the scan represents the magnitude of reflected light at a photodiode. Exemplary threshold levels are superimposed on the video signal plot in FIG. 2. For subsequent processing, the black and gray levels are selected in pairs, for instance, gray/black 1, on the basis of the document characteristics.

Another function performed by the Video Processor board is the detection of documents entering and leaving the scan head area. The present embodiment employs a light emitting diode-phototransistor (LED-PT) pair as a document present sensor. The LED-PT is physically mounted on the transport track at a position approximately 12 millimeters before the data capture position adjacent the Scan Head Assembly. As configured, the document present sensor detects the leading and trailing edges of each document.

The leading edge of the document generates the document present signal (DOCUMENT PRESENT) used to commence the scanning process. The timing of the DOCUMENT PRESENT signal is offset by approximately 5 milliseconds to compensate for the physical displacement of 12 millimeters separating the sensor location and the Scan Head Assembly. The time delay is an adjustable parameter, allowing the elimination of extraneous, noise-type data attributable to smudges which are frequently present along the edges of documents. In comparison, prevailing reader systems generate document present type signals from the video signal itself. Such systems are susceptible to smudges on the documents, which are often erroneously interpreted as the end of the document.

The system signal indicating the document's trailing edge is delayed by a period of approximately 5 milliseconds. As was true for the leading edge, adjustability in the time allows the exclusion of noise signals attributable to extraneous marks at the trailing edge of the document.

The document present function on Video Processor board 12 also includes circuitry to avoid premature initiation of logic commands corresponding to the document's trailing edge occasioned by holes in the document. A typical example is the punch coded computer card. To accomplish this, the trailing signal is not transmitted unless the document present sensor signal remains in effect for a period of time greater than that necessary to traverse a computer card hole.

The Video Processor board includes a master clock for synchronizing the various functions performed by the OCR Reader System. The clock signals are generated from a 10 MHz oscillator, which is divided down in frequency to both 1.111 MHz and 0.714 MHz. The lower frequency is used with 7B font, while the higher frequency is used for all other fonts and functions in the system. The reduced frequency compresses the size of the 7B characters to the effective size of the other OCR characters. The distinction will be developed in greater detail at a later point.

Given that the general operations performed by the video processor board are at hand, attention will now focus on the functional blocks comprising the Video Processor board and the contribution of each block to the overall operation. For this purpose, initial reference is made to FIG. 3 where the blocks have been arranged by functional groups. Note the input and output signals coupling the various functional blocks, as well as the numerical correspondence between the functional blocks illustrated here and their individual developments in the later figures by way of relatively conventional blocks representing actual electronic devices. Each functional block on Video Processor board 12 will be described individually using the schematics in FIGS. 4, 5, 6 and 7. Periodic reference back to FIG. 3 may aid one in understanding the way the various blocks are combined on the Video Processor board.

Figure 4:
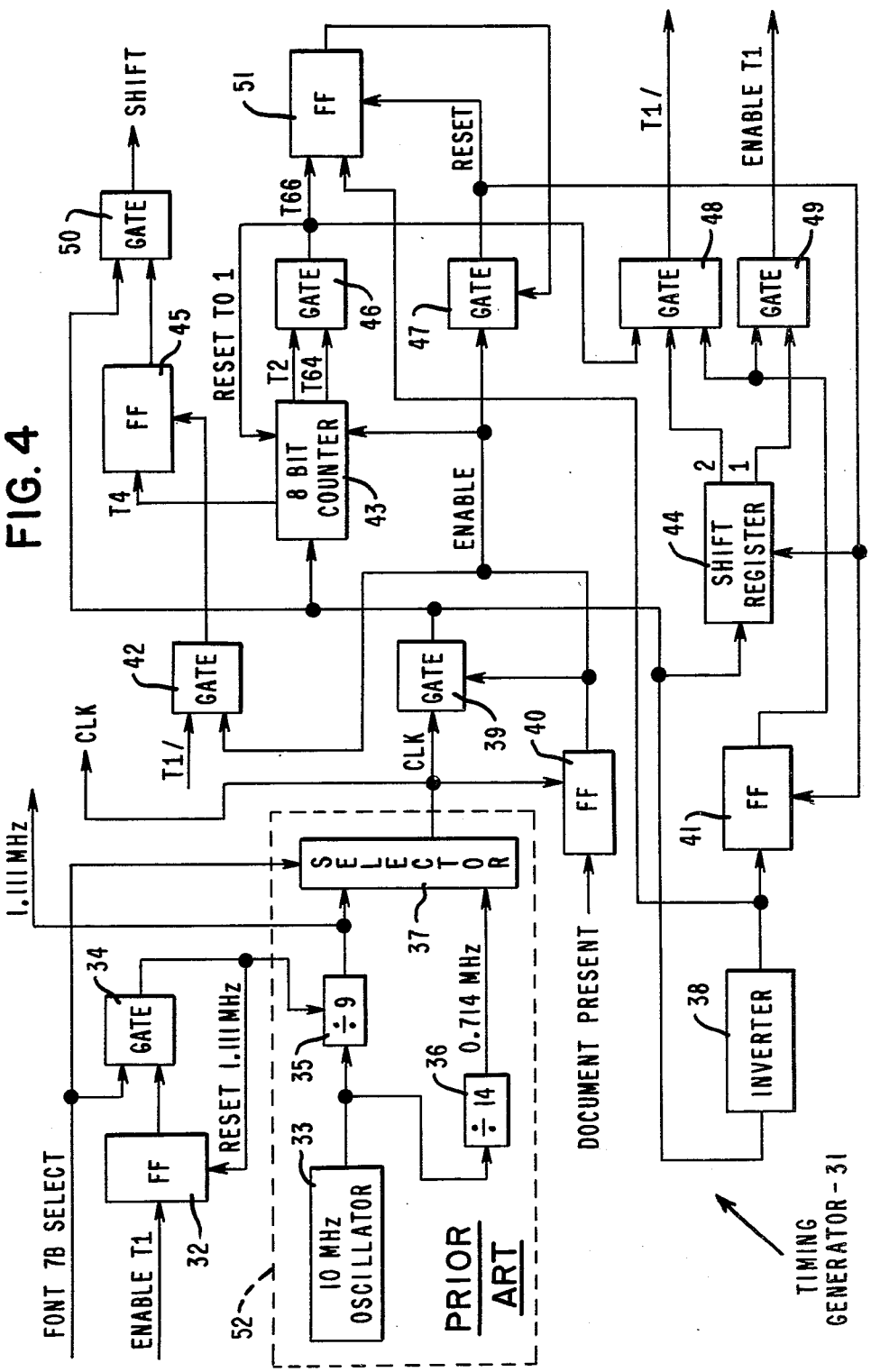
FIG. 4 is a schematic block diagram of the Timing Generator block for the Video Processor board.

Begin the analysis of the embodying Video Processor board by considering the organization of Timing Generator 31, as it is shown in FIG. 4 of the drawings. At the left side of FIG. 4 there appears a 10 MHz master oscillator 33, followed by frequency dividers 35 and 36 to reduce the clock rate to the 1.111 MHz and 0.714 MHz frequencies used in the system. Selector 37 passes the 0.714 MHz clock only when 7B font is prescribed. Otherwise, the frequency of clock signal CLK is maintained at 1.111 MHz. The elements within dashed perimeter line 52 constitute prior art.

Figure 3:
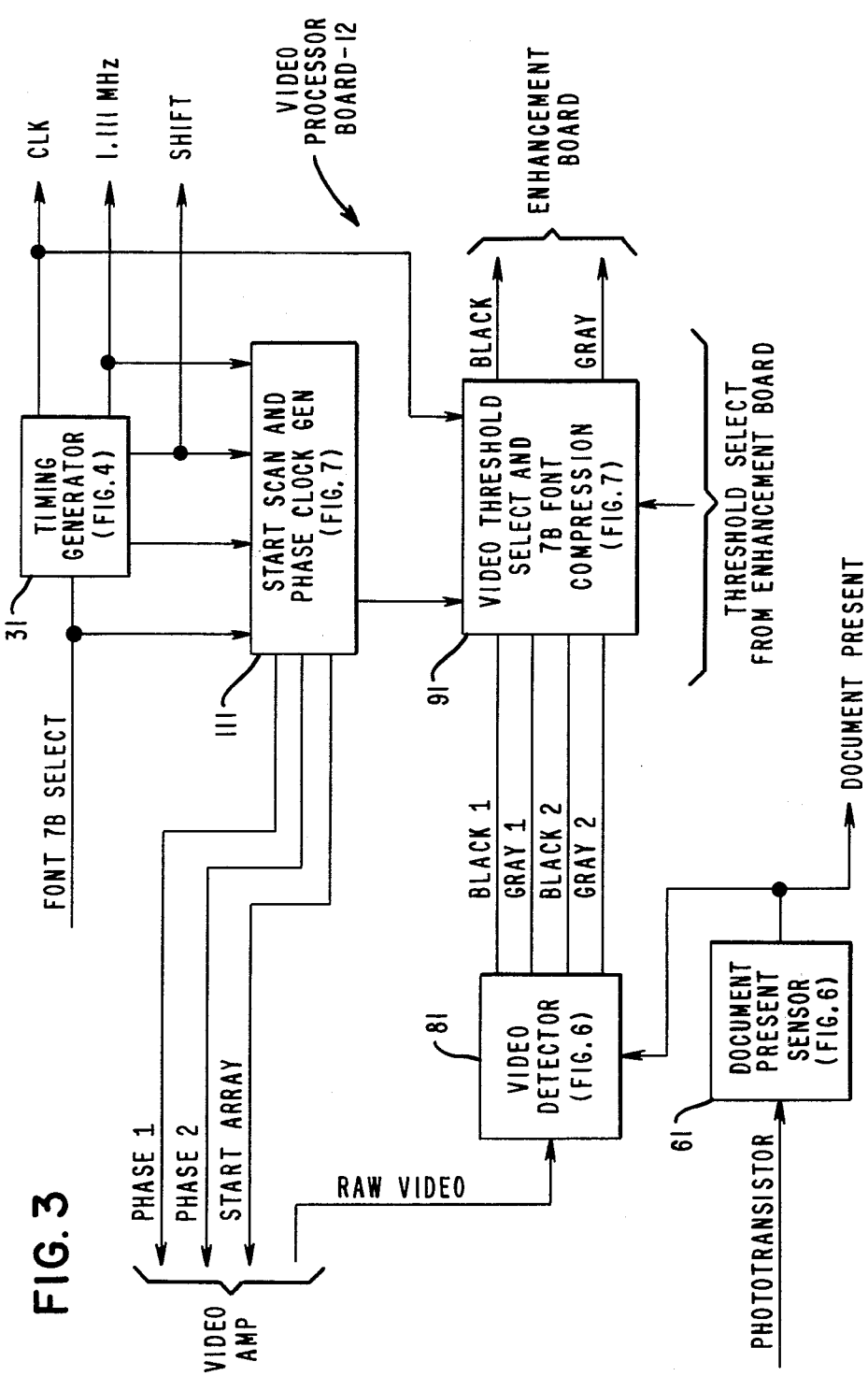
FIG. 3 is a composite schematic block diagram of the Video Processor board.

FIGS. 3 and 4 both show that there are two output clock rates from Video Processor board 12, a selectable rate designated CLK and a fixed rate of 1.111 MHz. For purposes of the present embodiment, substantially all the data processing on Finder board 15 (FIG. 1) is performed at the 1.111 MHz frequency. The video processor board is configured to operate at either of the frequencies, depending on the font selected. It should also be noted that the CLK signal is used to derive a SHIFT signal, also selectable between 1.111 and 0.714 MHz, which serves as the master clock signal for the overall OCR Reader System.

For 7B font, the reset circuit appearing in FIG. 4 immediately above the oscillator and frequency dividers noted previously, namely a combination of flip-flop (FF) 32 and gate 34, generates a reset pulse. The pulse resets frequency divider 35 with the onset of each new scan of the photodiode array. This distinct reset pulse is required because frequency divider 35 is not a direct multiple of frequency divider 36, yet data must move throughout the system in synchronism between the various boards comprising the OCR Reader System.

Figure 5:
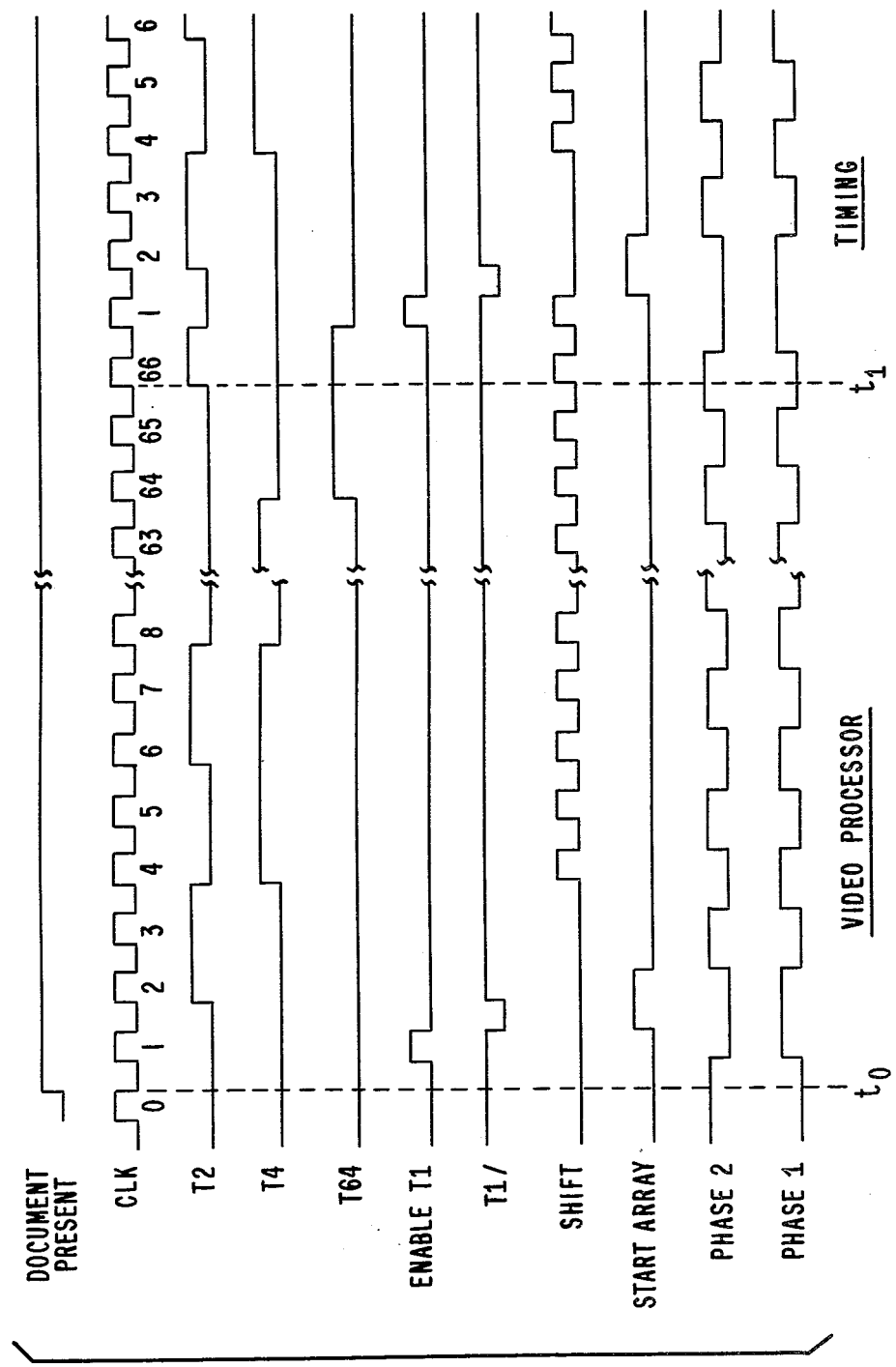
FIG. 5 schematically represents a sequence of signals from the Video Processor Timing Generator.

A schematic timing diagram appears in FIG. 5 to illustrate the operation of Timing Generator 31. The combination of the schematics in FIGS. 4 and 7, together with the timing diagram in FIG. 5 and the operational sequence presented in Table I, will completely describe the operation of Timing Generator 31.

TABLE I

| VIDEO PROCESSOR TIMING SEQUENCE | | |
|---|---|---|
| Clock (CLK) Position | Block Affected | Block Response |
| (start of sequence) | Gate 39 | Passes CLK signals when DOCUMENT PRESENT signal from FF 40 |
| 66 leading | 8 bit counter 43 Gate 46 | Shifts to 66 count drives T66 to 1 |

TABLE I-continued
VIDEO PROCESSOR TIMING SEQUENCE

| Clock (CLK) Position | Block Affected | Block Response |
|---|---|---|
| edge | | state |
| | FF 51 | Prepares for change with trailing edge of 66 CLK |
| | Gate 50 | Passes CLK signals to SHIFT (master clock for system) |
| 66 trailing edge | FF 51 | Switches |
| | Gate 47 | Passes signal to reset FF 51 |
| | FF 41 | Resets |
| | Shift Register 44 | Resets |
| 1 leading edge | 8 bit counter 43 | Resets to 1 count from T66 feedback signal |
| | Gate 46 | Drives T66 to 0 state |
| | Shift register 44 | Generates signal at output 1 |
| | Gate 49 | Drives ENABLE T1 to 1 state |
| | FF 32 | Switches (7B only) |
| | Gate 34 | Resets 1.111 MHz clock if font 7B is selected |
| | FF 112 (FIG. 7) | Switches PHASE 1 and 2 to initialization states on trailing edge of T1/ |
| | FF 113 (FIG. 7) | Prepares for change with trailing edge of T1/ |
| 1 trailing edge | FF 41 | Switches on inverted CLK from INV 38 |
| | Gate 49 | Drives ENABLE T1 to 0 state |
| | Gate 48 | Drives T1/ to 0 state |
| | Gate 42 | Resets FF 45 |
| | FF 45 | Switches |
| | Gate 50 | Disabled to prevent SHIFT signals |
| | FF 113 (FIG. 7) | Switches START ARRAY to 1 state |
| | FF 112 (FIG. 7) | T1/ inhibits clocking by 1.111 MHz/ |
| 2 leading edge | Shift register 44 | Generates signal at output 2, signal at output 1 ceases |
| | Gate 48 | Drives T1/ to 1 state |
| 2 trailing edge | FF 112 (FIG. 7) | Switches PHASE 2 to 1 state from 1.111 MHz/ clock |
| | FF 113 (FIG. 7) | Switches START ARRAY to 0 state using PHASE 1 to reset |
| 4 leading edge | 8 bit counter 43 | Drives T4 to 1 state |
| | FF 45 | Switches |
| | Gate 50 | Passes CLK signals to SHIFT |

Recognizing the complexity of the Video Processor timing, special attention will be directed to noteworthy aspects. Begin with the timing diagram in FIG. 5. The signals in the figure represent the timing operations for a mode other than font 7B. Note that the waveforms are labeled at the left edge with reference symbols corresponding to those used in the Table and other figures. The presence of a slash (/) following a symbol represents the inverse of that symbol. Furthermore, note that the clock sequence shown includes two distinct periods in the timing sequence, that period immediately following the DOCUMENT PRESENT signal, at $t_0$, and that corresponding to the restart of a scan after CLK pulse 66, at time $t_1$. Because of the sequence of events following the leading edge of CLK 66, subsuming the events following time $t_0$, the systematic analysis in Table I encompasses only the period of time in close proximity to CLK 66. In either case, after CLK 4 all events are relatively repetitive and do not warrant separate development.

In general, the ENABLE T1 pulse resets and prepares Timing Generator 31 for the successive sequence, which is itself initiated by the T1/ pulse. The leading edge of CLK 66 signals the last count in the shift sequence. The trailing edge of CLK 66 prepares the logic devices for the resetting sequence. The next event at the leading edge of CLK 1 resets the various devices in preparation for a start sequence, which begins with the trailing edge of CLK 1. The leading edge of CLK 2 initiates the delay in the SHIFT signal, which terminates with the T4 signal coincident with the leading edge of CLK 4. It is noteworthy that Timing Generator 31 establishes the appropriate relationship of timing pulses for not only the various boards comprising the OCR Reader System but also the 64 shift pulses, the START ARRAY pulse, and the phase signals needed to appropriately operate the photodiode array in Scan Head Assembly 11 (FIG. 1).

Figure 6:
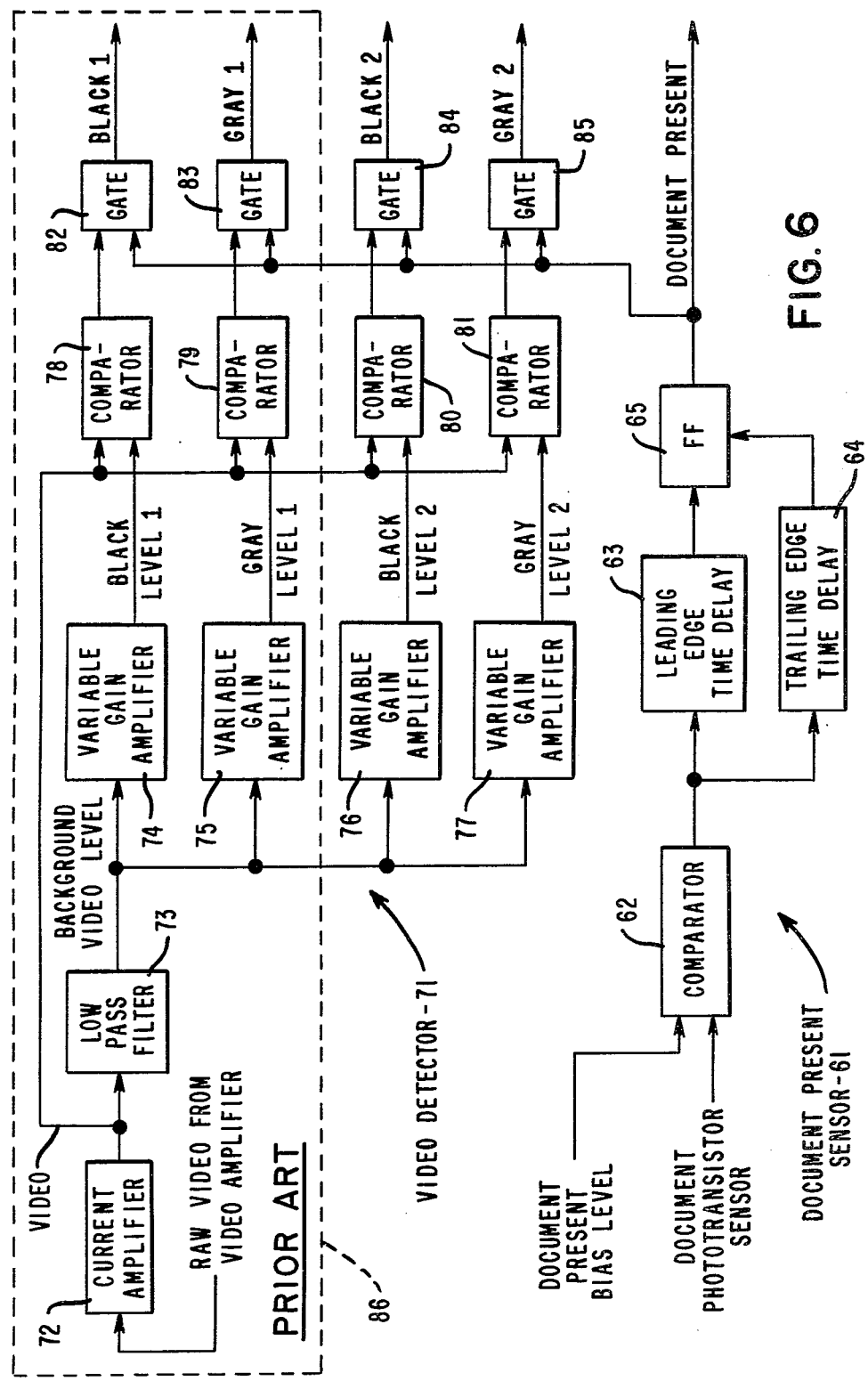
FIG. 6 is a block schematic block diagram of the Document Present Sensor block and Video Detector block.

Attention is now directed to FIG. 6 of the drawings, where the functional blocks corresponding to Video Detector 71 and Document Present Sensor 61 are schematically depicted by way of blocks representing electronic devices. Again, their relationship to the other function block making up Video Processor board 12 may be gleaned from FIG. 3. The phototransistor sensor signal generated on the document transport is compared to a biased level by comparator 62. Thereafter, an adjustable leading edge time delay of approximately 5 milliseconds is introduced by block 63, to compensate for the previously described physical displacement and to ignore the extraneous marks frequently encountered at the edges of documents. The trailing edge time delay block, 64, performs a comparable function for the other end of the document, and further incorporates a delay sufficient to ignore small holes in the document. Time delay blocks 63 and 64 are coupled to set and reset FF 65 at the leading and trailing edges of the scanned field along the length of the document.

The remaining blocks shown in FIG. 6 are dedicated to the Video Detector 71 of Video Processor board 12. The raw video signal from Video Amp board 10 (FIG. 1) is amplified by block 72. The amplified video signal is distributed, after undergoing low pass filtering by block 73, as a background level to variable gain amplifiers 74, 75, 76 and 77. The amplified background levels from amplifiers 74, 75, 76 and 77 are compared to the original video, which has been fed forward from amplifier 72 into comparator blocks 78, 79, 80 and 81. The output from each comparator is binary in format, quantized on the basis of selectable threshold levels. For examples of the various thresholds see FIG. 2. The remaining blocks in Video Detector 71, gates 82, 83, 84 and 85, inhibit the passage of digitized video when no document is present. It should be noted that the segment of Video Detector 71 within dashed line 86 constitutes prior art.

Figure 7:
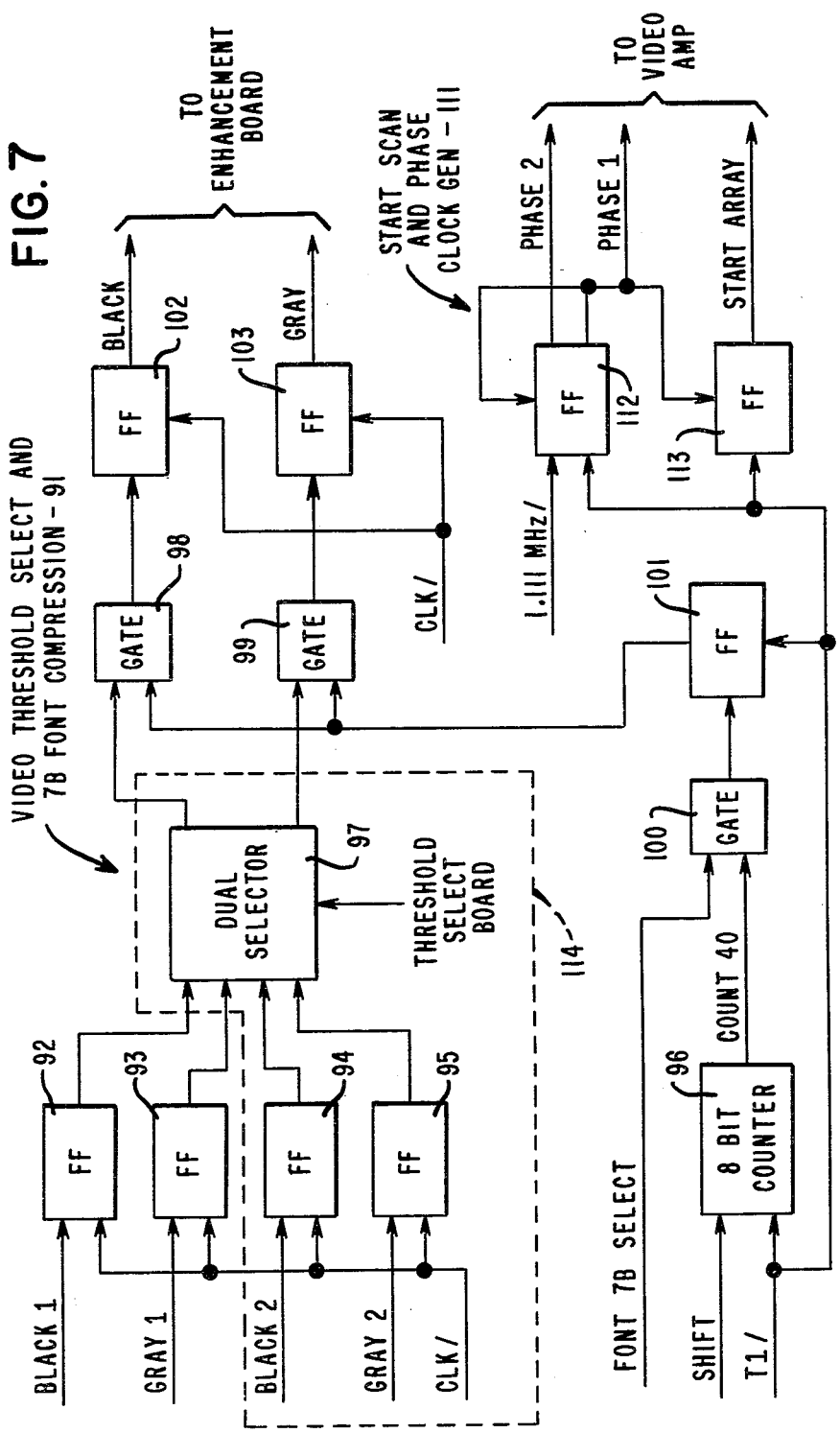
FIG. 7 is a schematic block diagram of the Start Scan and Phase Clock Generator block and the Video Threshold Select and 7B Font Compression block.

The electronic devices which form the Video Threshold Selection and 7B Font Compression block 91 are illustrated in FIG. 7. The individually quantized levels of black and gray video pixel data are synchronized with CLK/ by FFs 92, 93, 94 and 95. Dual selector 97 permits manual selection of either gray 1/black 1 or gray 2/black 2. This feature allows adjustments in the OCR Reader System for documents having unusual background reflection or contrast characteristics.

To understand the relevance of some ensuing operations performed in the system, one needs to digress briefly into the operations uniquely suited to font 7B. First, recall that the CLK and SHIFT signals reduced to a frequency of 0.714 MHz when reading characters formed in 7B font. This is evidenced in the clock blocks of FIG. 4. The frequency change effectively compresses the scan to 40 data bits, with the remaining 24 bits treated as white data.

The 7B font compression feature shown in FIG. 7 is created by operation of blocks 96, 98, 99, 100 and 101 on the quantized data appearing at the output of dual selector 97. Counter 96 determines when the array has completed its scan and compressed the data into 40 bits. When 7B font is selected, a count of 40 switches FF101 to inhibit subsequent black or gray (nonwhite) data from passing through gates 98 and 99. For all other fonts, clocked FF102 and FF103 synchronously transfer a combination of black and gray data for all 64 photodiodes.

The remaining devices in FIG. 7 form the Start Scan and Phase Clock Generator, 111, creating the PHASE 1, PHASE 2 and START ARRAY signals peculiarly suited to the needs of the RL-64A solid state array, 9. FF112 and FF113 generate these scan control signals. It should be noted that the schematic in FIG. 7, with the exception of the blocks within the region outlined by dashed line 114, constitute prior art.

ENHANCEMENT BOARD

Figure 8:
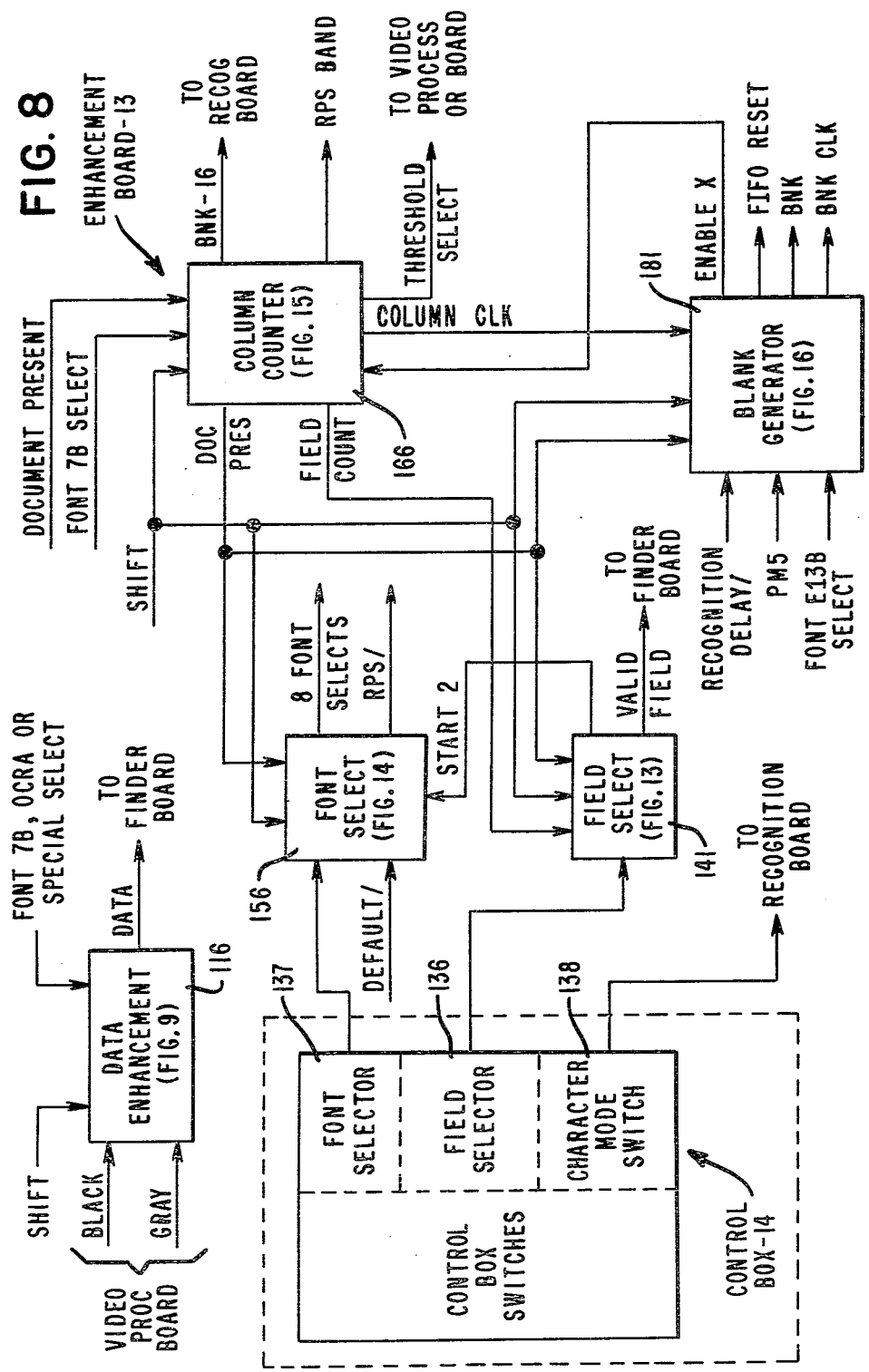
FIG. 8 is a composite schematic block diagram of the Enhancement board and the Mode, Font and Field Control box.

The next grouping of functional blocks to be considered is known as the enhancement board. As shown in FIG. 1, Enhancement board 13 is coupled to both Video Processor board 12 and Mode, Font and Field Control box 14. The latter source of signals to the Enhancement board introduces operator controlled functions. The analysis of the Enhancement board will begin with a general description of the overall operation and will then extend the analysis into the individual functional blocks which make up the Enhancement board. The various functional blocks are illustrated in FIG. 8.

The functions performed on the enhancement board are divisible into two general classes, those which relate to the enhancement of the black and gray pixel data, and those which relate to interfacing with the operator to control the OCR Reader System.

The general effect of Data Enhancement block 116 is to thicken thin character segments and thin thick character segments during the processing of the gray and black level data. This is accomplished by circulating gray data through a shift register matrix to determine whether data representing the pixels should be converted to black or white data bits. If the data representing adjacent pixels indicates a large black area, the gray pixel data is converted to white pixel data. On the other hand, if the gray pixel data is surrounded by white pixel data, indicating a light portion of the character, the data representing the center pixel is converted to black. This procedure is repeated sequentially for all the pixels as they shift through the center location of the shift register matrix.

The second aspect of the enhancement operation is performed on black pixel data, but only in the cases where the character fonts are 7B, OCRA or SPECIAL. For these fonts, black pixel data which has been shifted into a second shift register is treated to eliminate the black data bit at center if the surrounding pixel data satisfies a group of conditions. The operation reduces thick vertical segments to nominal size.

Figure 9:
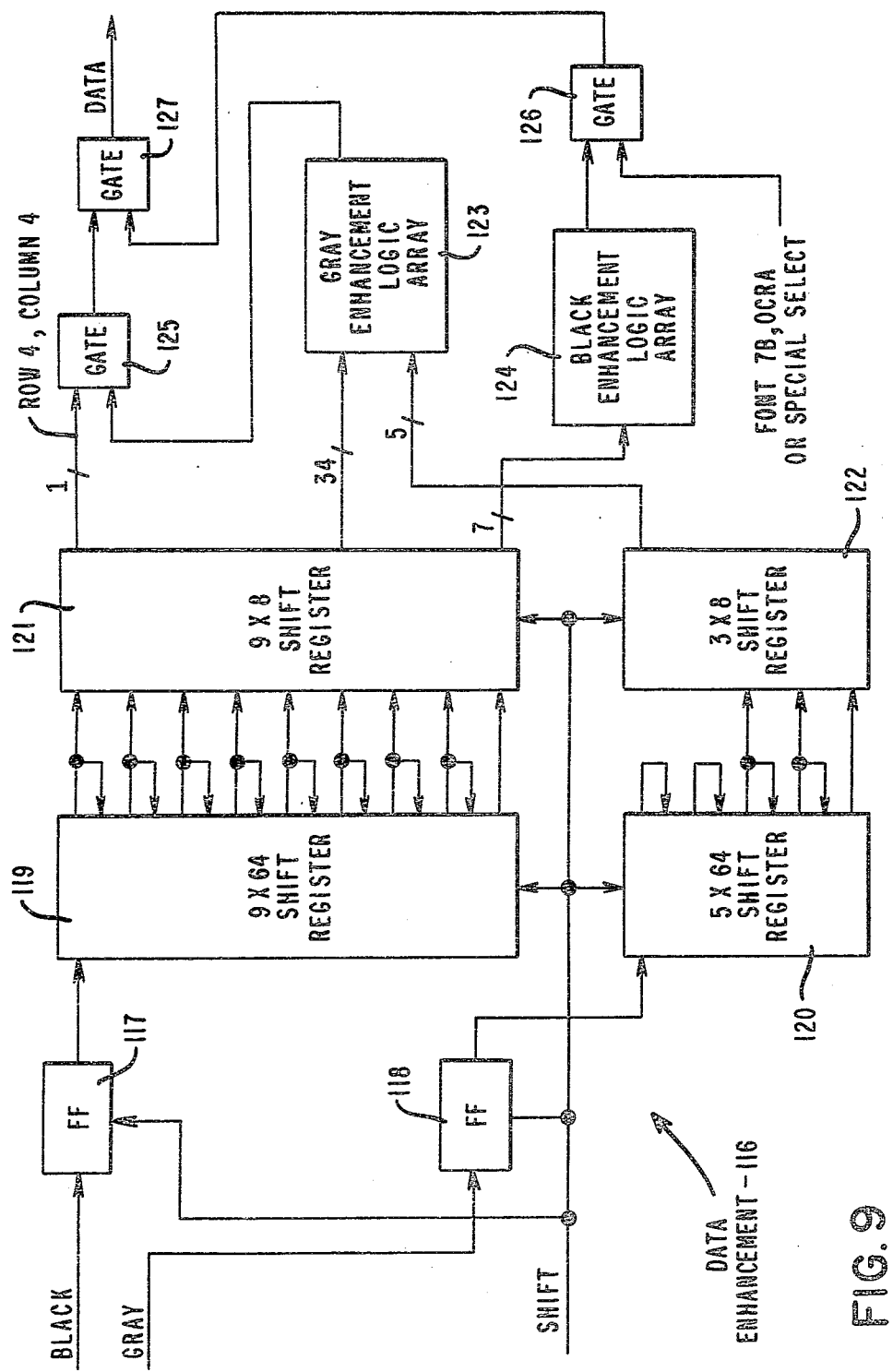
FIG. 9 is a schematic block diagram of the Data Enhancement block.

To consider the constituent devices comprising Data Enhancement block 116, consider the embodiment shown schematically in FIG. 9. Black and gray pixel data from the Video Processor board are synchronously entered into 9×64 shift register 119 and 5×64 shift register 120 through FF117 and FF118, respectively. The data is entered and stored serially in both registers. Adjacent shift registers 121 and 122 extract samples of the pixel data, in the form of a matrix, by the synchronous conversion of the data from serial to parallel format. Note that the matrix size for shift register 121 is 9×8, while that for register 122 is 3×8 in size.

Figure 10:
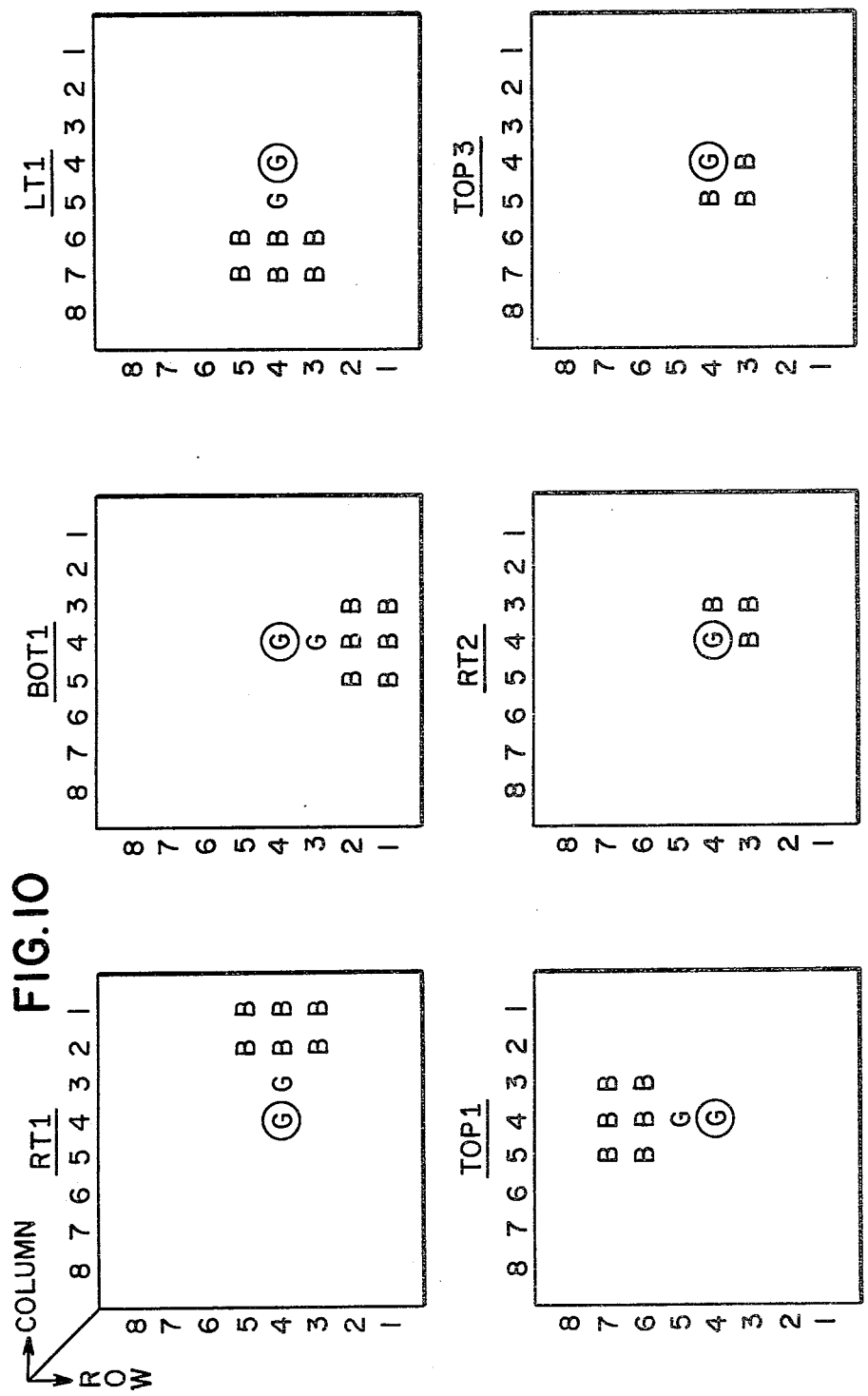

First, consider the enhancement of the gray pixel data. Gray enhancement logic array 123 evaluates a 7×7 matrix block of pixel data stored in registers 121 and 122 during each SHIFT cycle. The gray pixel data being evaluated is always the one in the fourth row and fourth column of the 7×7 matrix, i.e., the center pixel. If the center pixel is gray, gray enhancement logic array 123 analyzes 34 black pixels and 5 gray pixels to determine whether the center gray pixel data should be converted to white pixel data. If not, the gray pixel data bit is converted to a black bit. FIGS. 10 and 11 illustrate the twelve logic conditions which prescribe that the gray data bit at the center pixel in the data matrix, shown as a "G" within a circle, should appear at the input to gate 125 as a white data bit. Note that if the data at the center pixel is already black, the gray enhancement function is overridden. The effects of black enhancement are introduced at a later gate, number 127 in FIG. 9.

To appreciate gray enhancement consider two pixel data patterns from FIG. 10, for instance those labeled BOT1 and RT2. Each pattern represents a logic combination which causes an output to appear from logic array 123, which in turn inhibits gate 125 and generates a white binary level on the DATA line during the clock signal. In the case of BOT1, the gray status of the center pixel data is converted to white on the basis of a trend suggesting a border between black and white. As for RT2, it is presumed that the high density of adjacent black pixel data suitably represents the character segment. These and other implications of the twelve conditions can be extracted by merging the patterns and considering alternatives, in a logic OR sense. This approach is structurally embodied by gray enhancement logic array block 123.

Black data enhancement is also performed in data enhancement block 116 in FIGS. 8 and 9. Black enhancement logic array 124 receives black pixel data from shift register 121, corresponding to 7 positions within the matrix, and by way of gates 126 and 127 suppresses black data for matrix position (4,4) in the array if any one of the four conditions are satisfied. The pixel data patterns representing the conditions are shown in FIG. 12. The effect of the circuit performing black enhancement is to remove a black data bit, change it to a white data bit, if any one of the four patterns in FIG. 12 are detected by black enhancement logic array 124. Gate 126 limits the implementation of the black elimination operation to the three fonts noted hereinbefore, while gate 127 performs the actual change of the data when black elimination is prescribed. Note again, that the various actions are repeated for each clock signal.

The black elimination patterns illustrated in FIG. 12 can be considered in greater detail. For instance, the patterns at 131 and 132 eliminate all black pixel data until the vertical segments of characters are three columns or less in width. The right edge of the character always serves as the reference. Alternate patterns 133 and 134 in FIG. 12, illustrate the conditions which compensate for the horizontal segments of the characters. Absent such compensation, the black elimination logic array would reduce all horizontal projections to shapes having the width of three columns or less.

A careful analysis of the gray and black patterns in the various matrices of FIG. 10, 11 and 12 discloses why shift registers 121 and 122 are respectively 9×8 and 3×8 in size. One skilled in the art undoubtedly recognizes that these matrix patterns are merely examples of the diverse combinations which are feasible, given the need for greater, or lesser, data enhancement.

To understand the purpose for each of the other functional blocks on Enhancement board 13 in FIG. 8, it is necessary to briefly digress to a description of Mode, Font and Field (Control) Control box 14 (FIG. 1). As shown generally in FIG. 8, the Control box 14 performs three functions. First, it allows the operator to select the beginning and end of two scan fields. Next, the box permits the operator to select the font to be read in each of the two fields. And last, it permits the operator to select a mode in which only the numeric characters in a selected font are recognized.

The vertical position of the scan band is established by mechanically adjusting Scan Head Assembly 11 with respect to transport 2. In the horizontal direction, Field Selector 136 of Control box 14 prescribes the scan band positions for starting and ending the Finder and Recognition board operations. The selectable fields, designated as field 1 and field 2, are non-overlapping.

Font Selector 137 of Control box 14 permits the operator to individually designate the font which is to be recognized in each of the two fields. Font selection is further diversified by the inclusion of the remittance processing (RPS) mode in the font selector for field 1. When the RPS mode is designated, the OCR Reader System automatically reads any one of four fonts depending on which of three special symbols are encountered in the first 25 millimeters of the document. If no symbol is detected the system defaults to the fourth font, corresponding to the one designated for field 2. The symbols and corresponding fonts are presented in Table II.

TABLE II

| Symbol | Font |
|--------|------|
| ⊓ | OCRA |
| > | OCRB |
| $ | 1403 |

The operation of Character Mode Switch 138 is sufficiently rudimentary that it requires no separate development.

Figure 13:
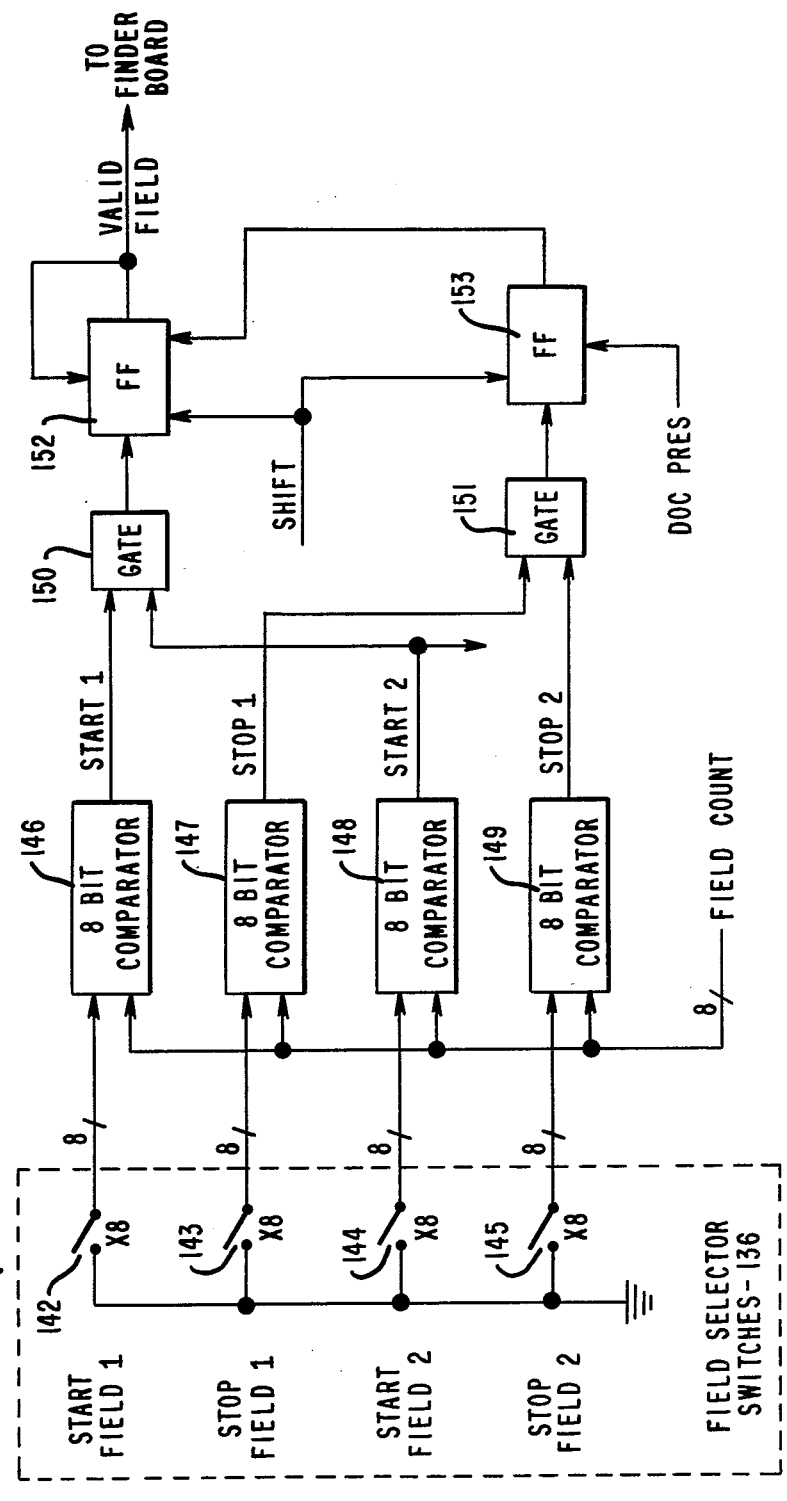
FIG. 13 is a schematic block diagram of the Field Select block and Control box.

FIG. 13 embodies Field Selector 141 and depicts the block of devices required to generate a VALID FIELD signal for Finder board 15 (FIG. 1). The start and stop positions for both fields are created in eight contact field selector switches 142–145. For field 1, the designated start and stop numbers are compared respectively in 8 bit comparators 146 and 147 with the FIELD COUNT signal, with the signal numerically representing the progress of the document along the transport. Comparators 148 and 149 perform the same function for field 2. A start position match is sensed by gate 150, which switches FF152 when the output from gate 150 coincides with the SHIFT signal. The end of a field is signalled by the coincidence of outputs from comparator 147 or 149 and a SHIFT signal, which switches FF153 and resets the latched state of FF152. FF153 is reset when the DOC PRES signal becomes inactive to indicate the end of the document. The VALID FIELD output signal generated by Field Selector 141 is sent to Finder board 15 to indicate when Scan Head Assembly 11 is optically detecting an area within either of the designated fields.

Figure 14:
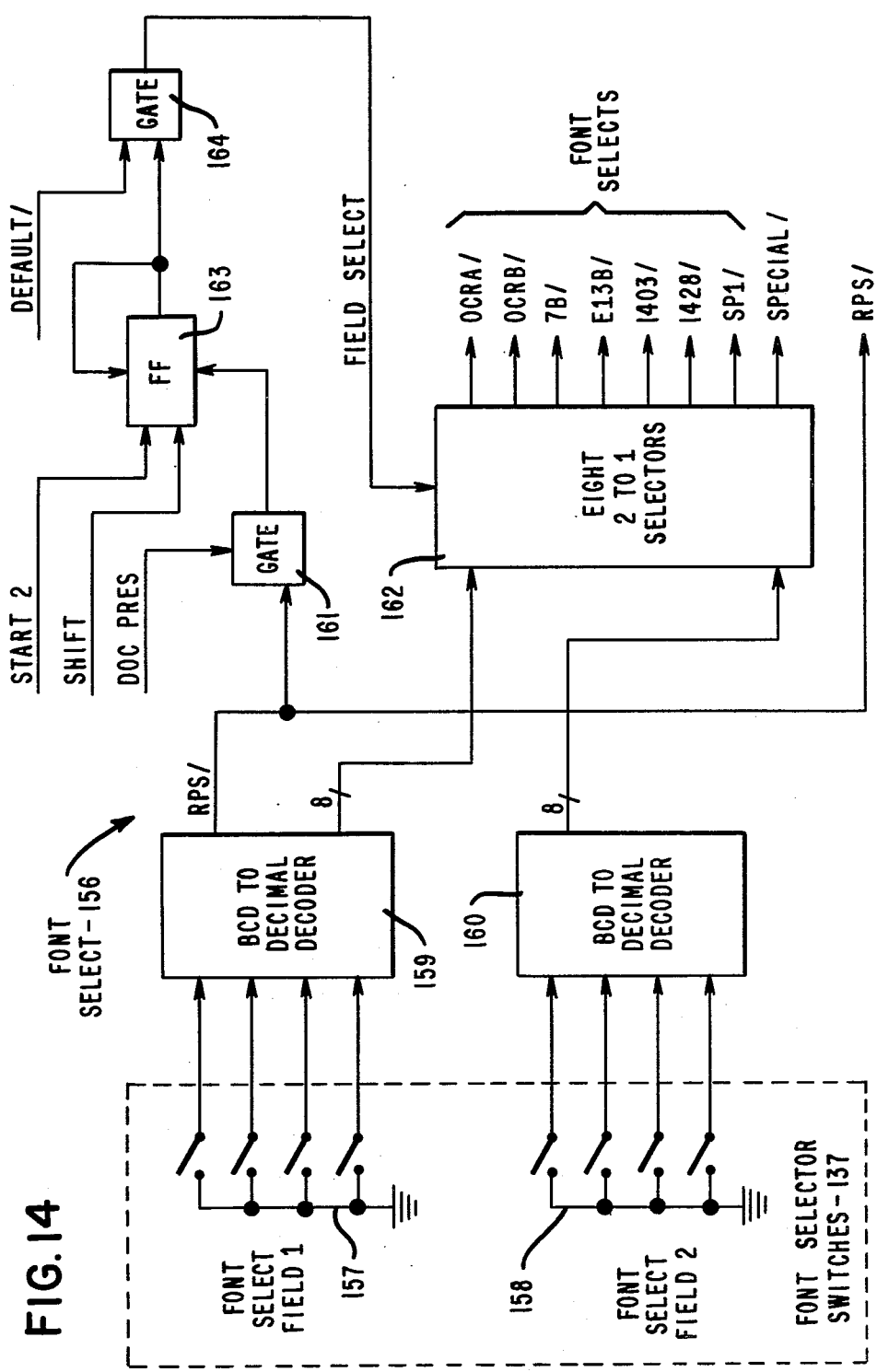
FIG. 14 is a schematic block diagram of the Font Select block and Control box.

FIG. 8 also shows the presence of the functional block entitled Font Select 156 on Enhancement board 13. The devices comprising the Font Select block are shown in FIG. 14. The positions of Font Selector switches 157 and 158 in the Control box are presented in binary format to BCD-to-decimal decoders 159 and 160 for fields 1 and 2, respectively. Each decoder has 8 output lines corresponding to each font in each field. Decoder 159 includes a ninth line to represent the RPS mode.

The process for selecting the appropriate font by field or under the influence of the RPS mode is performed by the combination of gate 161, selectors 162, FF163 and gate 164. In the non-RPS mode, gate 161 resets FF163 during the period when the DOC PRES signal is absent. Thereafter, the absence of a DEFAULT/ signal, and the reset state of FF163, combine in gate 164 to generate the FIELD SELECT signal. An active FIELD SELECT signal selects the data from field 1 of decoder 159. Thereafter, when the START 2 signal, indicating the onset of field 2, coincides with a SHIFT signal, FF163 and gate 164 change to select the font prescribed for field 2 from decoder 160.

The selection of the RPS mode in field 1 of font select switches 157 latches the output of FF163. The FIELD SELECT output signal to selectors 162 prescribes the font designated for field 2 when the DEFAULT/ signal becomes active.

Again, attention is directed to the schematic function block of the Enhancement board in FIG. 8 of the drawings. The next functional block to be considered in detail is Column Counter 166. The devices internal to that block appear in FIG. 15. The basic purpose of Column Counter 166 is to determine by increments the progression of the document as it is moved by the transport across the data capture position adjacent Scan Head Assembly 11 (FIG. 1). The block does, however, perform some auxiliary functions.

Figure 15:
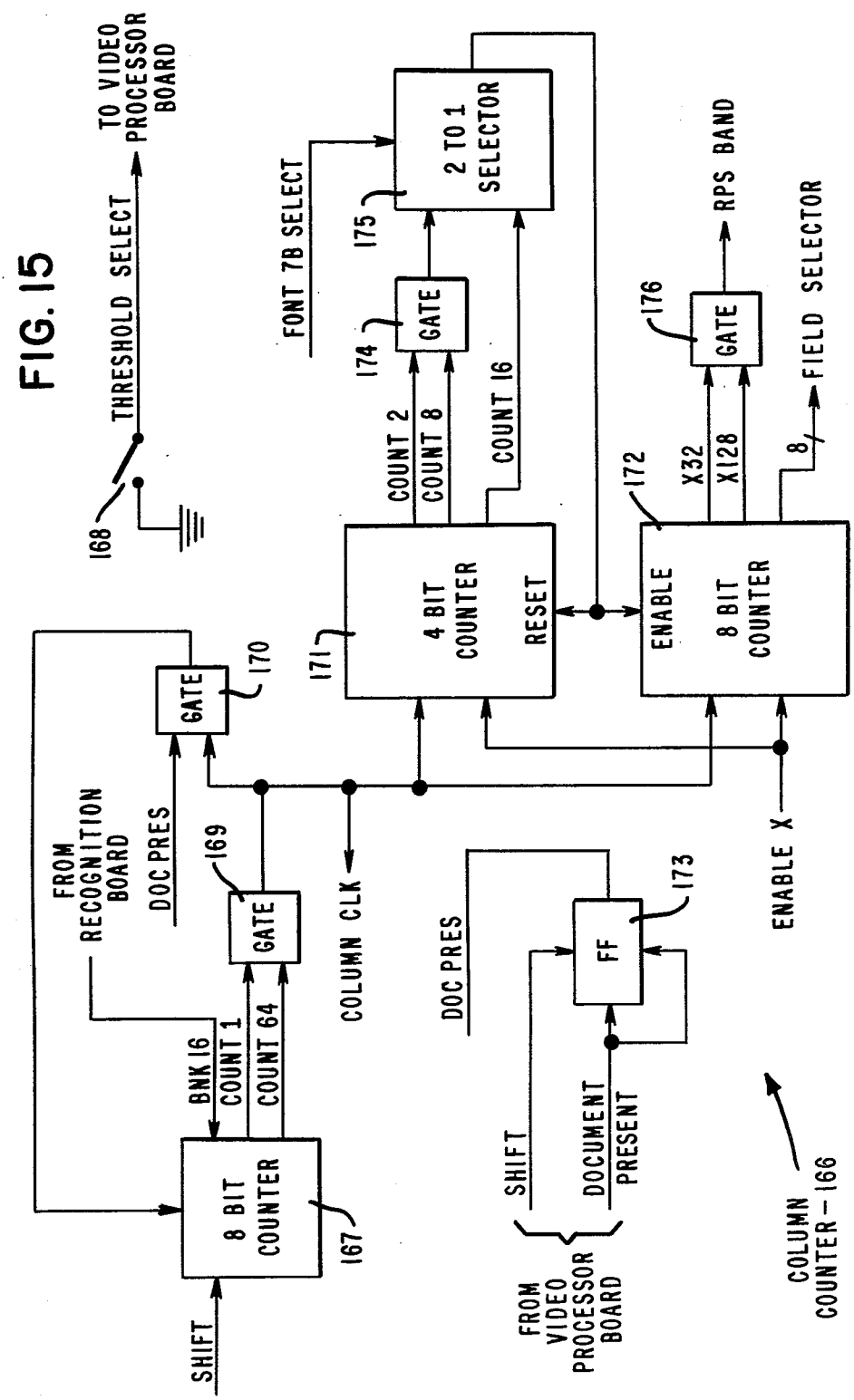
FIG. 15 is a schematic block diagram of the Column Counter block.

FIG. 15 shows that the DOC PRES signal noted hereinbefore constitutes a synchronism of the DOCUMENT PRESENT signal with the first SHIFT signal generated on Video Processor board 12. The operation is performed by FF173. Another auxiliary function occurring within Column Counter block 166 is the selection of video thresholds, either gray/black 1 or gray/black 2, implemented on Video Processor board 12. The position of switch 168 prescribes the choice of level pairs.

The operation of Column Counter 166 begins in 8 bit counter 167. Counter 167 accumulates a count of 64 shift pulses, corresponding to the 64 photodiodes in a column of scanned data. The counter is loaded with a count of 1 on count 65 by the action of gates 169 and 170. Note that gate 170 does not initiate a loading of counter 167 unless a DOC PRES signal also exists. The output from the counter and its associated devices generates a COLUMN CLK signal, in the form of a pulse for each column of data scanned and processed.

The COLUMN CLK signals are coupled into 4 bit counter 171, which combines with the action of gate 174 and selector 175 to group columns into fields. The fields vary in width depending on the font. The relatively large structure of the 7B font prescribes a field 10 columns in width, resetting counter 171 on count 10. The remaining fonts reset counter 171 after a field of 16 columns.

Counter 172 accumulates columns by fields. COLUMN CLK signals are counted only when selector 175 signals the completion of a field by enabling counter 172, and the ENABLE X signal is present. The generation of the ENABLE X signal will be described later. The number of fields counted appears as the FIELD COUNT signal from counter 172. A count of 10 fields by counter 172 is detected by gate 176 to generate the RPS BAND signal. This signal indicates the end of the first 25 mm of document, corresponding to the zone allocated to special symbols when operating in the RPS mode.

Figure 16:
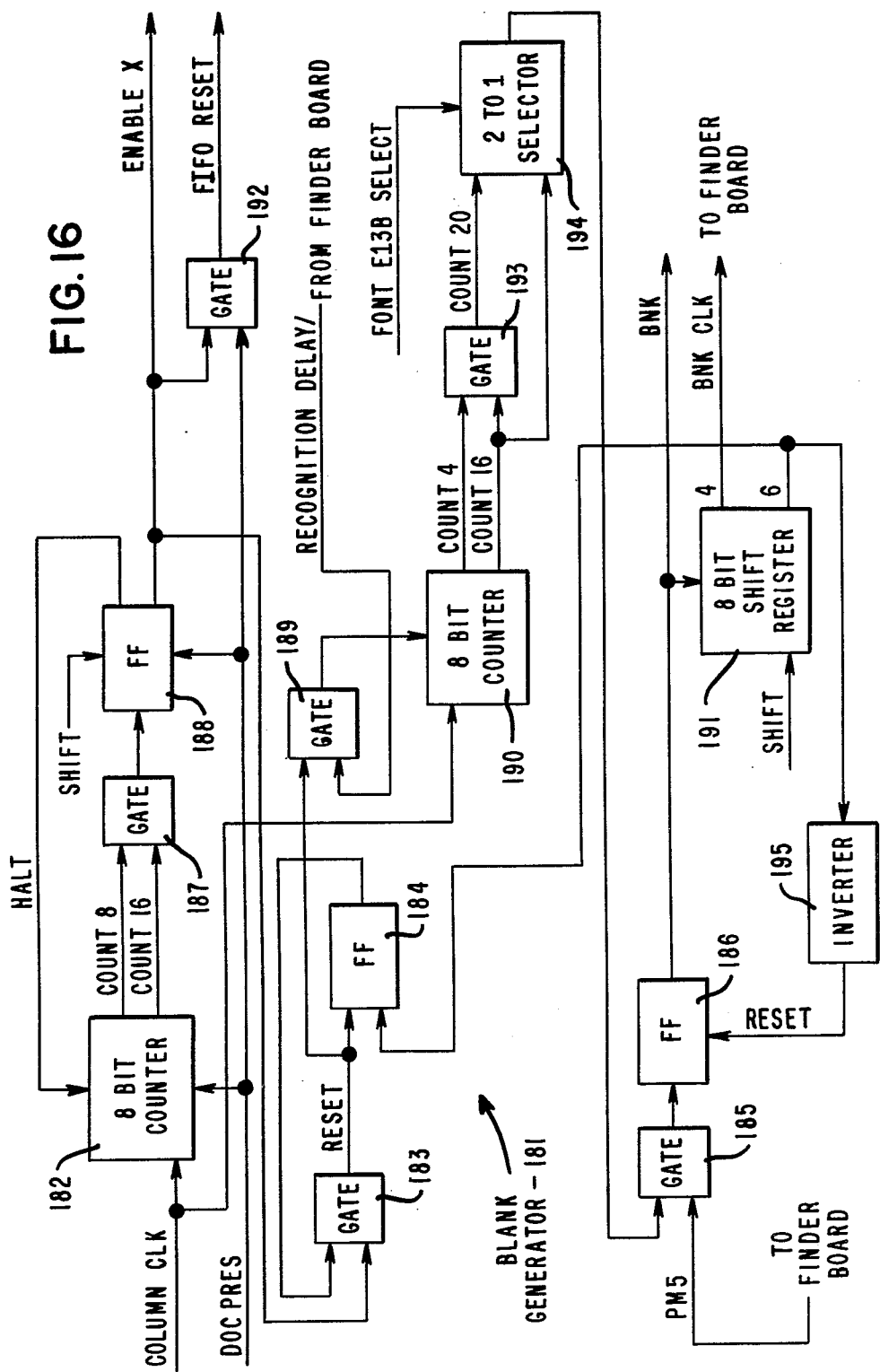
FIG. 16 is a schematic block diagram of the Blank Generator block.

Returning to FIG. 8, attention now focuses on Blank Generator block 181. The devices within this block are developed in FIG. 16. Counter 182, gate 187 and FF188 together serve to delay the ENABLE X signal by 24 columns after the DOC PRES signal. This provides sufficient time for Enhancement board 13 and Finder board 15 to clear pre-existing data before new fields of data are entered. The FIFO RESET signal generated by gate 192 clears devices on the Finder and Recognition boards during the 24 column delay period noted above.

The Blank Generator block 181 also includes other devices serving to regulate some operations of Finder board 15 and Recognition board 16. Among these devices are 8 bit counter 190, gate 193 and selector 194, used together to generate one clock pulse per field in accordance with the size of the selected character font. Counter 190 is started by the ENABLE X signal with the cooperative actions of gate 183 and FF184. Counter 190, gate 193, gate 185, selector 194 and FF186 enable shift register 191 once for every field. As noted previously, the field varies from 20 columns for font E13B to 16 columns for the remaining fonts. Shift register 191 generates a BNK CLK signal 4 SHIFT signals later and retains the BNK CLK signal for 2 SHIFT signals. Shift register 191 resets FF184 and FF186 with the trailing edge of the BNK CLK signal. The switching of FF184 resets counter 190.

The RECOGNITION DELAY signal originates on Finder board 15. This signal resets and disables Blank Generator 181 through gate 189 whenever a character has been located by Finder board 15. The PM5 signal also originates on the Finder board. This signal is coupled to Blank Generator 181 to synchronize the BNK CLK signal with the character finding operations using gate 185. The generation of both of these signals will be described hereinafter.

At this point, the individual description of Enhancement board 13 is concluded. Though a number of input and output paths coupling the Enhancement board to the other boards have not been described with particularity, the consistency of reference symbols throughout will allow one to recognize each when they are fully developed with relation to their origins on boards yet to be described.

FINDER BOARD

Reflecting back to FIG. 1 momentarily, attention will now be focused on Finder board 15 and the functions it performs. Because the finder board is not readily amenable to a division on the basis of functional blocks the description of the functions and structure will be approached in a manner slightly different from that used to describe the Video Processor and Enhancement boards. After an initial overview, the Finder board will be described by way of the individual operating algorithms. Thereafter, the structure will be developed by considering the devices which comprise each logic condition in the algorithm. A composite of the various logic operations is shown by schematic blocks in FIG. 17.

Generally stated, the purpose of Finder board 15 is to precisely locate the characters within the scan band before initiating the recognition process. Thereby, the templates used in the recognition process can be accurately located to directly overlay the character undergoing analysis. The general technique involves an optimal positioning of the character within the window.

Finder board 15 receives the DATA signal supplied by Enhancement board 13 in serial format at a rate of the SHIFT signal. Each data bit represents a pixel from the scan band that has undergone processing by Video Processor board 12 and Enhancement board 13. The data bits are shifted into 64 bit shift registers, each register representing a single scan of the photodiode array. As the next 64 data bits are received, the previous bits are shifted into the next shift register. When all the shift registers are full, there are 19 columns or scans stored on the Finder board. As the data corresponding to the 20th scan is entered into the first shift register, the data corresponding to the first scan is simultaneously shifted out and discarded.

As this data is shifted through the registers, the Finder board calculates the number of black bits within a window of a size corresponding to the font selected. The character is generally defined to be within the window when the count of black bits within the window decreases with the movement of the window. At this point, the Finder board also checks for white areas around the character and a variety of other finding conditions. A character is presumed to be optimally located when all the conditions are satisfied.

It should be understood that either the data or the window can be considered as stationary in describing the relative interaction on Finder board 15.

When a potential character is located, Finder board 15 sends a RECOGNITION START signal to Recognition board 16 to initiate the recognition of the character located within the window. After the Recognition board completes the recognition process the Finder board undertakes to locate the next character in the scan band.

Figure 18:
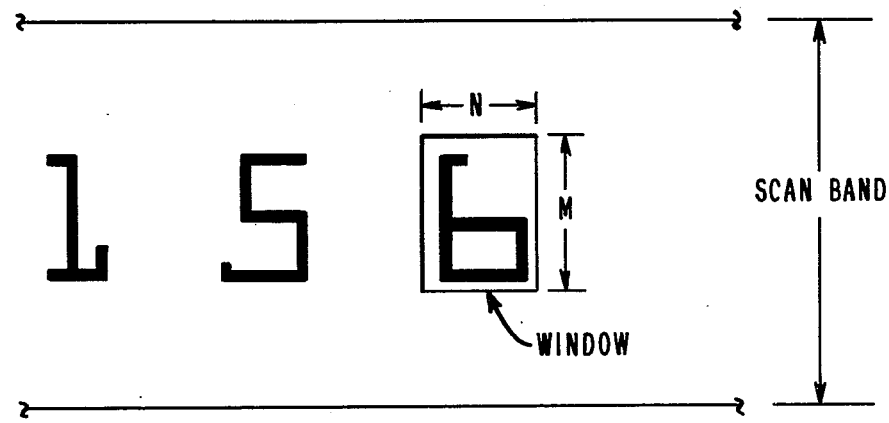
FIG. 18 schematically depicts the scan band and the window.

Consider the finding process in greater detail. The embodied character finding process involves the use of a character positioning algorithm generally composed of four steps. The algorithm searches for a character in the scan band of the document as though it was looking through an M high by N wide window. This is generally illustrated in FIG. 18. The window is moved from bottom to top, right to left through the scan band, while searching for a character.

The four steps for finding a character are performed simultaneously by the finder board as the window moves through the scan band. They are generally described as follows.

Step 1—Window Count

Figure 19:
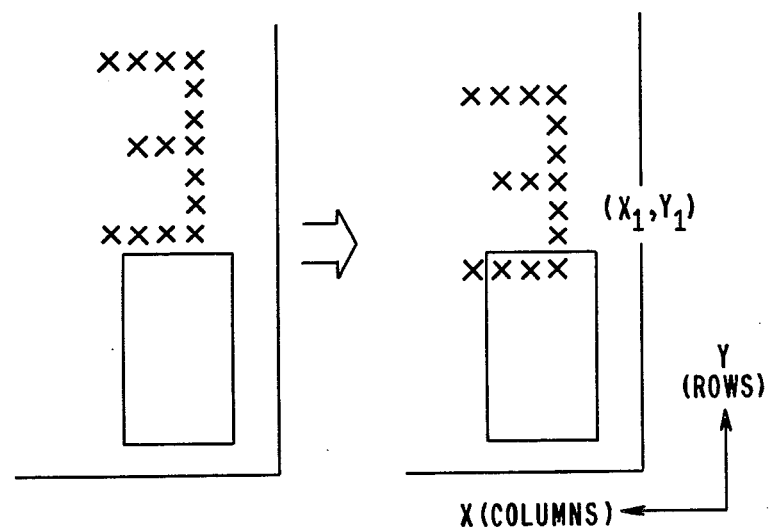
FIG. 19 schematically depicts the movement of the window onto a character.
Figure 20:
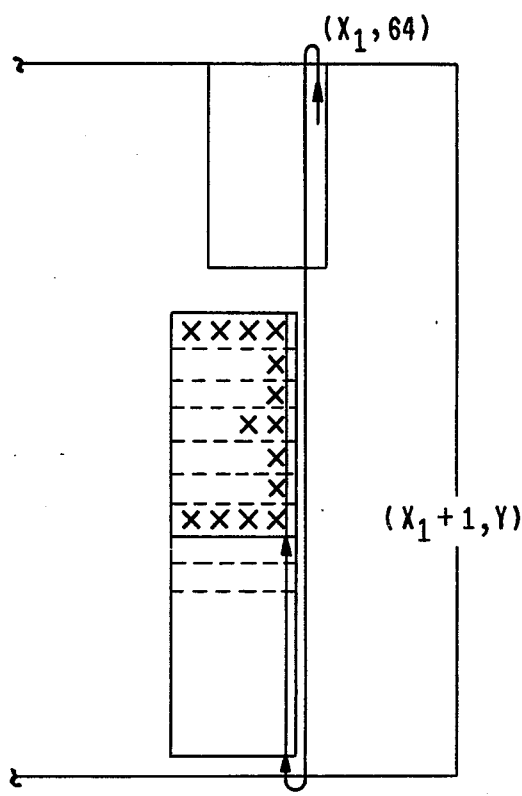
FIG. 20 schematically depicts the movement of the window over the scan band.

The finding algorithm starts looking for a character at the bottom right-hand corner of the scan band and moves upward. See the left to right progression of the sequence in FIG. 19. The number of black data bits inside a window having corner coordinates ($X_1$, $Y_1$) is counted. If the total number $T(X,Y)$ is greater than a preset threshold T, corresponding to the condition BLK MIN in FIG. 17, a potential character has been detected and steps 2-4 are commenced. The window continues to move upward in the scan band until the right hand corner reaches position ($X_1$,64). The scan is then reinitiated at the bottom of the scan band with the X position incremented by 1. This is generally shown in FIG. 20. The effective window is incremented from bottom to top, left to right, as the Finder board compares the number of black data bits within the window to the threshold T.

It should be noted at this point, that the threshold T condition is a minimum level which will be exceeded at a number of locations within the scan band not coincident with a character. Consequently, the complete finding of a character does not occur until the conditions defined by steps 2-4 are simultaneously satisfied.

Step 2—Vertical Search

Concurrently with the operations in step 1, the number of bits entering the window, represented by $N_T$, is compared to the number of bits leaving, represented by $N_B$. If $N_T$ is greater than $N_B$, the window is considered to be moving up onto a character. When $N_T$ is less than $N_B$, a signal is generated to indicate that the bottom edges of the character and window are aligned.

Step 3—Horizontal Search $N_L$ is defined as the bit count for the leftmost column of the window and $N_R$ defined as the bit count for the right-most column of the window. If $N_L$ is greater than or equal to $N_R$, the relationship indicates that the optimal position for the window lies to the left of its present position. The horizontal search step also includes a comparison of $N_L$ to the number of bits in a row $N_T$ along the top of the window. When $N_R$ and $N_T$ are both greater than $N_L$ the window is optimally positioned in both the vertical and horizontal directions.

Step 4—Additional Conditions

The additional conditions are required for special characteristics, such as short characters, characters that are light on the bottom or dark on top, characters surrounded by unwanted data (smudges) and characters positioned excessively close. The additional conditions also check for vertical alignment and whether a white boundary surrounds the character located. This latter check verifies that the window has been positioned over one character, rather than split between two adjacent characters.

Once the conditions in steps 1-4 are simultaneously satisfied, Finder board 15 sends a RECOGNITION START signal to Recognition board 16 to initiate the recognition process. Finder board 15 commences searching for the next character only after the recognition process on the previous character is completed.

A window size of 18 × 12 bits has been found suitable for most fonts; it is preferred that FARRINGTON 7B have a window of 20 × 12 and E13B have a window of 20 × 16. Note that the window size for the window in Step 1 is one row and one column less than these sizes.

Figure 17:
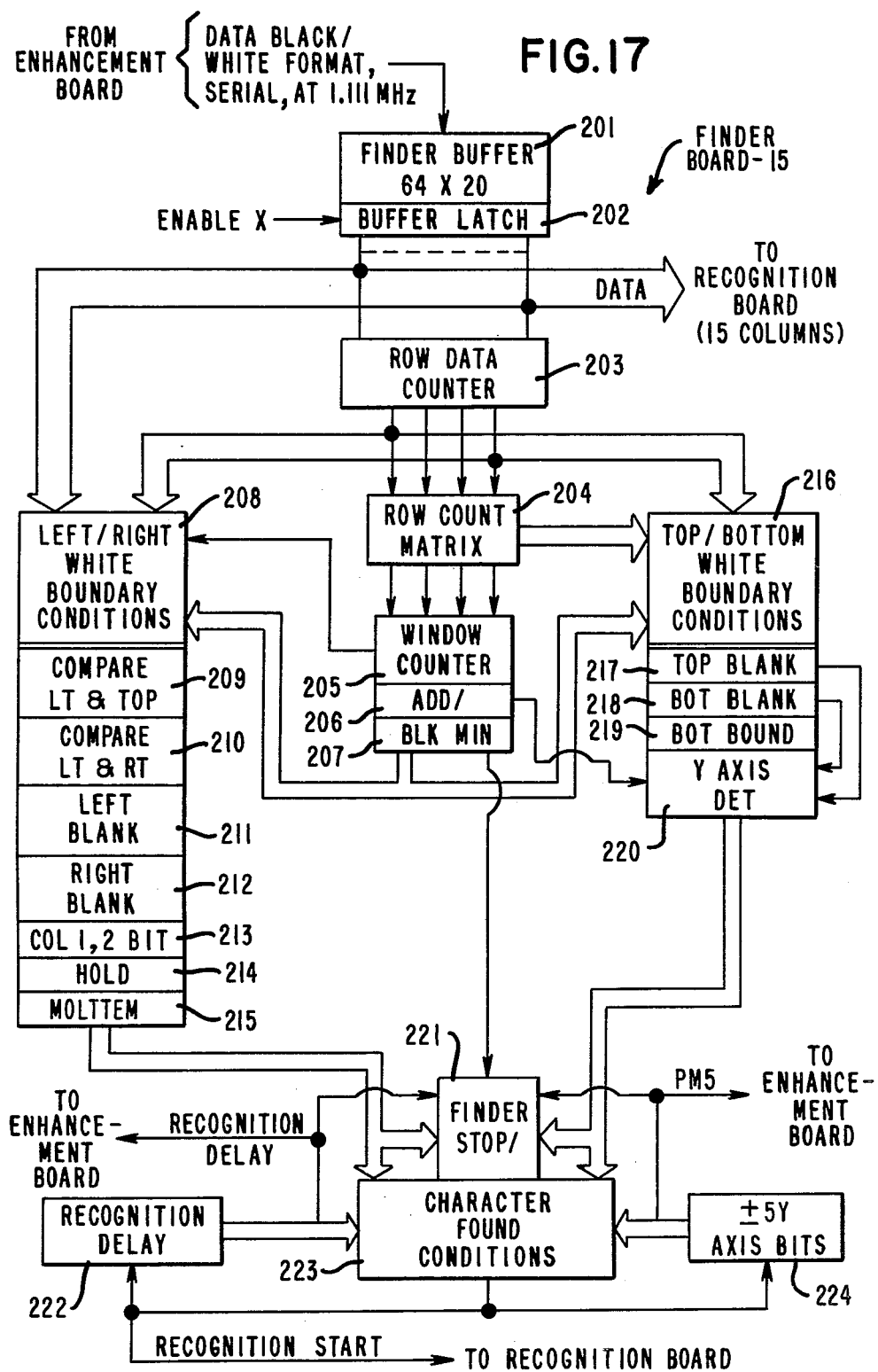
FIG. 17 is a composite schematic block diagram of the Finder board arranged by functional groups.
Figure 22:
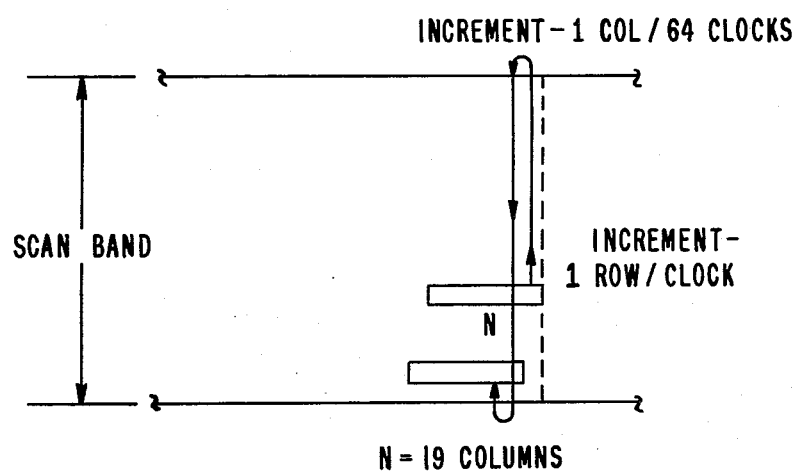
FIG. 22 schematically depicts the movement of the scan by rows.

The schematic block diagram of the Finder board in FIG. 17 serves as a useful guide to the analysis of the various conditions evaluated on the board. The operations of Finder Buffer 201 and Buffer Latch 202 can be understood better upon considering the schematic representations of the character and data patterns shown in FIGS. 21 and 22. After the optical pattern on the scan band of the document is captured and processed, the enhanced data is buffered in a 64 bit high by 20 bit wide matrix, Finder Buffer 201, for parallel examination of 19 columns. Once Finder Buffer 201 is filled with data, and the ENABLE X signal from Enhancement board 13 is present, Buffer Latch 202 transfers to its output lines a row of data 19 columns wide in synchronism with the SHIFT signal. FIG. 21 conceptually illustrates the action of the Buffer Latch with respect to the data stored in Finder Buffer 201, while FIG. 22 illustrates the same concept from the perspective of samples taken at the face of the document itself. The output of Buffer Latch 202 is held for a duration of 1 clock pulse, providing sufficient time for Row Data Counter 203 to examine the first 13 bits of row data for font E13B and 11 bits of row data for all other fonts.

The schematic in FIG. 17 also shows that only 15 of the 19 columns of data available at the output of Buffer Latch 202 are coupled to Recognition board 16.

Figure 23:
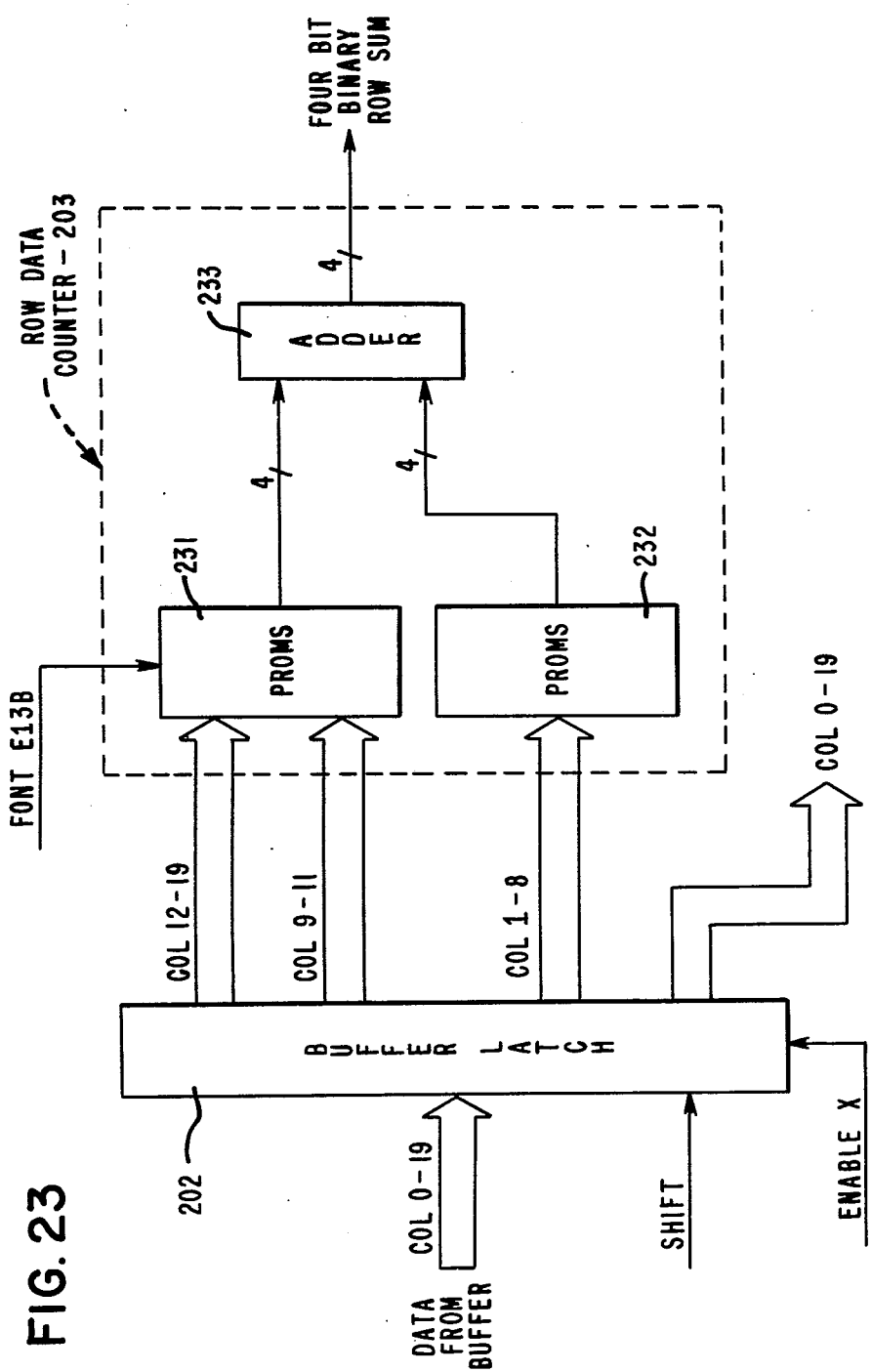
FIG. 23 is a schematic block diagram of the BUFFER LATCH and ROW DATA COUNTER.

The structure of Row Data Counter 203 is shown in FIG. 23. The embodying counter is comprised of 256 × 4 PROMs 231 and 232 followed by 4 bit full adder 233. The PROMs are addressed directly by the row data from Buffer Latch 202 and are programmed internally to generate the binary number equal to the number of active data lines on their addresses. The two PROMs are organized so that PROM 232 counts the data in columns 1-8, while PROM 231 selectively counts columns 9-11 or 9-15 (font E13B). The output of adder 233 is stored in Row Count Matrix 204 (FIG. 17).

Figure 24A:
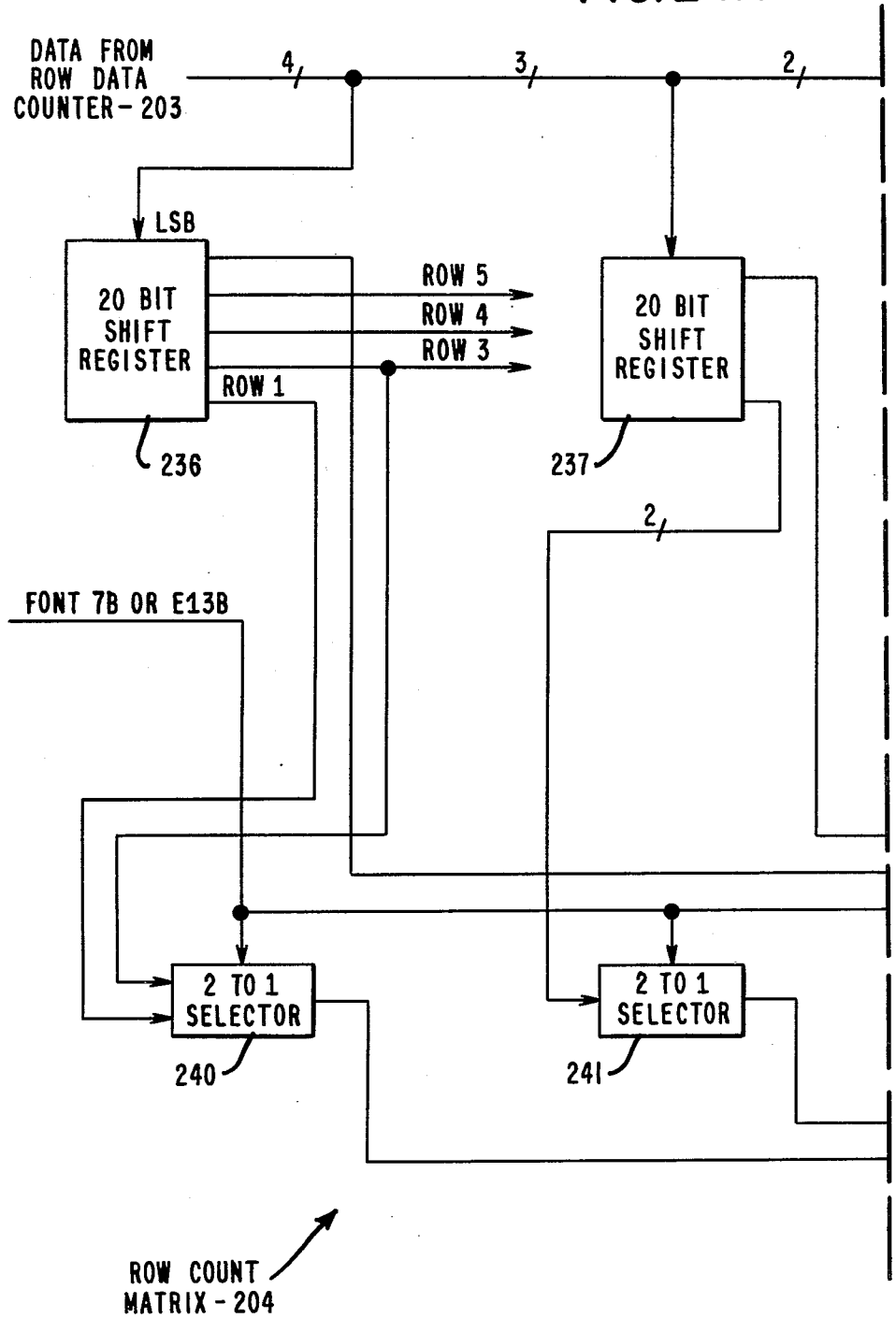
FIGS. 24A and 24B together comprise a schematic block diagram of the ROW COUNT MATRIX.
Figure 24B:
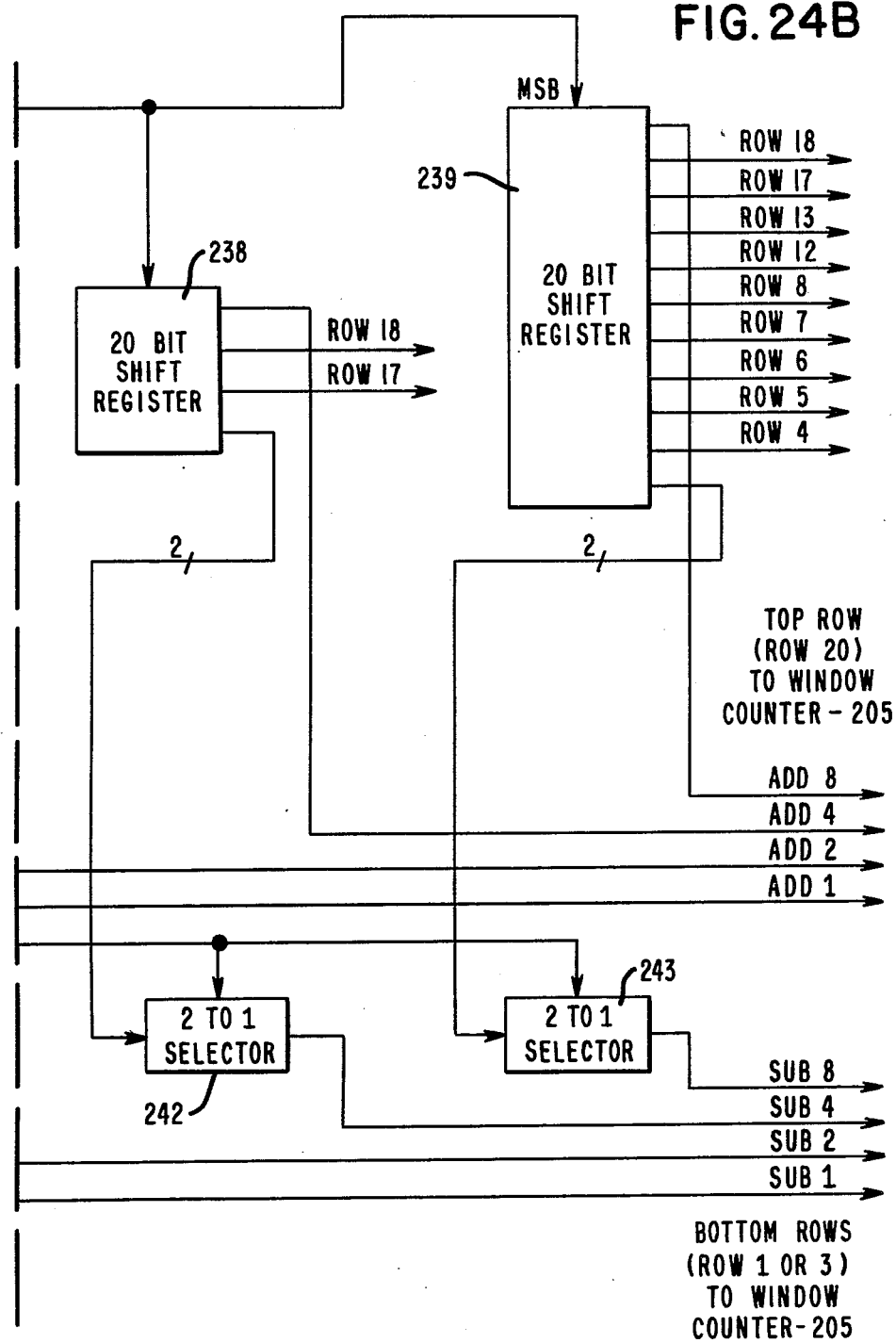

The structural organization of Row Count Matrix 204 is schematically depicted in FIGS. 24A and 24B. The 4 lines of data from Row Data Counter 203 are individually shifted into 4 20 × 1 shift registers, 236–239. The content of Row Count Matrix 204 is a representation of the bit data in the count window being examined, organized in 4 bit rows for simultaneous access to all the data. The top of the window is fixed and represented by the top row in Row Count Matrix 204. The bottom of the window is variable, depending on the character font selected. For fonts 7B and E13B the bottom is row 1, whereas for the remaining fonts the bottom is row 3. The choice is made through selector 240–243. Signals ADD and SUB respectively represent the data in the rows at top and bottom of the window.

Window Counter 205 totals the number of black bits in the counter window. The total is used in BLK MIN block 207. The operation of BLK MIN block 207 is schematically illustrated in FIG. 25 for the numeral "3," progressing sequentially from the left. Note that as the counter window moves up in the scan band and onto the character the number of bits increases or decreases in relationship to the bits entering and leaving the window, respectively. The total bits, T, for each window position are indicated below each position.

The structural implementation of BLK MIN block 207 is shown schematically in FIG. 26. Adder 246 sums the previous window count with the data appearing on the ADD lines from Row Count Matrix 204. From this sum, subtractor block 247 takes away the data appearing on the SUB lines generated in Row Count Matrix 204. The difference is latched in block 248 and compared in 8 bit comparator 249 to the fixed threshold T. For purposes of the present embodiment, T is set at 32. Whenever the difference exceeds the threshold value of 32, a BLK MIN signal is generated. FIG. 17 generally shows that the BLK MIN signal comprises one of the character found conditions.

Window Counter 205 is also coupled to ADD/block 206. The operation performed by block 206 is illustrated in FIG. 27. To determine whether the window is moving onto or off of a character, the number of bits entering the top row of Row Count Matrix 204, $N_T$, is compared to the number of bits leaving the bottom of the Row Count Matrix $N_B$. $N_T$ and $N_B$ are, respectively, the numbers represented by lines ADD and SUB. In FIG. 27 the progression of the window is again from left to right, with the effects noted below each position. If $N_T$ is greater than $N_B$, the window is moving onto a character and increases the black bit window count. However, if $N_T$ is less than $N_B$, the window is moving off the character and reducing the window count. Refer to step 2 in the previous description of the finding process.

Figure 28:
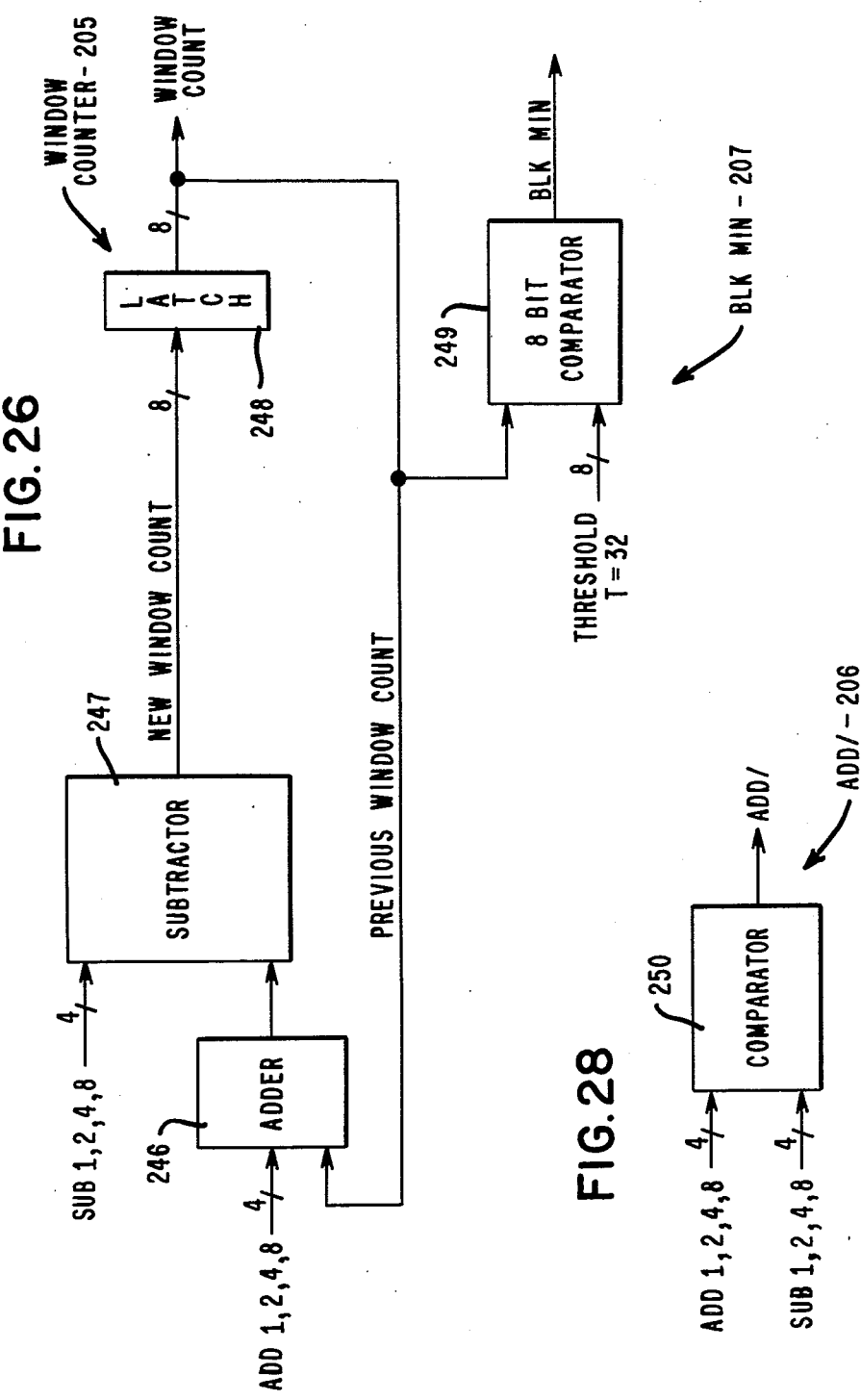
FIG. 28 is a schematic block diagram of the ADD/.

The structure of the ADD/ circuit is depicted in FIG. 28. As embodied, comparator 250 generates an ADD/ signal whenever the ADD lines represent a number greater than the SUB lines. This corresponds to the window moving onto a character.

Attention is now directed back to the schematic diagram in FIG. 17. The ensuing description will bear upon the conditions introduced by block 216, the block entitled Top/Bottom White Boundary Conditions. Included within general block 216 are the segments establishing the individual conditions attributed to blocks 217–220.

Figure 29:
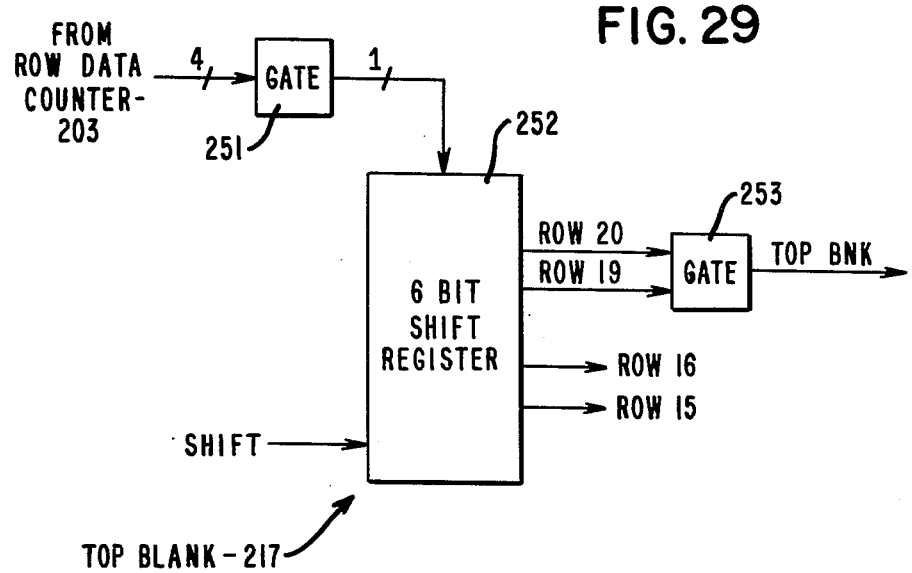
FIG. 29 is a schematic block diagram of the TOP BLANK.

The Top Blank condition created in block 217 is satisfied if either of the top two rows of the window, corresponding to rows 19 and 20 in Row Count Matrix 204, are blank. As is shown in FIG. 29, the devices comprising Top Blank block 217 receive 4 lines of data from Row Data Counter 203 and generate an output whenever gate 251 detects a row count with one or more black bits. The output of gate 251 is entered sequentially into 6 bit shift register 252 to maintain correspondence between the data rows. If either of the outputs from register 252, row 19 or 20, are zero, representing no black bits, a TOP BNK signal is generated. FIG. 17 shows that the TOP BNK signal is eventually coupled to Finder Stop block 221.

Block 216 in FIG. 17 also includes Bottom Blank block 218 within the group of conditions. Bottom Blank block 218 examines the output of Row Data Counter 203 for a row containing a count of less than 2 black bits. With reference to the window described previously, Bottom Blank block 218 examines row 0 and row $-1$ for a count of less than 2 bits.

Figure 30:
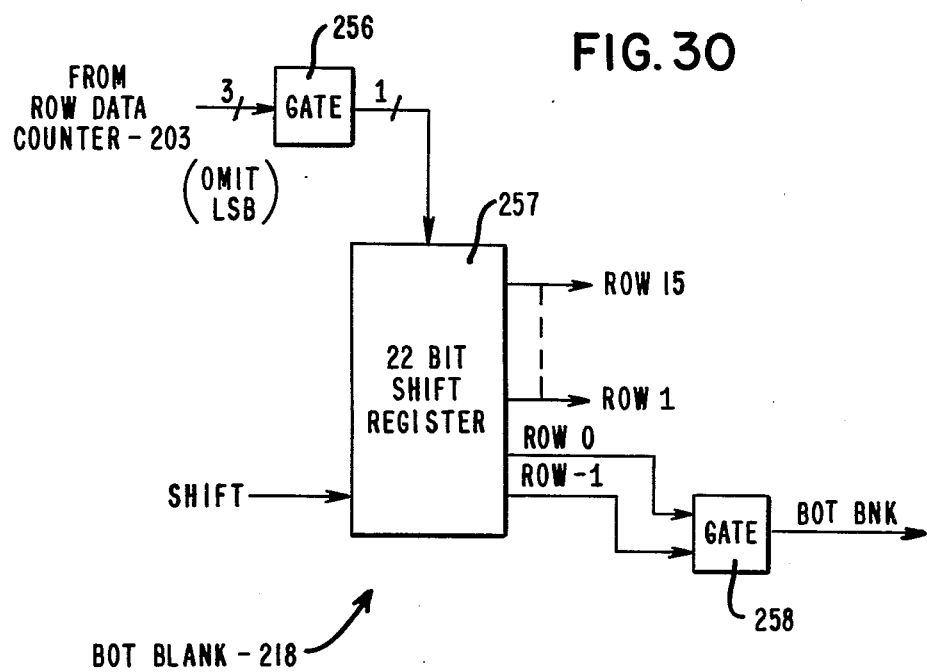
FIG. 30 is a schematic block diagram of the BOT BLANK.

The structural implementation of Bottom Blank block 218 is analogous to that of Top Blank block 217. As is illustrated in FIG. 30, the black bit count data from Row Data Counter 203 is coupled to a first gate, 256. In this case, however, the line corresponding to the least significant bit (LSB) is omitted to satisfy the requirement that fewer than 2 black data bits be present in a row before the blank condition is satisfied. The output of gate 256 is sequentially coupled into 22 bit shift register 257, which is itself coupled to gate 258 for the positions corresponding to window rows 0 and $-1$. If either of the rows has less than two black bits, a BOT BNK signal is generated and coupled to Finder Stop block 221 (FIG. 17).

Figure 31:
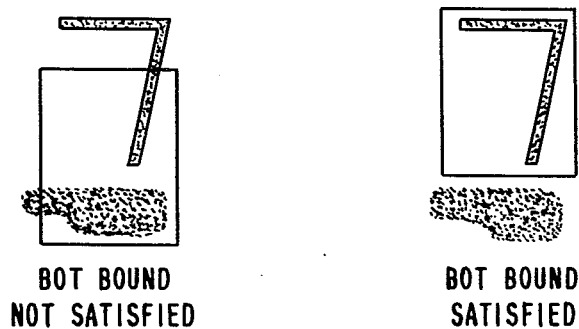
FIG. 31 schematically depicts the operation of the BOT BOUND.

Another condition established in general block 216 is shown in FIG. 17 as Bottom Bound block 219. It is used with the 7B font characters conventionally used for credit card receipts. In part, Bottom Bound block 219 distinguishes the characters from extraneous carbon smudges typically present on such documents. For example, consider the effects of a number "7" positioned immediately over a smudge as shown in FIG. 31.

Conceptually, the Bottom Bound block analyzes data near the bounds of the window to insure that something is present, but that its size and shape are consistent with patterns corresponding to the 7B font. A character satisfies the requirements when the sum of the black bits in rows 3–6 meets both of the following conditions:

Condition (1)—The counts for rows 4, 5 and 6 are all less than 8 bits.

Condition (2)—The counts for 2 or more rows are greater than or equal to 1 for rows 3, 4 or 5.

The first condition ignores extraneous smudges, knowing that the black patterns for 7B font characters would not extend over such large areas of the window. The second condition insures that a character is present within the area of the prescribed window.

Figure 32:
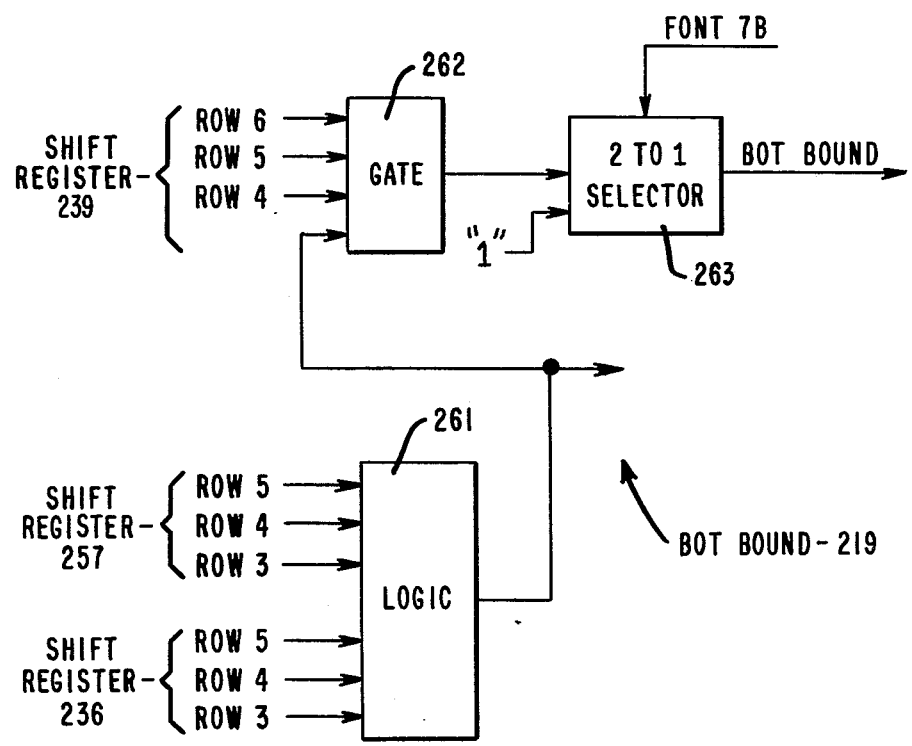
FIG. 32 is a schematic block diagram of the BOT BOUND.

An embodiment of Bottom Bound block 219 is shown by the devices in FIG. 32. The three requirements for condition (1) are detected by the three lines from shift register 239 of Row Count Matrix 204. A signal in the most significant bit position for a row indicates a black count of 8 bits or more for that row. These 3 signals are combined in gate 262 with the output of logic 261 to insure that both conditions are satisfied. Logic block 261 combines bit data from Row Count Matrix 204 (FIGS. 24A and 24B) and Bottom Blank 218 (FIG. 30). The row count in register 257 of the Bottom Blank circuit determines whether the row count is greater than or equal to 2. The row count LSB data coupled from register 236 of the Row Count Matrix completes the condition (2) data for the equal to 1 state. Logic circuitry in block 261 confirms that at least 2 of the row counts exhibit a bit count of 1 or more before generating a signal to gate 262. Gate 262 then generates a signal when both conditions are satisfied. Again, see FIG. 31 for a conceptual understanding.

Selector 263 generates a continuous BOT BOUND signal unless font 7B is designated. In the case of 7B, the BOT BOUND signal is not conveyed from selector 263 and coupled to Character Found Conditions block 223 until conditions (1) and (2), above, are both satisfied.

Figure 33:
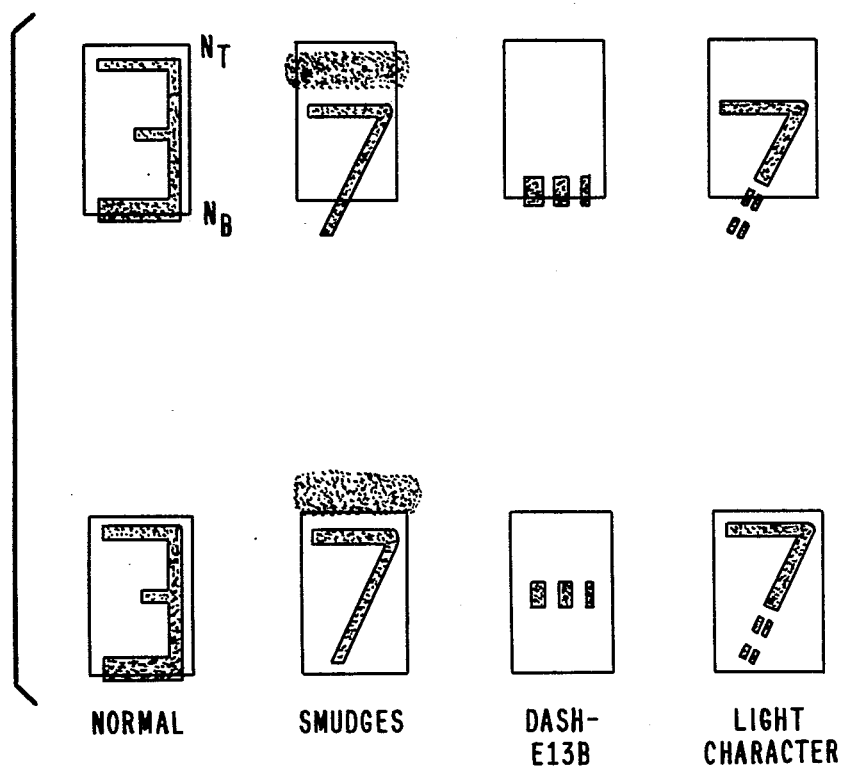
FIG. 33 schematically depicts the operation of the Y AXIS DET.

The purpose of Y AXIS DET block 220 in FIG. 17 is to impose additional conditions before establishing the vertical position for the character, the conditions being uniquely selected to conform with distinct characteristics of the specified fonts. The special conditions compensate for short characters, characters which are light at the top or bottom, or characters degraded by extraneous black data bits situated either above or below the character. Examples of representative defects are shown in FIGS. 31 and 33.

The four conditions used to satisfy the Y AXIS DET requirements are individually defined below. If any one of the four conditions are satisfied, a Y axis determination signal is sent from block 220 to Character Found Conditions block 223. The data used to evaluate the conditions is coupled from Row Count Matrix 204, Top Blank block 217, Bottom Blank block 218, and ADD/ block 206, in accordance with the rows prescribed.

Condition (1)—Top dirt elimination (all of the below).

(a) One of the bottom two rows (row 0 or −1) have less than 2 bits, i.e. BOT BNK.

(b) Row 1 count is greater than or equal to 2.

(c) Row 2 count is greater than or equal to 2.

(d) Row 15 count is greater than or equal to 2.

Condition (2)—Short character or light at the bottom (all of the below).

(a) One of the top two rows (row 20 or 19) is blank, i.e. TOP BNK.

(b) Row 6 count is greater than or equal to 2.

(c) Row 17 count is greater than or equal to 8 for all fonts except 7B. For 7B the count is greater than or equal to 4.

(d) Row 18 count is greater than or equal to 8 for all fonts except 7B. For 7B the count is greater than or equal to 4.

Condition (3)—Short symbol in E13B (a, b and c, OR d, below).

(a) Row 13 count is greater than or equal to 8, or row 12 count is greater than or equal to 8.

(b) Row 7 count is greater than or equal to 8, or row 8 count is greater than or equal to 8.

(c) Row 16 or row 15 are blank.

(d) ADD/ signal is absent.

Condition (4)—Window moving off character (all of the below).

(a) ADD/ signal is absent (row 20 count is less than row 1 count for E13B font and row 20 is less than row 3 count for all other fonts).

Figure 34:
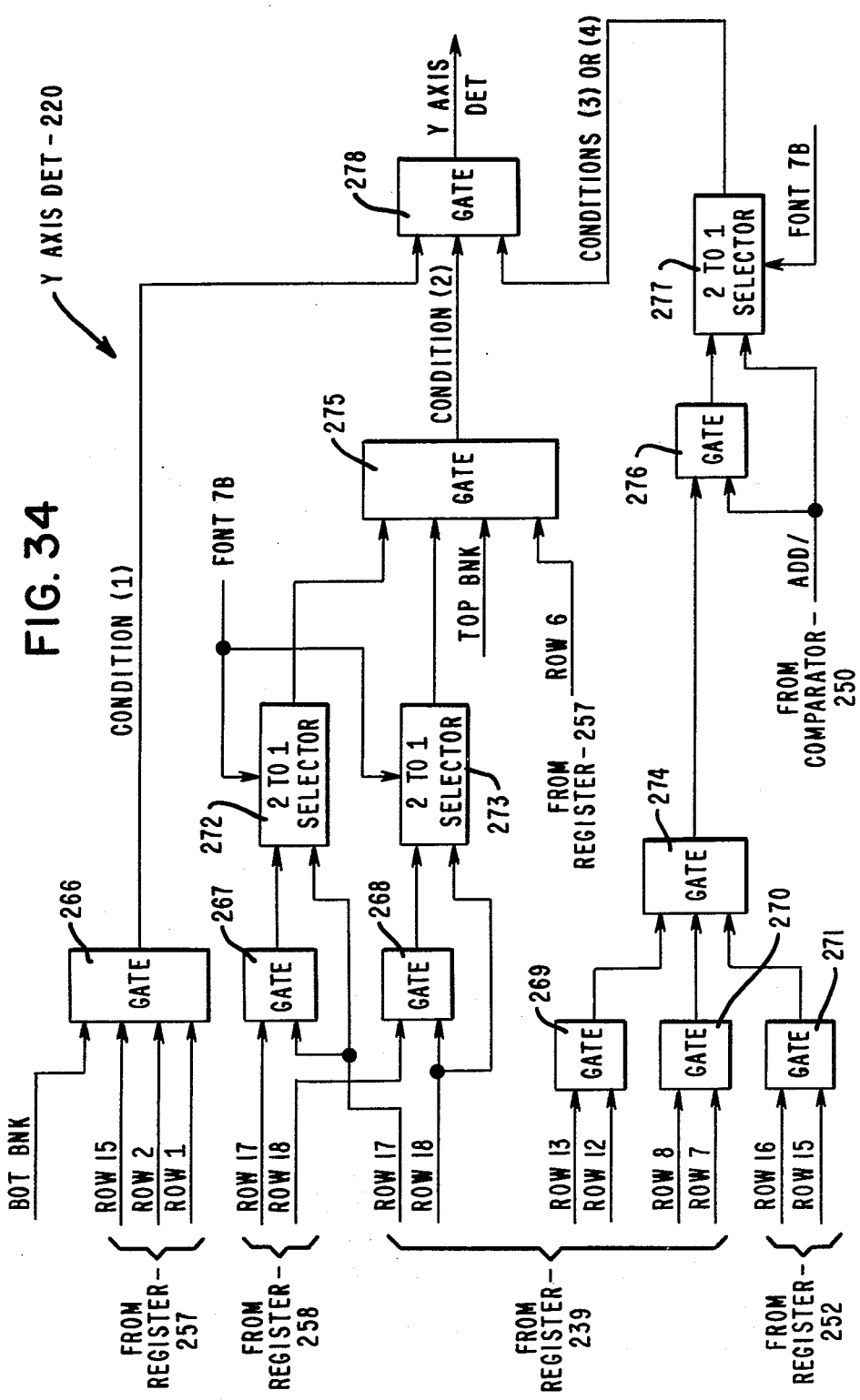
FIG. 34 is a schematic block diagram of the Y AXIS DET.

The combination of devices which embody the conditions described above is shown schematically in FIG. 34. In view of the immediately preceding descriptions, one skilled in the art can undoubtedly convert the four conditions into their circuit representations without undue effort. Therefore, the blocks in FIG. 34 will be described only in terms of their relationship to the conditions. Gate 266 determines whether Condition (1) has been satisfied. Gates 267 and 268 together with font controlled selectors 272 and 273, are coupled through gate 275 to do likewise for condition (2). The satisfaction of condition (3) is determined by gates 269, 270, 271, 274 and 276, which are combined with Condition (4) in selector 277 to generate a single output which corresponds to either condition. The outputs from the condition circuits are combined in gate 278 to generate a Y AXIS DET signal whenever any one of the conditions is satisfied.

At this point in the description of Finder board 15, one undoubtedly recognizes that the Top/Bottom White Boundary Conditions 216 may be satisfied before the window is optimally positioned. For that reason, it should be recognized that all the conditions, including the left/right boundary conditions which follow, must be satisfied simultaneously before a character is classified as being found. This consideration will become clear after the development of Finder Stop block 221 and Character Found Conditions block 223.

Attention is now directed to the grouping of conditions entitled Left/Right White Boundary Conditions, shown as block 208 on Finder board 15 in FIG. 17. As the block title suggests, these conditions evaluate the position of the character and window in terms of their relative horizontal displacement. Therefore, the analysis generally involves the evaluation of bits in the leftmost and right-most columns of the window. Included within block 208 are Compare LT & TOP block 209; Compare LT & RT block 210; Left Blank block 211; Right Blank block 212; Col 1, 2 Bit block 213; Hold block 214; and MOLTTEM block 215. Each will be described individually.

Figure 35:
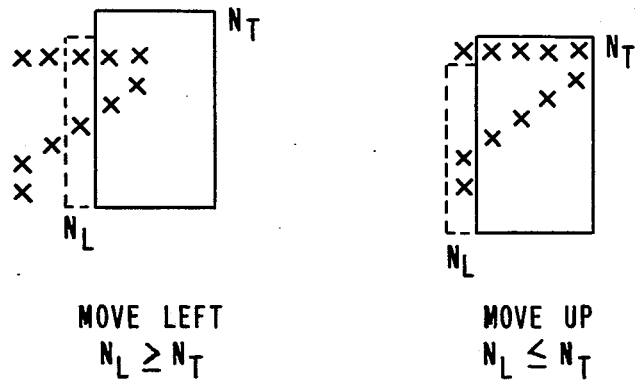
FIG. 35 schematically depicts the operation of the COMPARE LT and TOP.

Compare LT & TOP block 209 establishes another condition which is satisfied only when the character is positioned completely inside the window. FIG. 35 illustrates the condition applied to data bits representing the character "7." As the window moves upward and leftward, with respect to the figure, the number of bits in left column $N_L$, which would enter the window if it were to move one column to the left, is compared to the number of bits in the top row $N_T$. As long as $N_L$ is greater than or equal to both $N_R$ and $N_T$, the window is indexed to the left by appropriately inhibiting Finder Stop 221. When $N_L$ is less than $N_T$, Compare LT & TOP block 209 no longer affect the signal sent to Finder Stop/ block 221. However, it should be noted that Compare LT & RT 210 continues in effect in a manner to be described hereinafter.

The circuit structure of Compare LT & TOP block 209 is embodied in the schematic of FIG. 36. Data is coupled into shift register 282 from columns 12, 13 or 16 of Buffer Latch 202 through selectors 281 and 287. Column 16 is used for E13B font, column 13 for 1428 and column 12 for all others. New column bit data is entered into row 20 of shift register 282 as old data is shifted down through rows 3 and 1. Selector 283 chooses row 1 or 3 depending on the font. The bit values from logic block 284 actuate up/down counter 285 to maintain a running total. The total column count $N_L$ from counter 285 is then compared with the count $N_T$ for row 20 from Row Data Counter 203 in comparator 286.

Figure 37:
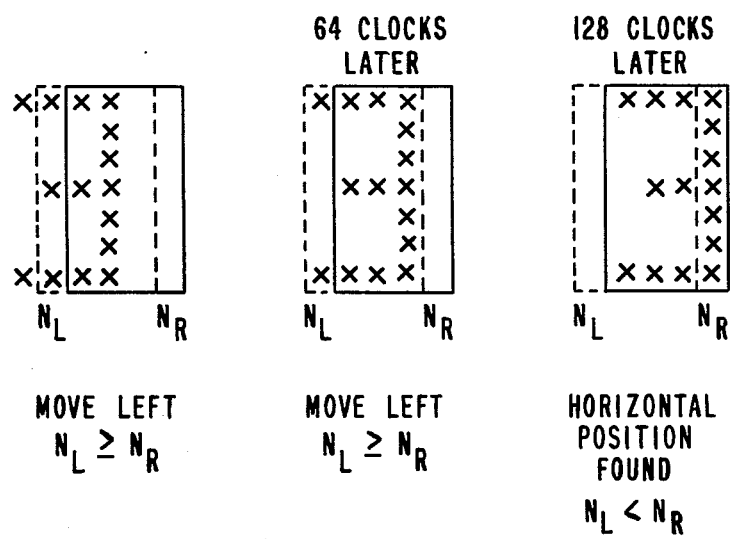
FIG. 37 schematically depicts the operation of the COMPARE LT and RT.

The succeeding condition established for the left and right edges of the window is Compare LT & RT block 210. The effect of the condition imposed by Compare LT & RT block 210 is schematically illustrated in FIG. 37 for the character "3." In operation, the Compare LT & RT condition is similar to the Compare LT & TOP condition. In the case of Compare LT & RT, the number of bits that would enter the window if it were to move one column to the left is compared to the number of bits in the right column $N_R$, that would leave the window with such a move. When $N_R$ is greater than $N_L$, the right edge of the window is situated over the right edge of the character and the horizontal position of the character is considered to be established.

Figure 38:
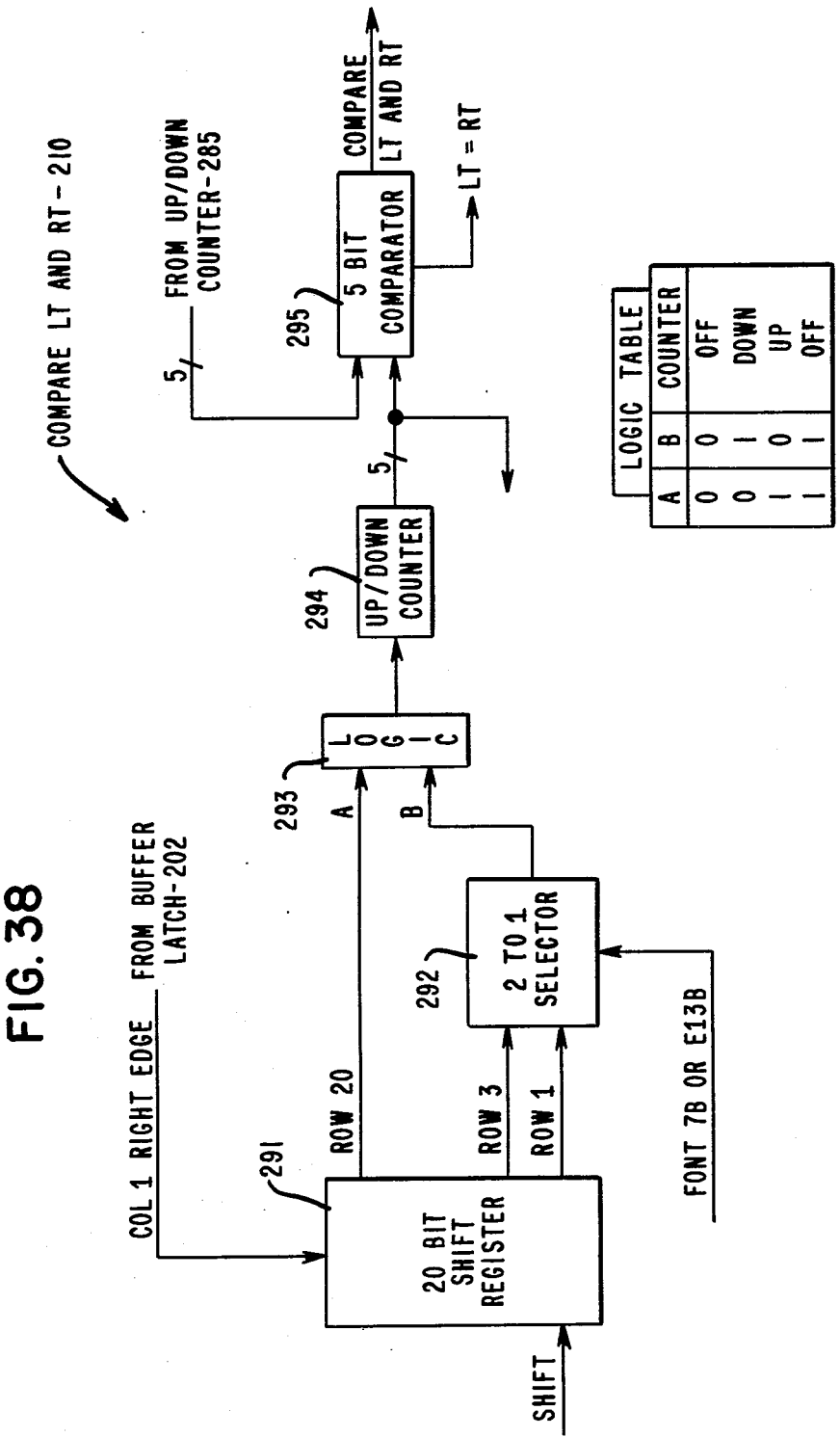
FIG. 38 is a schematic block diagram of the COMPARE LT and RT.

The circuit structure of Compare LT & RT block 210 is embodied in the schematic of FIG. 38. Black bit data is received from column 1 of Buffer Latch 202 and entered into row 20 of shift register 291 as old data is shifted down through rows 3 and 1. Selector 292 chooses row 1 or 3 depending on the font. The bit value from logic block 293 actuates up/down counter 294 to maintain a running total. The total column count $N_R$ from counter 294 is then compared with the count $N_L$ from up/down counter 285 of Compare LT & TOP block 209 in comparator 295.

The next condition is evaluated in Left Blank block 211. The condition imposed by block 211 is used only for the 7B font. Functionally, the block examines the four columns to the left of the window, in this case columns 12-15, to determine whether at least one is completely blank. The presence of a blank column left of the window indicates that the data within the window represents a character rather than a horizontally oriented smudge. The LT BLANK signal generated by block 211 is coupled to Character Found Conditions block 223.

A circuit embodying the conditions in Left Blank block 211 is schematically depicted in FIG. 39. Column data from column 15 of Buffer Latch 202 is shifted into register 296. Gate 297 monitors the data from rows 2-17 to detect one or more black data bits. The outputs from shift register 298 and gate 297 are entered into gate 299 to determine if any one of the four columns have no black bits. If the condition is satisfied, an LT BLANK signal is generated by gate 299.

The next block in the group of conditions generally designated as the Left/Right White Boundary Conditions is Right Blank 212. The operation of Right Blank 212 is similar to that one ascribed to Left Blank 211, described in the immediately preceding paragraphs. Again, the block is active for 7B font characters only, and seeks to establish a condition which insures that the window is positioned over the character. However, Right Blank 212 also performs some additional functions. First, it verifies that the window has completely left the previous character, by the presence of at least one blank column. Second, the right blank block avoids premature actuation of the RECOGNITION START signal when encountering smudges that are oriented horizontally.

An embodiment of Right Blank block 212 is shown in FIG. 40. When compared to Left Blank 211 in FIG. 39, it is apparent that the two are relatively similar, differing primarily in the column of the data entered for examination and the rows examined for blank columns. In this case columns 0, −1, −2 and −3 are being examined. In view of the similarities, further development of the circuit operation is unwarranted.

Returning to FIG. 17, Column 1, 2 Bit block 213 is shown as the next in the grouping of conditions. This block contributes to the Finder board operation by preventing erroneously perceived detections of a character's right edge. It is important during recognition that the right edge of the window be substantially aligned with the right edge of the character. Consequently, the finder must be capable of recognizing and ignoring extraneous black data bits generated by marks, dirt or smudges which lie to the immediate right of the character. This condition is imposed by Column 1, 2 Bit block 213 for all fonts but 7B.

The operation of block 213 differs depending on the character font. In E13B font, the data in columns 1 and 2 of the window is examined for the presence of consecutive black bits in any row of rows 3-17. In fonts other than E13B, the consecutive black bit condition is applied to rows 3-16, and then only when the window count equals or exceeds 64. When consecutive bits are found, the Column 1, 2 Bit condition is satisfied and the character found condition is allowed in accordance with the remaining conditions. The absence of consecutive bits inhibits the finding of a character. The implementation is shown in FIG. 41.

Figure 41:
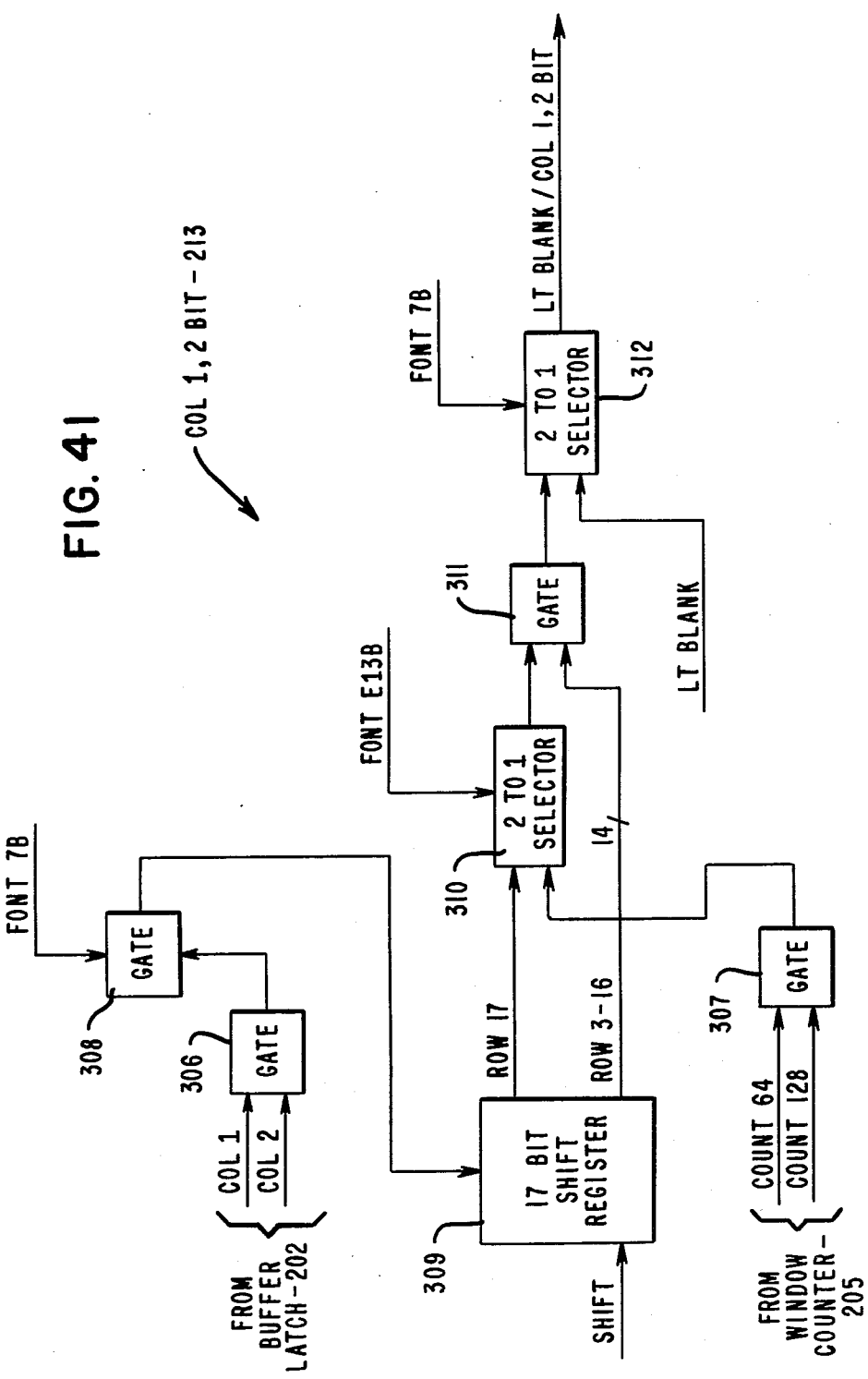
FIG. 41 is a schematic block diagram of the COL 1, 2 BIT.

FIG. 41 shows that black bit data from column 1 and 2 of Buffer Latch 202 is coupled to gate 306. If both columns contain a black bit of data, a signal is passed through gate 308 and is serially shifted into register 309. A count of 64 or more bits in window counter 205 actuates gate 307. For E13B font gate 311 examines rows 3-17 for consecutive bits. For other fonts, the signal from selector 310 conditions the examination of rows 3-16 on the presence of 64 or more bits in the window. Column 1, 2 Bit block 213 and Left Blank block 211 are alternately coupled to Character Found Conditions block 223, with the COL 1, 2 BIT signal connected for fonts other than 7B.

Figure 42:
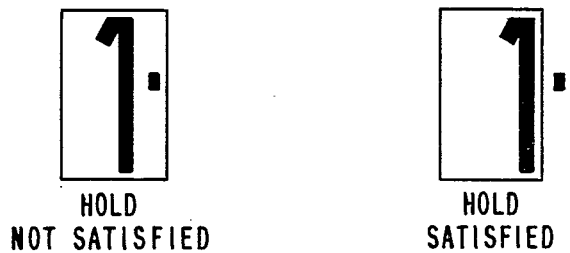
FIG. 42 schematically depicts the operation of the HOLD.

The next condition in the group under consideration is shown in FIG. 17 as Hold block 214. The fundamental purpose of the block is to further ensure that the right edge of the character is located correctly with respect to the right edge of the window. In particular, Hold block 214 is designed to properly locate characters that are narrow in relative size (for instance the character "1" in OCRB), are relatively dark in print, and are contaminated by random bits to the immediate right of the character. An example of the hold function is illustrated by the position of a window about the character "1" in FIG. 42.

Hold block 214 is disabled for 7B font. For other fonts, block 214 examines the right column count, the window count, and the direction the window count is progressing, to establish three conditions. If the three are satisfied, the window counter is indexed to the left. The conditions are as follows:

Condition (1)—Column 1 has 1 bit.

Condition (2)—The window count is greater than or equal to 64.

Condition (3)—The window count is decreasing.

Figure 43:
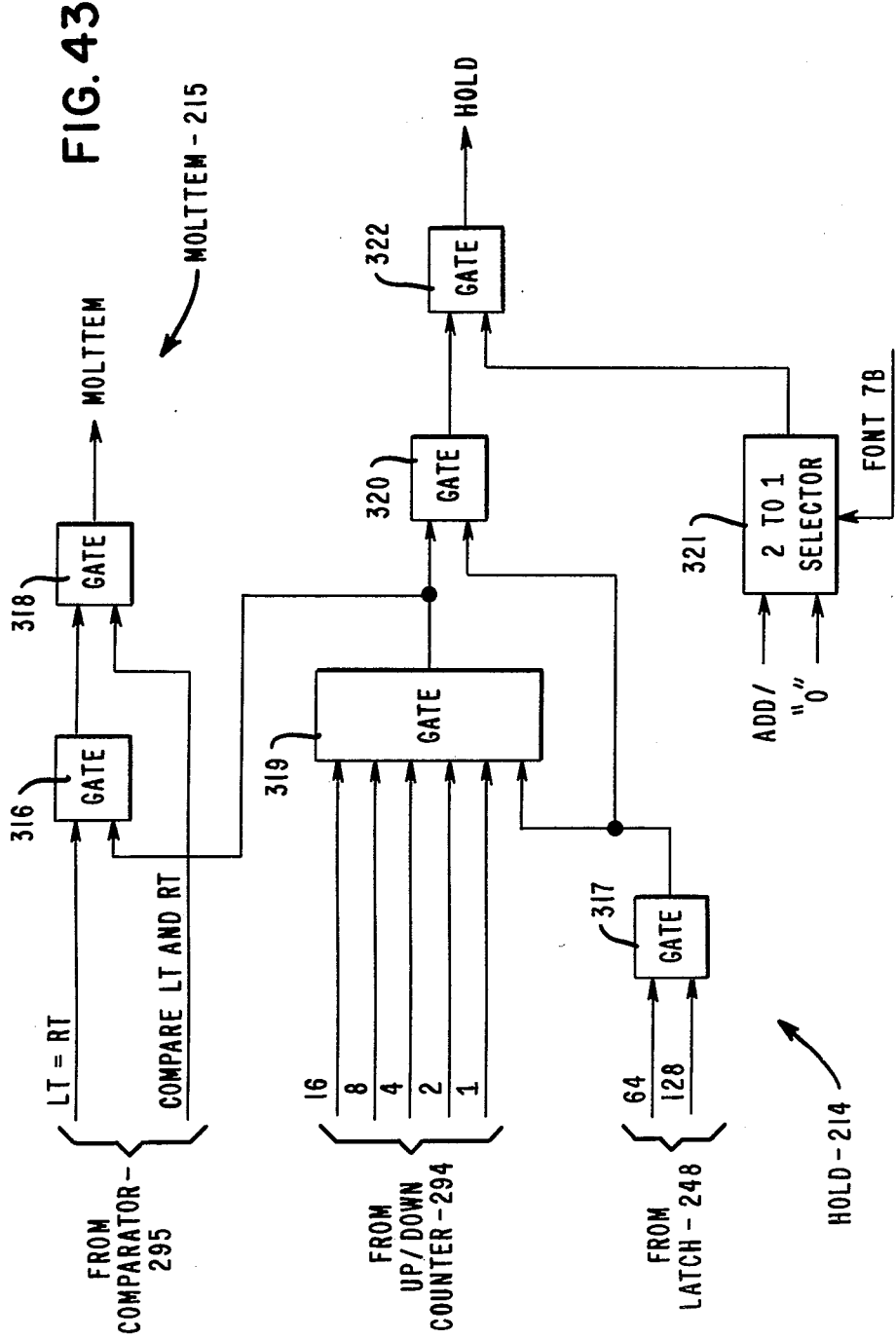
FIG. 43 is a schematic block diagram of the HOLD and the MOLTTEM.

The circuit by which these features are implemented is shown in the lower section of FIG. 43. Condition (1) is established in gate 319, which analyzes data from up/down counter 294 of Compare LT and RT block 210. An output is generated when there is only one black bit in column 1. Condition (2) is introduced by gate 317. The signal coupled to gate 317 is derived from latch 248 in Window Counter 205. The first two conditions are combined in gate 320, and further combined in gate 322 with the constraint of condition (3) to generate the HOLD signal. Condition (3) essentially corresponds to the signal from the ADD/ block 206. Selector 321 serves to introduce condition (3) or inhibit the HOLD signal, depending on whether font 7B is selected.

The move left temporarily (MOLTTEM) condition depicted by block 215 in FIG. 17 also aids in the horizontal positioning of the window's right edge with respect to the character. MOLTTEM block 215 prevents the generation of the RECOGNITION START signal when neither one of the following conditions is satisfied:

Condition (1)—LT is less than RT.

Condition (2)—LT is equal to RT and either:

(a) Column 1 count is greater than 1, or (b) Column 1 count is equal to 1 and the window count is less than 64.

If either condition is satisfied, the MOLTTEM block 215 sends a signal to Character Found Conditions block 223 to otherwise allow the generation of RECOGNITION START signal.

A circuit schematically illustrating an embodiment of the MOLTTEM condition appears in the upper region of FIG. 43. Note, however, that logic operations to evaluate the MOLTTEM conditions are partially performed in an area of the circuit corresponding to HOLD block 214. Condition (1) is considered by the Compare LT & RT input to gate 318. Condition (2) is evaluated in gate 316 and thereafter combined with condition (1) in gate 318. The LT=RT signal to gate 316 originates with comparator 295 in Compare LT & RT block 210 (FIG. 38). Condition (2) is generated by gate 319 in the Hold block. The selective choice of negative and positive logic to generate the described combinations of responses is undoubtedly within the understanding of one skilled in the art.

Attention is now directed toward the ±5 Y Axis Bits (PM5) block, shown at reference numeral 224 in FIG. 17. The purpose of PM5 is to assist in the vertical positioning of the window over the character. The operation of this block relies upon known printing tolerances to locate successive characters within the same field of the scan band. Before the first character is found, PM5 is inactive. Once a character is located, and recognized correctly, the vertical coordinate (Y direction) of the character is referenced to PM5 block 224. The next character in the same character field can then be found only if its Y coordinate is within a tolerance of ±5 of the preceding character. If the new character is suitably located and recognized, the PM 5 block latches the reference point for the Y coordinate to the position of the new character. The process is repeated successively for each character in the same character field to prevent smudges from being mistaken for valid characters.

If the first character is found but not recognized, PM5 block 224 is not activated. In that situation, the following character is treated as the first character in the field. PM5 224 is also deactivated between character fields by the BLK CLK signal from Enhancement board 13.

Figure 44:
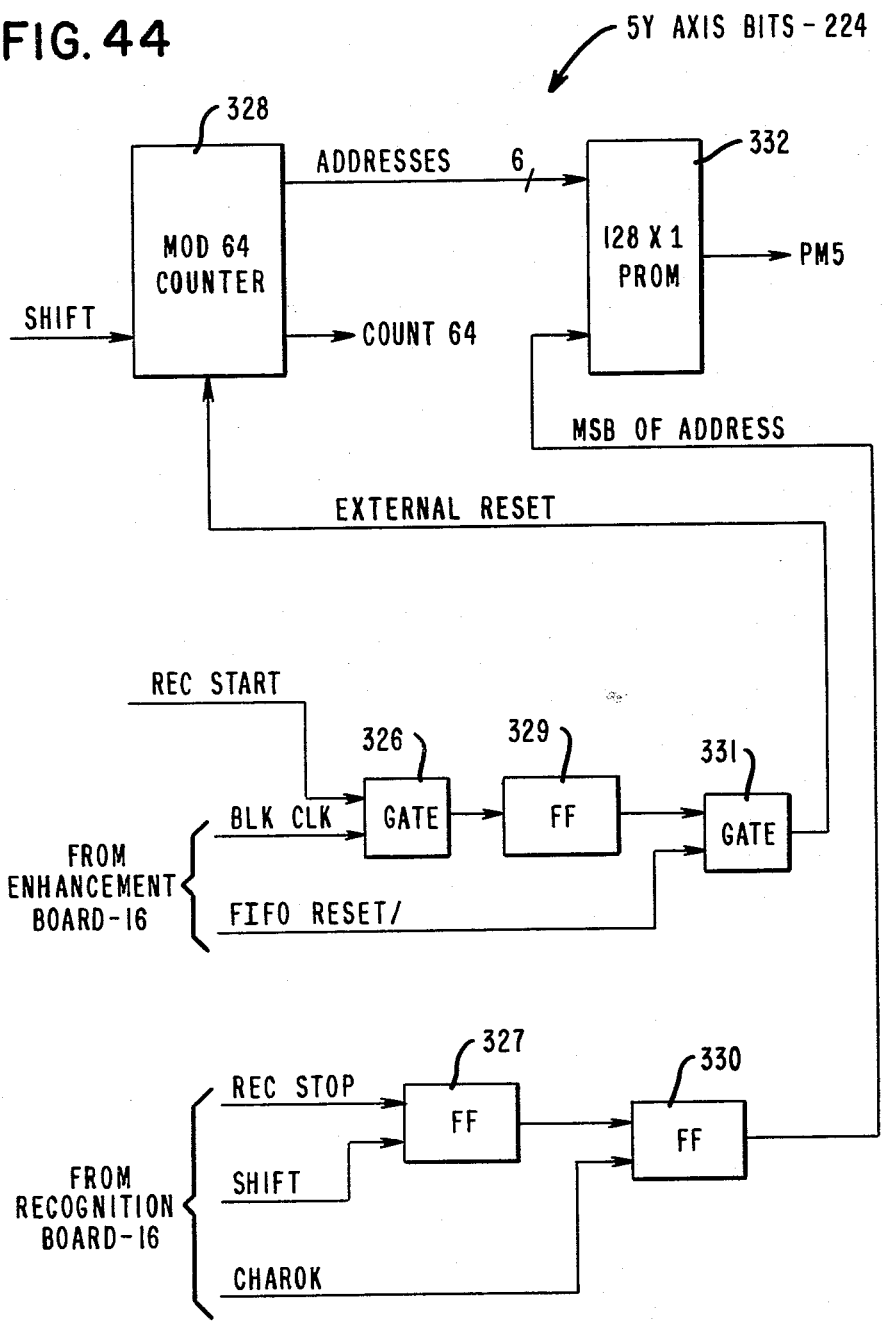
FIG. 44 is a schematic block diagram of the ±5Y AXIS BITS.

A circuit which embodies the functions ascribed to PM5 block 224 is shown schematically in FIG. 44. The circuit counts 64 movements of the window, corresponding to the length of a column in the scan band, from the point the last character was found. The PM5 signal is generated only when the window is within ±5 bits of the previous vertical position. The signal is created through a novel combination of a counter and a PROM.

In FIG. 44 MOD 64 counter 328 sums the shift pulses until it accumulates a count of 64. On count 64 counter 328 resets and generates a count 64 signal coincident with the trailing edge of the SHIFT signal. Note that counter 328 also has an external reset line which is accessed by gate 331. The output of counter 328 serves as an address for PROM 332, in such a way that the 6 lines from counter 328 address PROM locations 1–64. The remaining addresses in PROM 332, numbered 65–128, are accessed only when a signal appears on the higher memory select line from FF330. The data in the various addresses of PROM 332 are summarized in Table III.

TABLE III

| Address | Stored Data Bit | Y Axis Position | Operating Period | PM5 |
| --- | --- | --- | --- | --- |
| 1–64 | 1 | 1–64 | Before recognizing first character | Enabled |
| 65–69 | 1 | Y + 5 bits | After recognizing first character | Enabled |
| 124–128 | 1 | Y − 5 bits | After recognizing first character | Enabled |

TABLE III-continued

| Address | Stored Data Bit | Y Axis Position | Operating Period | PM5 |
| --- | --- | --- | --- | --- |
| 70–123 | 0 | Other than Y ± 5 bits | After recognizing first character | Disabled |

Before the first character in a field is found and recognized, the MSB (most significant bit) limits the addresses to the range of 1–64. For that group of addresses, the PM5 output from PROM 332 is 1, irrespective of the actual count. The recognition of the character is evidenced by the signal CHAROK coupled into FF330. FF330 is clocked by FF327, which is itself clocked when the recognition process is completed by the concurrence of the REC STOP and SHIFT signals at FF327. A switch in the state of FF330 changes the MSB of the address line to PROM 332, effectively switching the data fields scanned by the addresses generated in counter 328. Thereafter, counter 328 scans PROM addresses 65–128. From Table III it is apparent that the PROM output now varies in relation to the PROM address generated in counter 328.

Blocks 326, 329 and 331 reset counter 328 to coincide with the Y axis position of the first recognized character. In effect, this makes Y, from Table III, equal to 1 for that Y axis position. The MOD 64 organization of the counter ensures consistency of the designated Y position from column to column. A REC START or BLK CLK signal into gate 326 switches FF329 to reset counter 328 if a FIFO RESET/ signal is absent. This guarantees that the counter is reset to the Y axis position as each successive character is recognized.

Finder board 15 also contains a Recognition Delay circuit, shown as block 222 in FIG. 17. The function of block 222 is to allow the window to move off a currently found character without refinding that same character. For present purposes, a delay of 16 columns is suitable with E13B font, 13 for 1428 font, and 12 for all other fonts.

Figure 45:
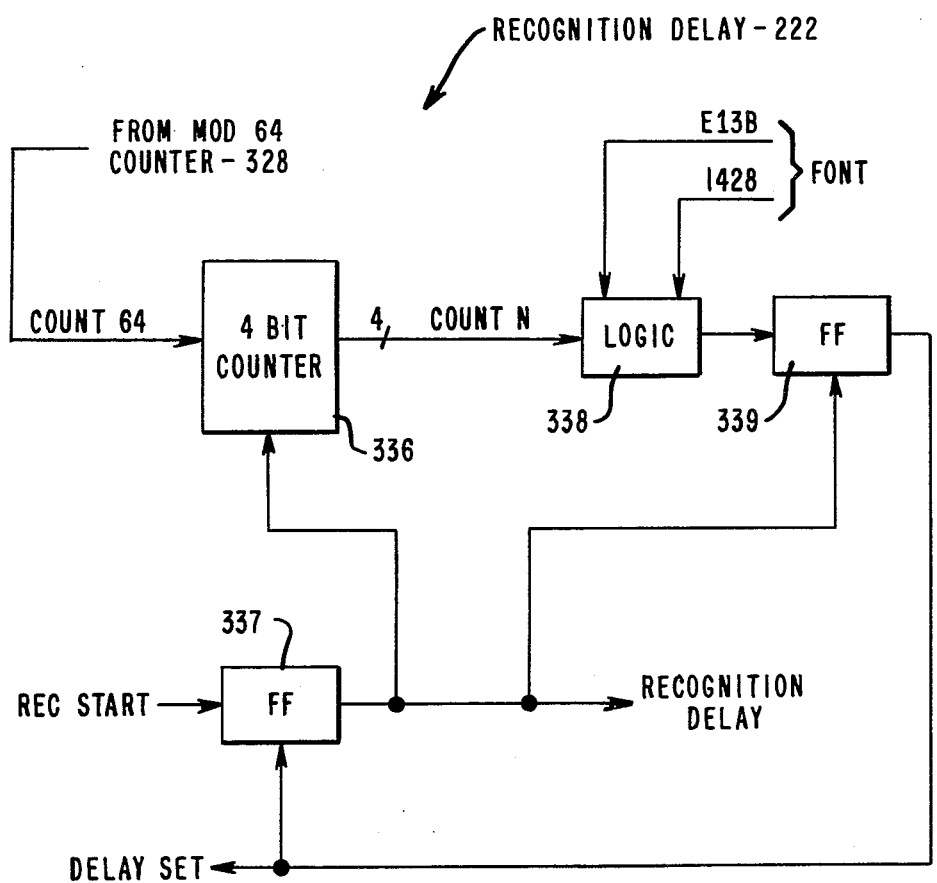
FIG. 45 is a schematic block diagram of the RECOGNITION DELAY.

The operation is best described with reference to the embodying schematic illustrated in FIG. 45. The circuit is inoperative until the REC START signal switches FF337 to reset and enable counter 336 and FF339. Counter 336 is then incremented by count 64 signals from counter 328 of ±5 Y Axis Bits block 224 until logic block 338 detects a count equal to the number established for the selected font. Thereupon, logic block 338 switches FF339 which in turn resets FF337 and terminates the recognition delay signal.

The last conditional block on Finder board 15 is Finder Stop/, 221 (FIG. 17). Its purpose is to merge a number of conditions together and generate a FINDER STOP/ signal when the correct sequence and combination occurs. When the FINDER STOP/ signal is generated, Character Found Conditions block 223 disregards all conditions that it has been detecting until the window moves left to the next column. This is achieved by sending the FINDER STOP/ signal to Character Found Conditions block 223 to inhibit the generation of the RECOGNITION START signal. The FINDER STOP/ signal is reset after 48 SHIFT signals.

Figure 46:
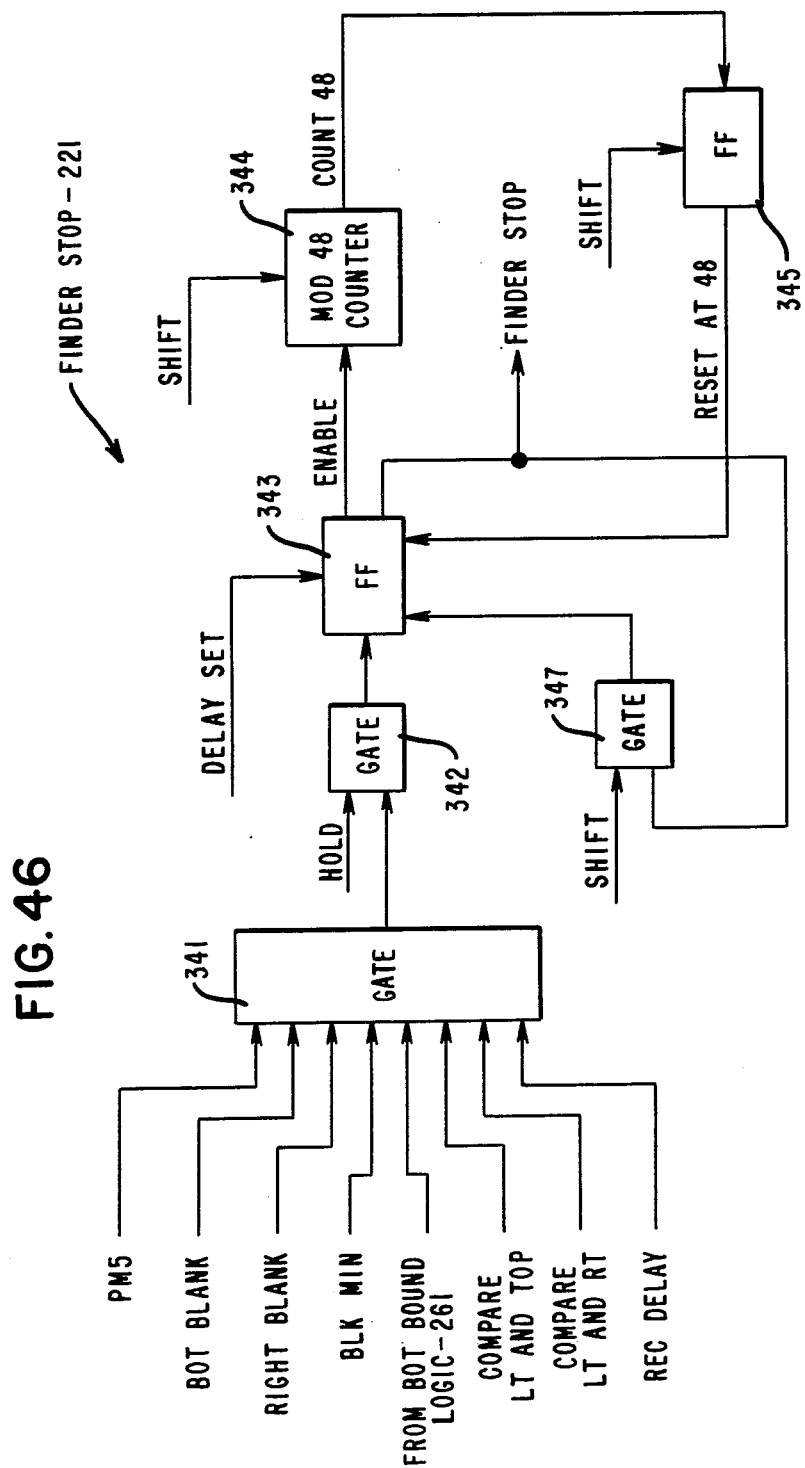
FIG. 46 is a schematic block diagram of the FINDER STOP/.

FIG. 46 contains an arrangement of devices which embody the features ascribed to Finder Stop block 221. The conditions which results in a leftward movement of the window are shown as inputs to gate 341. The signals which must be concurrently present are: PM 5, BOT BLANK, RT BLANK (for 7B font only), BLK MIN, BOT BOUND from logic 261, COMPARE LT & TOP, COMPARE LT & RT, and RECOGNITION DELAY. Thereafter, the output from gate 342 creates the FINDER STOP/ signal by switching FF343. The FINDER STOP/ signal initiates a delay of 48 SHIFT pulses through the combination of MOD 48 counter 344 and FF345. In operation, the switching of FF343 disables gate 347 and enables counter 344. Upon reaching count 48 an output signal is provided to FF345, which resets 343 and enables gate 347.

It should be noted that the embodiment in FIG. 46 shows two other signals which can cause the generation of a FINDER STOP/ signal. The first is the HOLD signal at one input to gate 342. The FINDER STOP/ signal is generated one shift after the Hold signal goes active. The second signal is DELAY SET, coupled to the SET input of FF343 from FF339 in FIG. 45. The FINDER STOP/ signal generated by the DELAY SET signal allows Character Buffer 352 (FIG. 50A) on Recognition board 16, described hereinafter, to be cleared immediately after the recognition process is completed. Thereby, as the window moves left to the next column, the data inside window and the data in Character Buffer 352 are identical.

Figure 47:
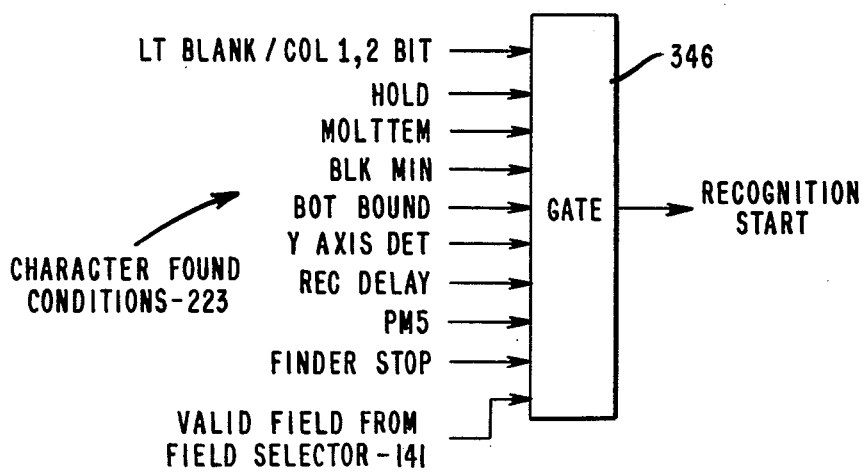
FIG. 47 is a schematic block diagram of the CHARACTER FOUND CONDITIONS.

The description of Finder board 15 is completed with block 223, entitled Character Found Conditions. Reference to FIG. 47 indicates that block 223 constitutes a single gate, 346, for simultaneously detecting the multitude of signals representing the conditions imposed by Finder board 15. The output signal from gate 346, RECOGNITION START, is conveyed to Recognition board 16 to indicate that a character has been located and that the recognition process should start. It will, no doubt, be appreciated that synchronism in the data transfer and simultaneity of processing allows Recognition board 16 to concurrently operate on exactly the same data.

As one would normally anticipate, the embodying OCR Reader System is undergoing evolution to improve its performance. Considering the critical importance of Finder board 15 to the system's operation, it may be worth noting that certain refinements appear to improve the character location qualities of the board. Nevertheless, the viability of the refinements will only be substantiated at the conclusion of exhaustive empirical analysis.

One refinement involves a Right Edge condition, which evaluates: (1) 4 columns of data at the right edge of the window for the presence of 4 or more black data bits, (2) the presence of a Right Blank condition according to its new implementation, and (3) the absence of the Left Blank condition. The proposed Right Edge condition would be coupled to Character Found Conditions block 223 through an OR gate with the FINDER STOP/ signal.

Another refinement under consideration is generally known as a Closeness of Characters condition. It would ensure that the window does not attempt to recognize defective characters, such as might be created the closely spaced or touching characters. The circuit by which the Closeness of Characters condition is evaluated generally determines when the data satisfies either one of two requirements: (1) a new implementation of the Right Blank condition, or (2) a total absence of bits in column 14. It should be noted that the two Closeness of Character conditions would be evaluated only after both the BLK MIN and Y AXIS DET conditions were satisfied. Until one requirement was satisfied, the finding of a character would be inhibited.

The new Right Blank condition would require that there be less than 4 bits in any one of the columns numbered 0, −1 and −2.

It is also proposed that MOLTTEM block 215 be deleted. The HOLD block would then be reconstructed as part of the Finder Stop/ block, which would also allow the FINDER STOP/ signal to be generated one SHIFT signal later.

The last refinement being favorably considered involves a circuit to satisfy a Continuous Right Edge condition. The condition would eliminate the possibility of having an erroneously positioned character when the immediately preceding character is exceptionally wide. Generally, columns 1–4 of the window would be examined to ensure that each has 1 or more black bits before a character could be found. The number of columns to be examined for this condition would vary with the font selected.

RECOGNITION BOARD

Reference is again made to FIG. 1, showing the composite of the OCR Reader System. With the description of Finder board 15 completed, the ensuing remarks will include both a general and specific description of Recognition board 16. One should not overlook the copending application noted and incorporated hereinbefore, to aid in understanding some aspects of the operations performed by the Recognition board.

Recognition board 16 receives data in parallel format from Buffer Latch 202 of Finder board 15 (FIG. 17). The DATA signals, corresponding to individually found characters, are stored in a 32×15 buffer. To identify characters, the Recognition board uses a template matching technique which recirculates the buffered data from bottom to top while comparing sets of data, one set representing the character perceived on the document and the other set representing stored templates of character patterns by font.

The logic which compares the character data and template data evaluates each data bit, at each of 4 shifted positions for each template, to determine the best match. Thereafter, the logic verifies that the mismatch of the best match is below a threshold, and further, that there is sufficient separation between the templates having the best match and the next best match. Upon satisfaction of the recognition condition, a binary code representing the recognized character is sent to the OCR Reader System Interface board, 17 (FIG. 1).

The sizes of the template data matrices and character data matrices undergoing comparison vary with the font. Table IV contains a summary of the preferred sizes.

TABLE IV

| OCR Font | Template Data Matrix Size (col × rows) | Character Data Matrix Size (cols × rows) |
|---|---|---|
| OCRA | 10 × 16 | 11 × 17 |
| OCRB | 10 × 16 | 11 × 17 |
| 1403 | 10 × 16 | 11 × 17 |
| 7B | 10 × 18 | 11 × 19 |
| E13B | 14 × 18 | 15 × 19 |
| 1428 | 11 × 17 | 12 × 18 |

Note that the template data matrices are always smaller by 1 row and 1 column than the character data matrices.

The preferred shifting and comparison operation is described by way of the illustration in FIG. 48. The white squares represent the template data bits (5×5 matrix) while all the blocks together, white and shaded, represent the elements in the character data matrix (6×6 matrix). The shaded areas constitute "don't care" bits for the particular shift position. The shift sequence is also illustrated in the figure, showing the succession of 4 template data positions for a single matrix of character data.

Figure 49:
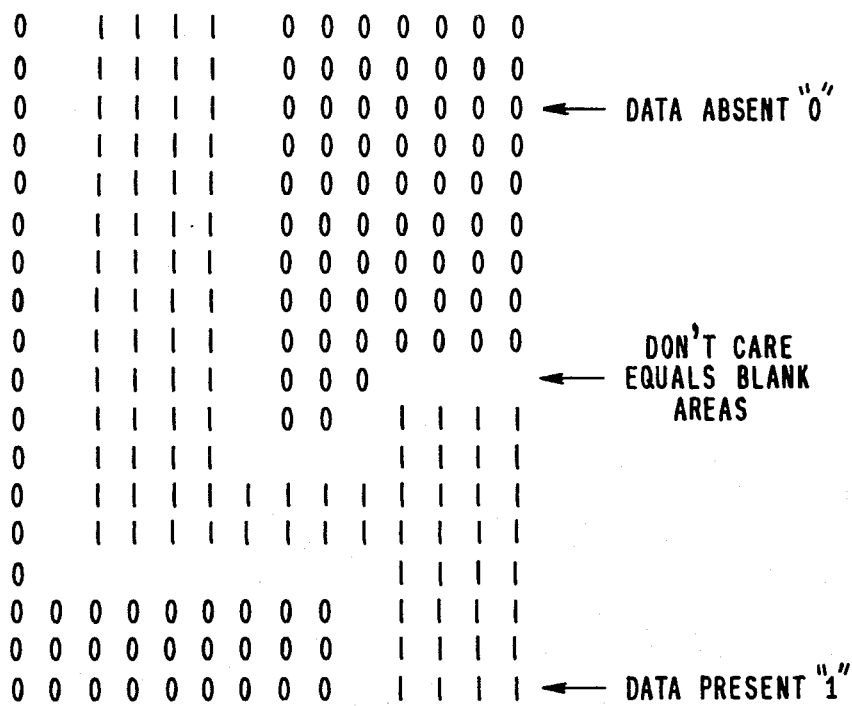
FIG. 49 schematically depicts a template from the Recognition board.

A greater conceptual appreciation for the organization of an actual template matrix may be gleaned from FIG. 49. This figure illustrates the number "4" in E13B font, schematically depicted with appropriately positioned binary and "don't care" (DC) data bits.

For each shift position in FIG. 48 (1-4), the template data bits and character data bits are compared using truth table V. The number of mismatched data bits is totalled for each shift position, generating 4 number totals for each template.

TABLE V

| Bit In Data Matrix | Bit In Template Matrix | Mismatch |
|---|---|---|
| 1 | 1 | No |
| 1 | 0 | Yes |
| 1 | DC | No |
| 0 | 1 | Yes |
| 0 | 0 | No |
| 0 | DC | No |

The overall comparison operation performed by Recognition board 16 includes three steps beyond the shifting and comparison operation described immediately above. The composite of all steps may be summarized as follows:

Step 1
The template data matrix is compared and shifted four times over the character data matrix to generate four numbers, each representing the total mismatches for that shift position.

Step 2
The minimum of each set of four numbers per template is determined and stored with its template reference.

Step 3
The numbers stored in step 2 are compared to determine the overall minimum and next minimum values.

Step 4
The minimum and next minimum values are compared to prescribed threshold numbers to further increase the confidence level. Namely, the minimum number of mismatches must be less than a value $X_1$ and the difference between the minimum number and the next minimum number must exceed a value $X_2$. Numbers $X_1$ and $X_2$ are individually selectable to suit the particular needs of the system or font, preferably lying in the range of 44 and 5 for $X_1$ and $X_2$, respectively.

Figure 50A:
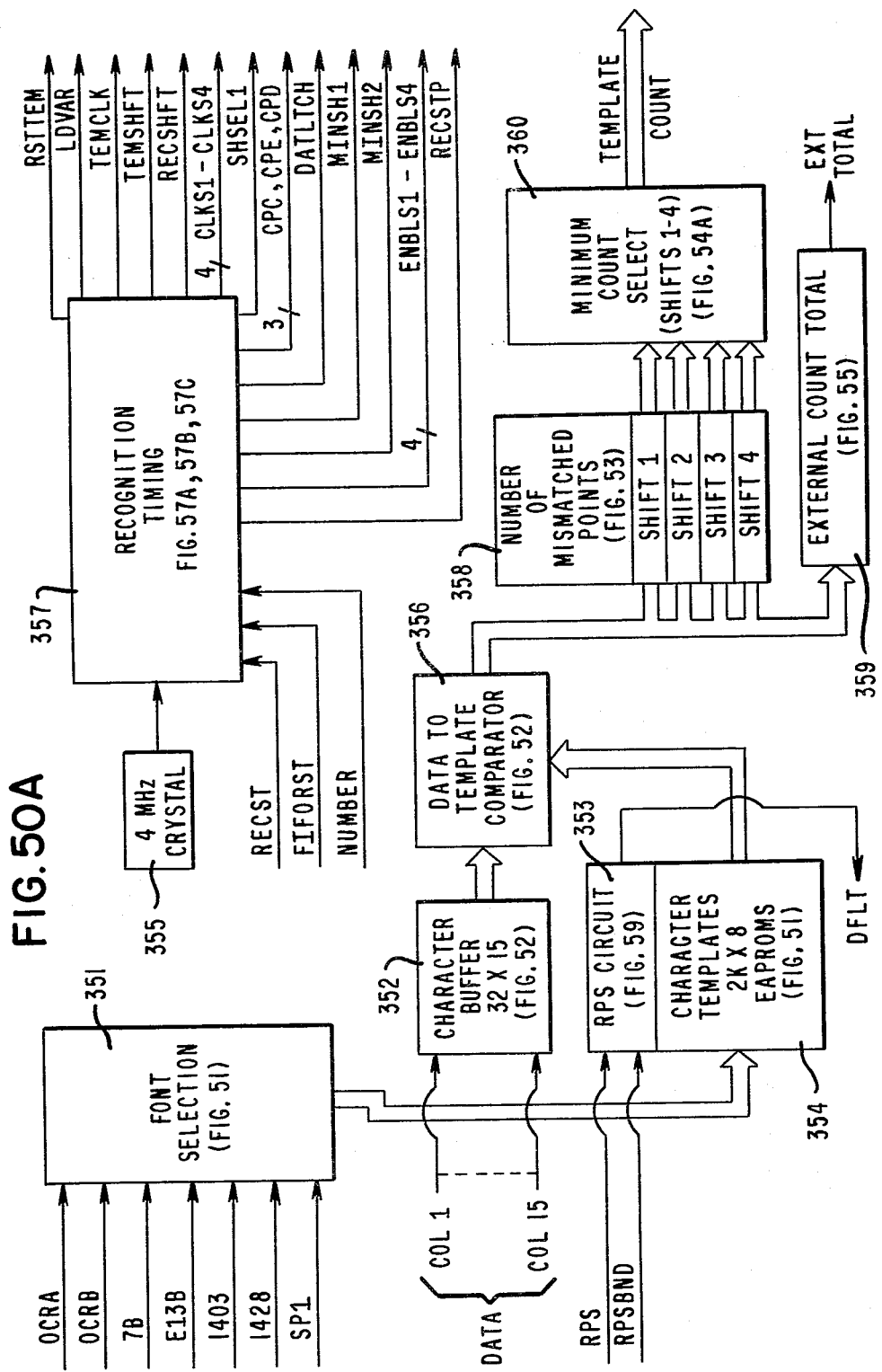
FIGS. 50A and 50B together comprise a composite schematic block diagram of the Recognition board.
Figure 50B:
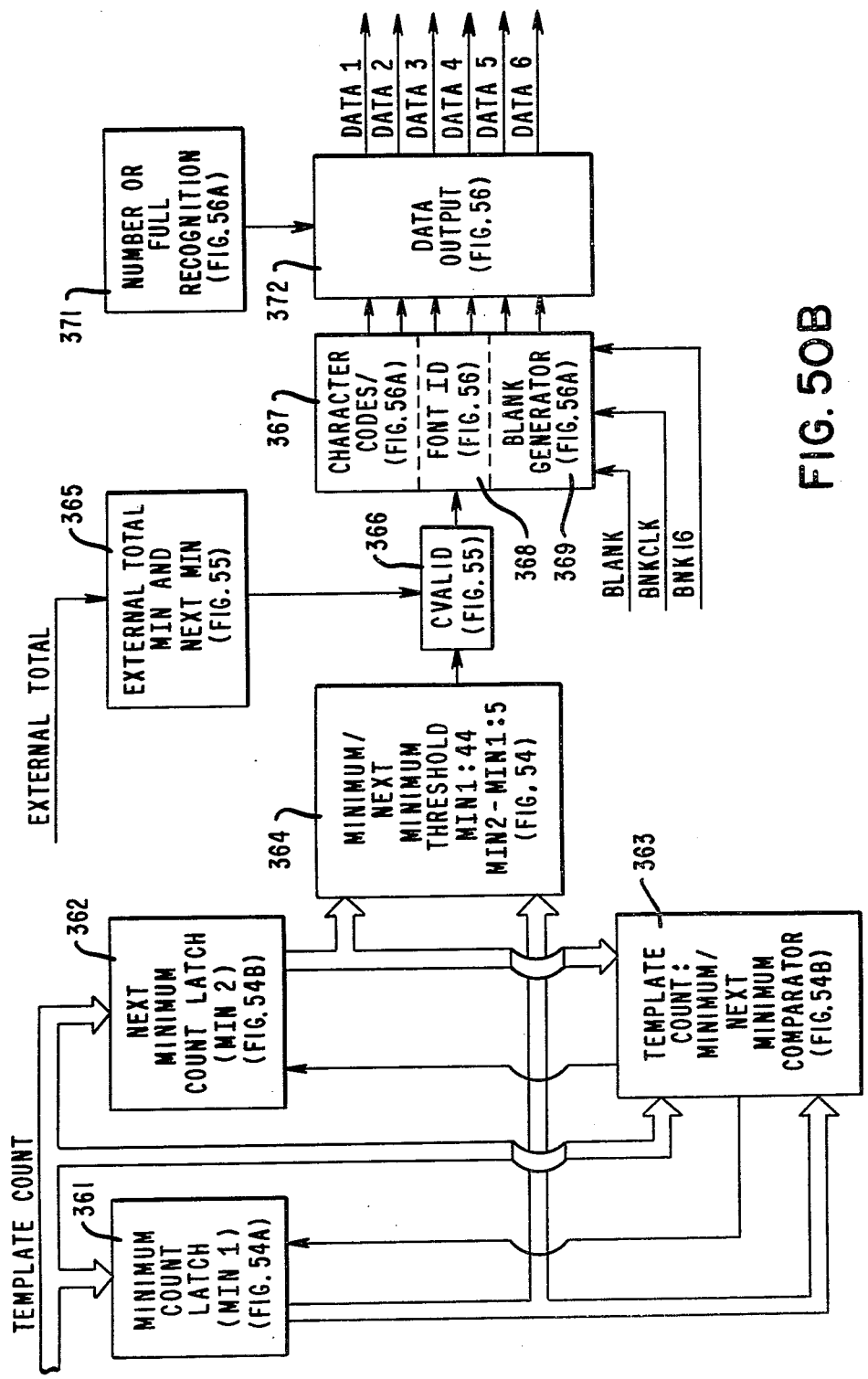

FIGS. 50A and 50B of the drawings develop Recognition board 16 in terms of its functional blocks. The blocks include the figure number of the drawing sheet which illustrates the block by way of electrical circuit devices. In some cases more than one figure is utilized per block, while other figures incorporate the functions of more than one block. In the former situation, the multiple figure numbers are noted on the functional blocks. In the latter case, the figures themselves are segmented by dashed lines and segment labels corresponding to the functional blocks in FIGS. 50A and 50B. The division of the functional blocks in a figure, or between figures, is indicated by the use of the term "part." Figures which are closely related in function are distinguished by a letter following the figure number. Consistency of reference numerals and signal labels is retained throughout.

Referring to FIGS. 50A and 50B, it is shown that columns 1-15 of DATA signals from Finder board 15 enter Character Buffer 352. The font selection information enters block 351 and is then utilized to prescribe the templates from block 354. The template data is compared to the 15 columns of character data in buffer 352 by comparator 356 for each of the four shifted positions. The mismatch data for the four comparisons is stored in block 358 and selected by block 360. Comparison data from comparator 356 is also coupled to block 359, for subsequent comparison in block 365 to another pair of threshold conditions. If these conditions are satisfied, block 366 generates a signal irrespective of the output from block 364.

Also shown in FIG. 50A are blocks relating to the RPS mode and recognition timing operations. The RPS mode of operation is regulated by signals in block 353, which generate a DFLT signal when no RPS character is recognized. The recognition timing is performed by block 357, utilizing a distinct 4 MHz crystal, 355.

In FIG. 50B, the template count selected by block 360 (FIG. 50A) constitutes the input to latch 361, latch 362 and comparator 363. The signal lines from comparator 363 to each of the latches appropriately activates the respective latch when the comparison establishes the minimum number of mismatches and the next minimum number of mismatches, respectively referred to as the minimum mismatch count (MIN 1) and next minimum mismatch count (MIN 2). MIN 1 and MIN 2 are further compared in block 364 to insure that they satisfy the threshold requirements, before being coupled via block 366 to the control group comprised of block 367, 368 and 369. Additional block 371 controls the transmission of coded data representing the recognized character from data output block 372 to OCR Interface board 17 (FIG. 1).

Figure 57A:
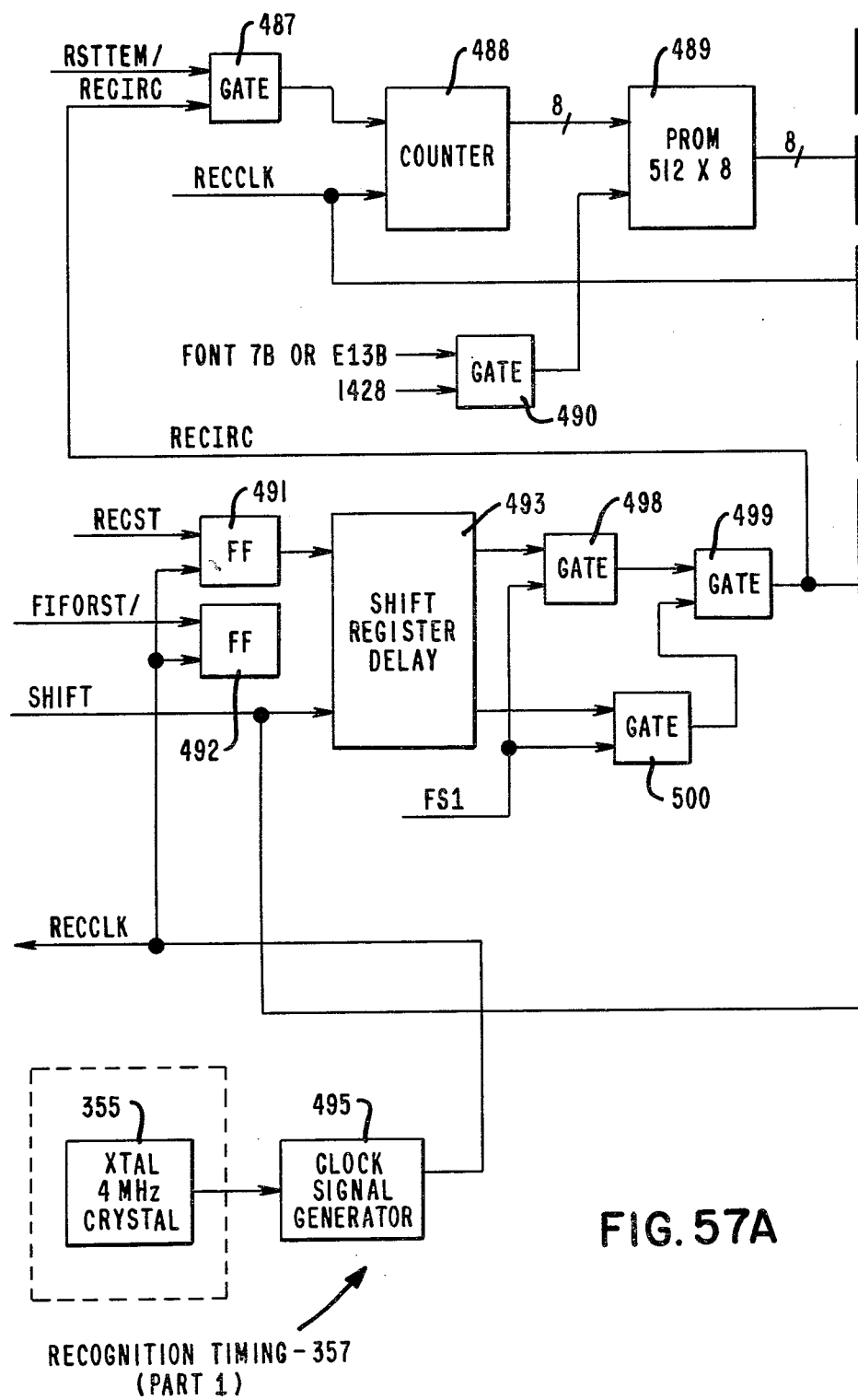
FIGS. 57A, 57B and 57C together comprise the Recognition Timing block.
Figure 57B:
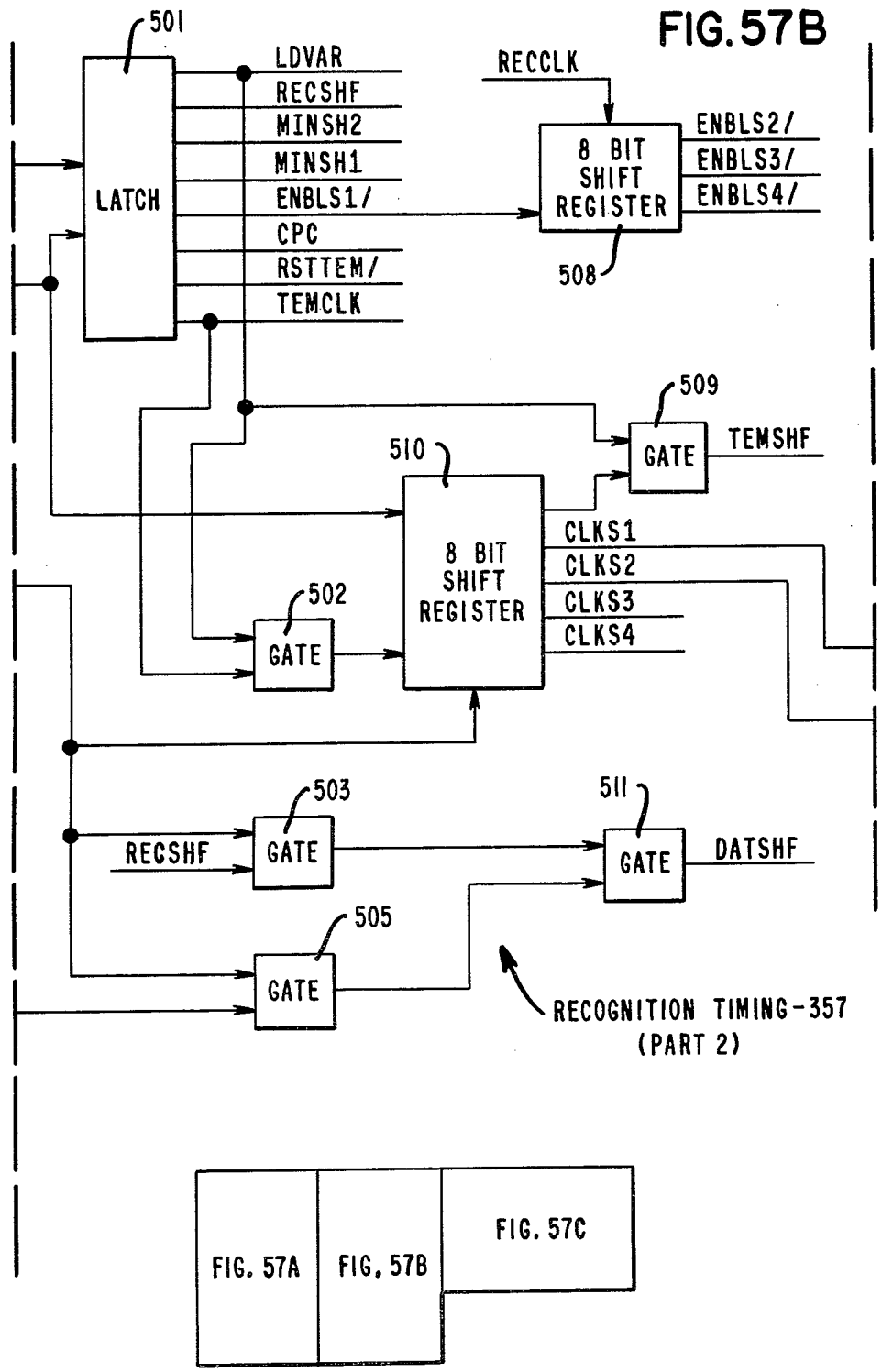
Figure 57C:
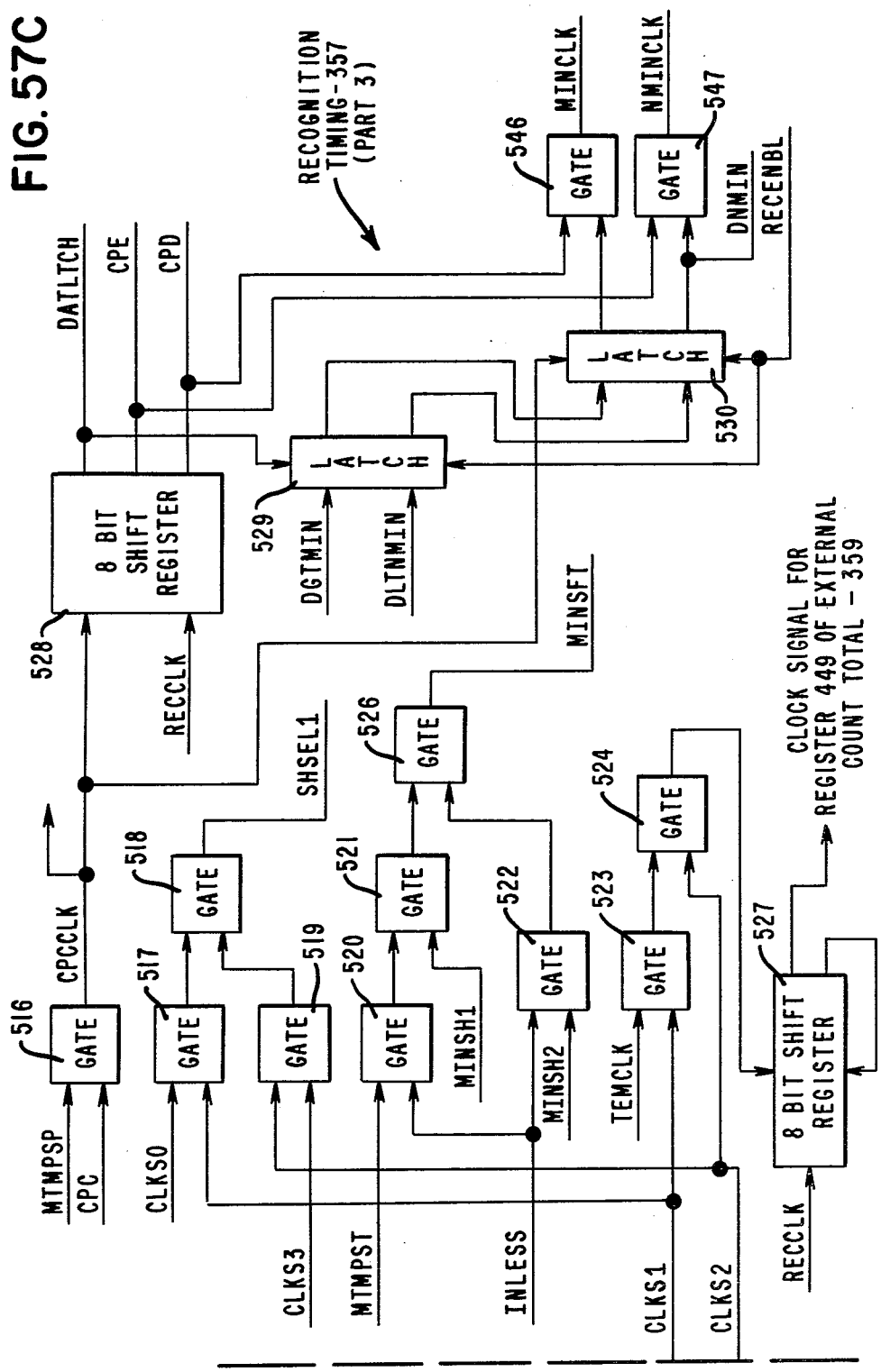
Figure 58A:
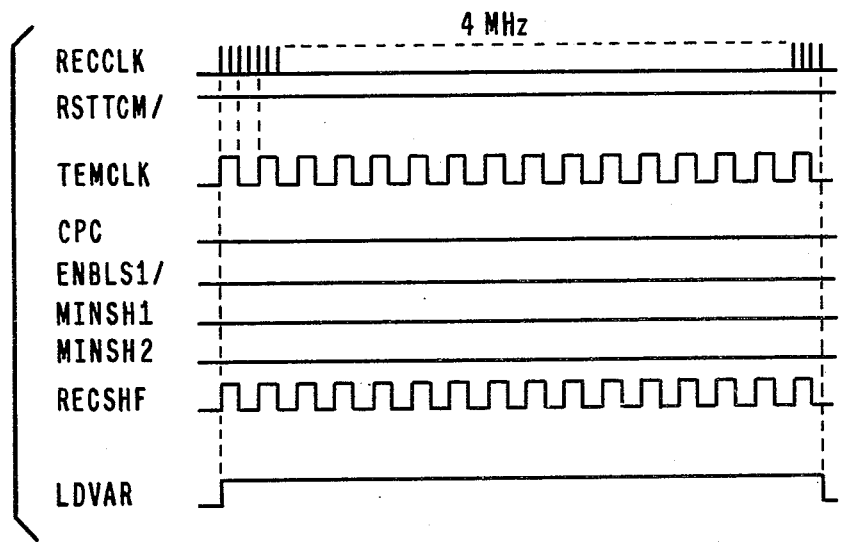
FIGS. 58A and 58B schematically represent a sequence of signals from the Recognition Timing block.
Figure 58B:
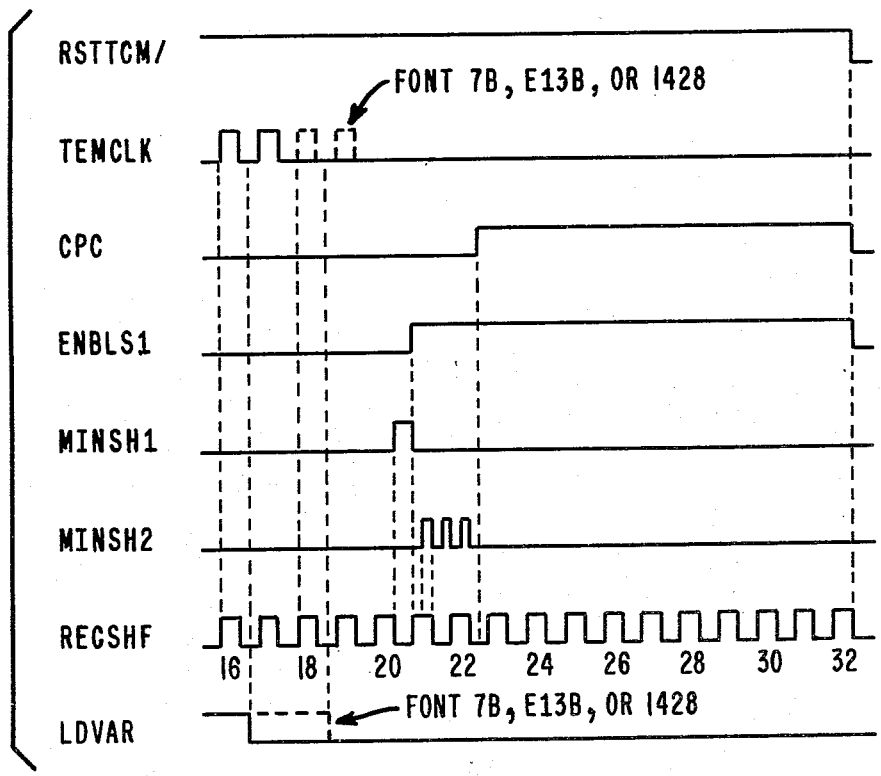

To understand the operation of the circuits schematically illustrated in FIGS. 51-59, one should consider the overall description presented hereinbefore in conjunction with the Recognition board timing diagrams schematically depicted in FIGS. 58A and 58B.

Figure 51:
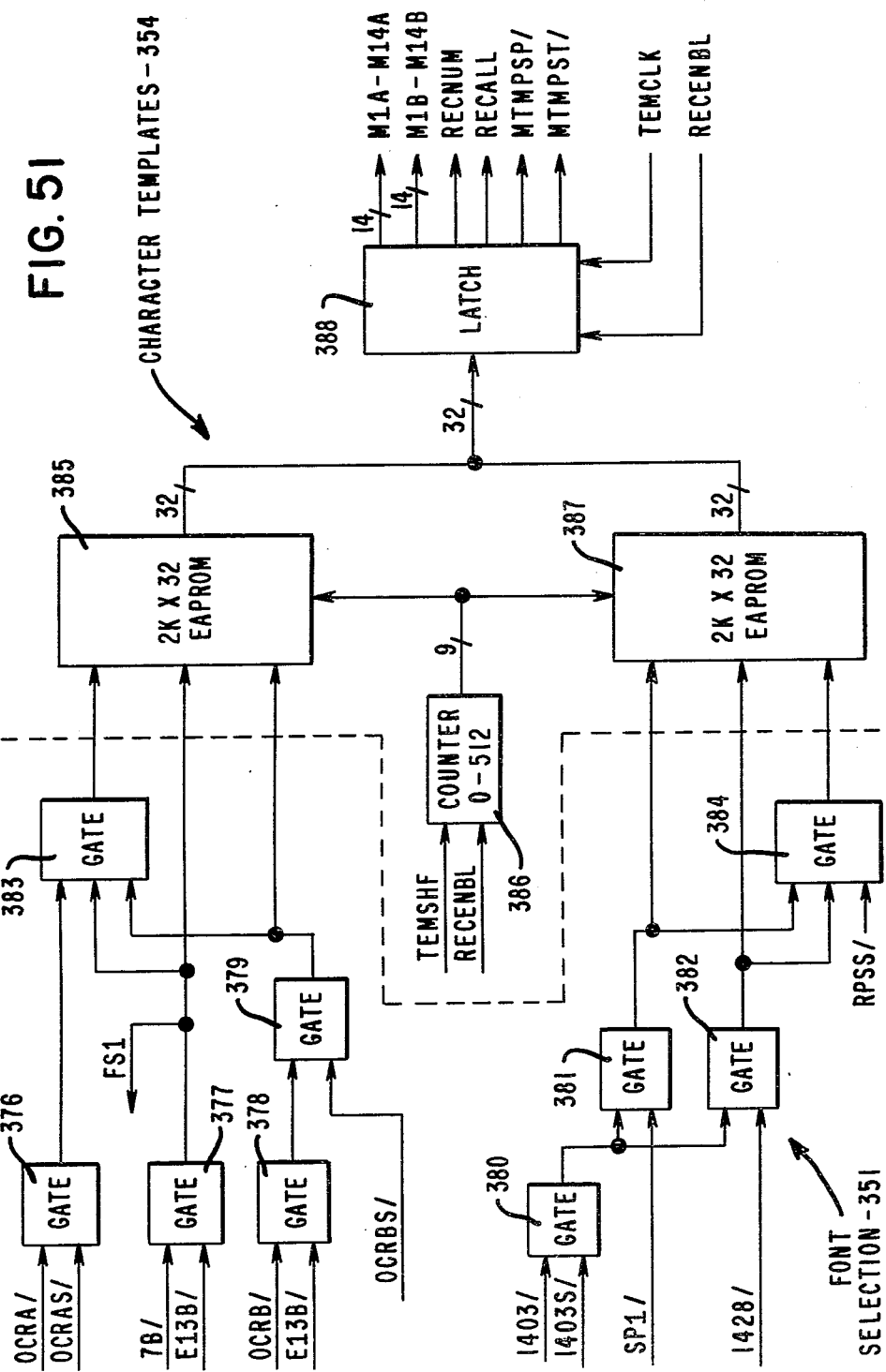
FIG. 51 is a schematic block diagram of the Font Selection block and the Character Templates block.

Begin the analysis of the circuits embodying the feature of the Recognition board with FIG. 51. The schematic in FIG. 51 embodies the functions ascribed to Font Selection block 351 and Character Templates block 354 in FIG. 50A. The fonts selected by the operator are applied in groups to a multitude of AND gates. The letter "S" added at the end of a font represents a signal generated during a latch of the RPS mode. Gates 376, 377, 378 and 379 establish a 2 bit address code which is completed by counter 386 in addressing 4 individual template blocks of 512 data bits in electrically alterable programmable read only memory (EAPROM) 385. Gates 380, 381 and 382 similarly generate the 2 bits for addressing 4 template blocks in EAPROM 387. Gates 383 and 384 enable their respective EAPROMs alternately. EAPROMs 385 and 387 are tri-state devices. Counter 386 is clocked by the TEMSHF signal and reset by RECENBL. Latch 388 couples the appropriate template data to the next functional block, Data to Template Comparator 356 (FIG. 50A). The TEMCLK signal clocks latch 388 while RECENBL resets it.

Figure 52:
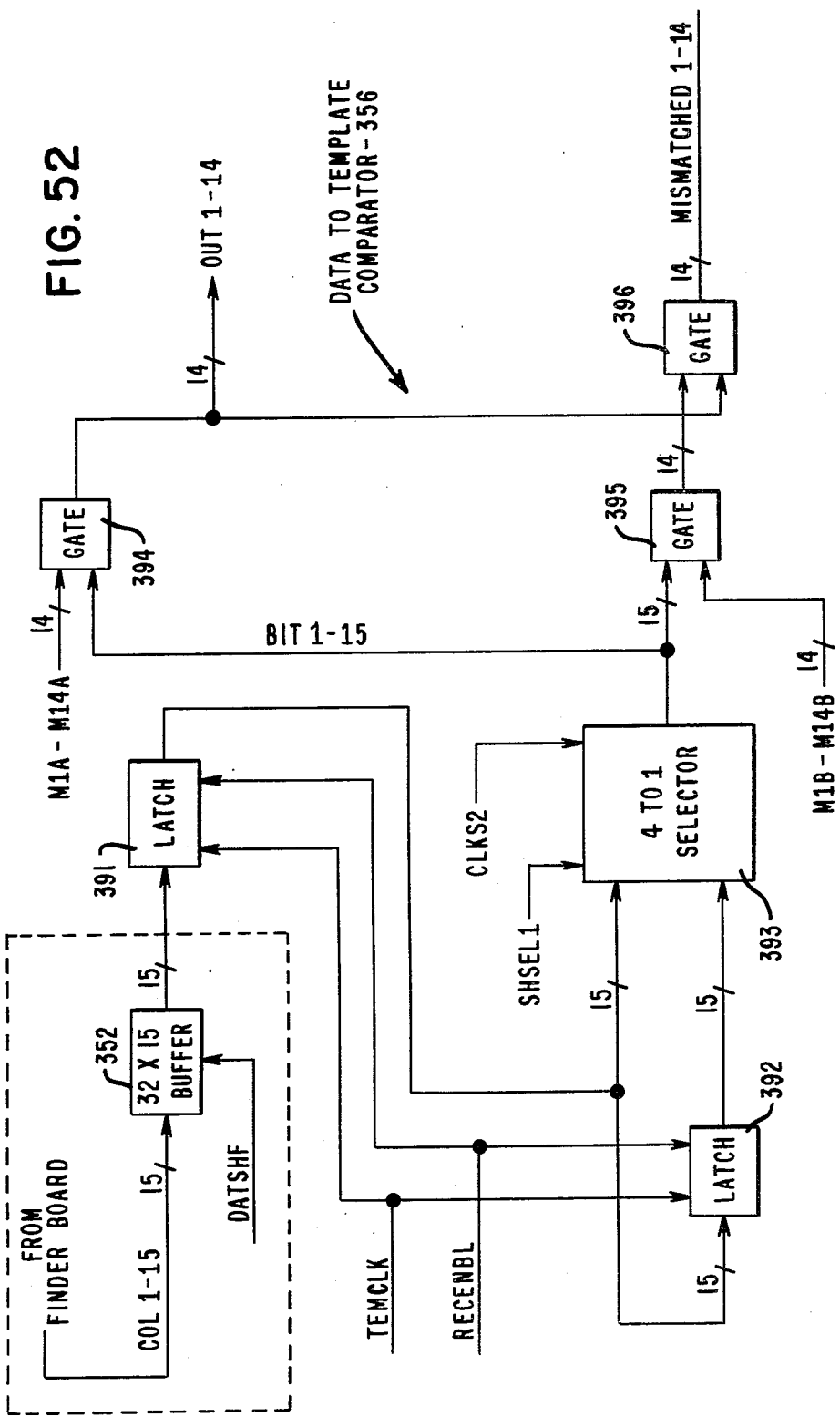
FIG. 52 is a schematic block diagram of the Character Buffer block and the Data to Template Comparator block.

Attention is now directed to FIG. 52, depicting the devices forming Character Buffer 352 and Data to Template Comparator 356 (FIG. 50A). The 15 columns of data representing a character are stored in buffer 352, then sequentially transferred through latches 391 and 392. Because both latches are clocked by TEMCLK, the data from latch 392 is shifted one row from the data in latch 391.

Selector 393 sequentially samples rows of data lines as the data is shifted through latches 391 and 392, thereby introducing the shift described with relation to FIG. 48, on a row basis. The character data rows, bit 1–15, and template data rows, M1A–M14A and M1B–M14B, are then compared in gates 394, 395 and 396. The bits of data on the 14 output lines from gate 394 represent mismatches occurring in the area outside the character template, while the bits from gate 396 represent the mismatches occurring inside the template.

Figure 53:
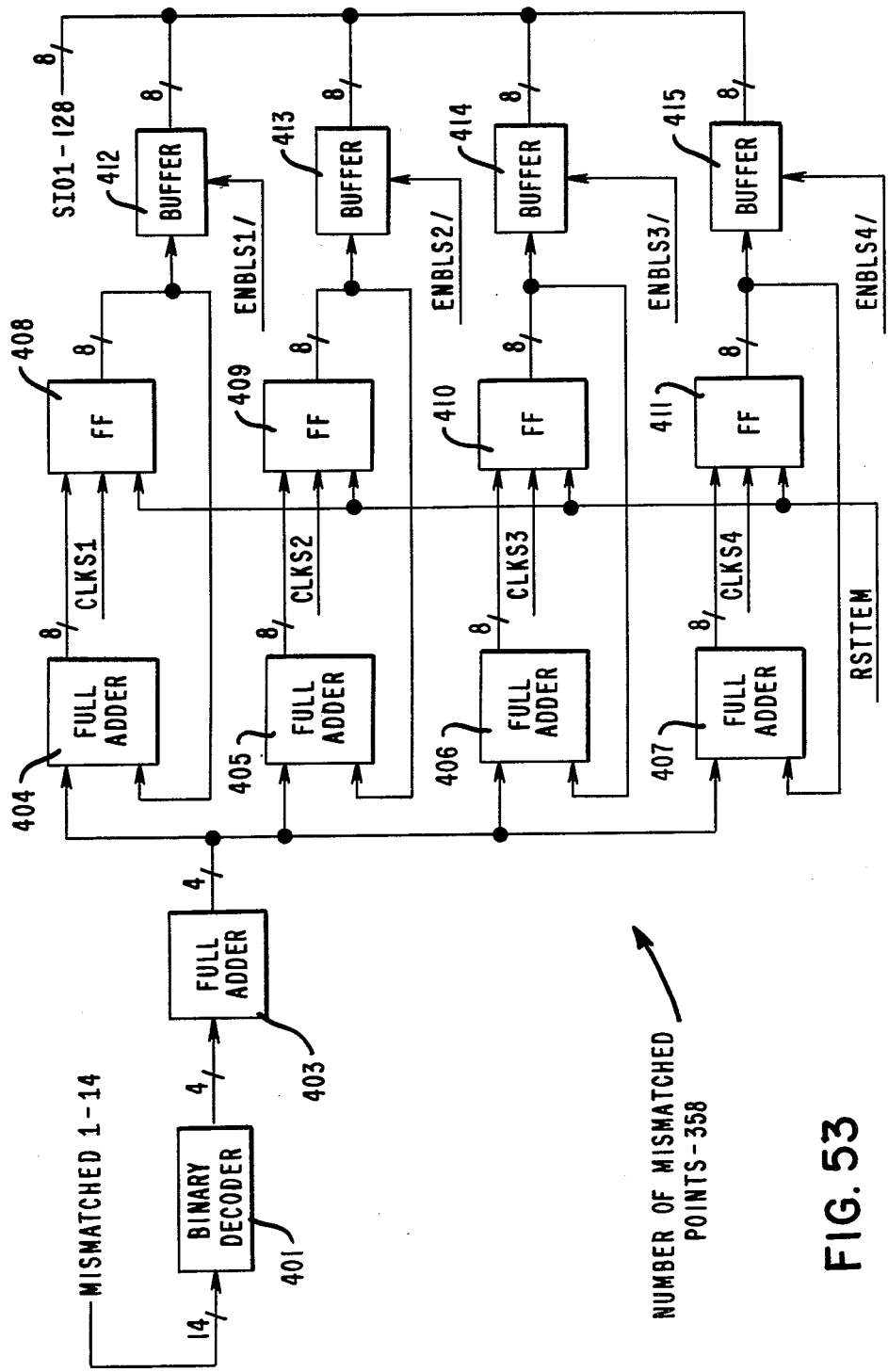
FIG. 53 is a schematic block diagram of the Number of Mismatched Points block.

The bits representing mismatches within the templeate, MISMATCHED 1–14, are coupled to Number of Mismatched Points block 358 (FIG. 50A). As shown in FIG. 53, the mismatch bits are decoded in block 401, summed in block 403 and applied to 4 counters which are enabled and clocked in a prescribed sequence. The output from adder 403 represents the sum of the mismatches for one row, while the outputs from buffers 412, 413, 414 and 415 represent the total mismatch count for all rows in each of the respective four shift positions. Each adder and FF pair, such as 404 and 408, sequentially sums the old count with the new input using a feedback loop. Since buffers 412-415 are tri-state devices, the output for all shift positions is coupled out on a single set of 8 lines.

Figure 54A:
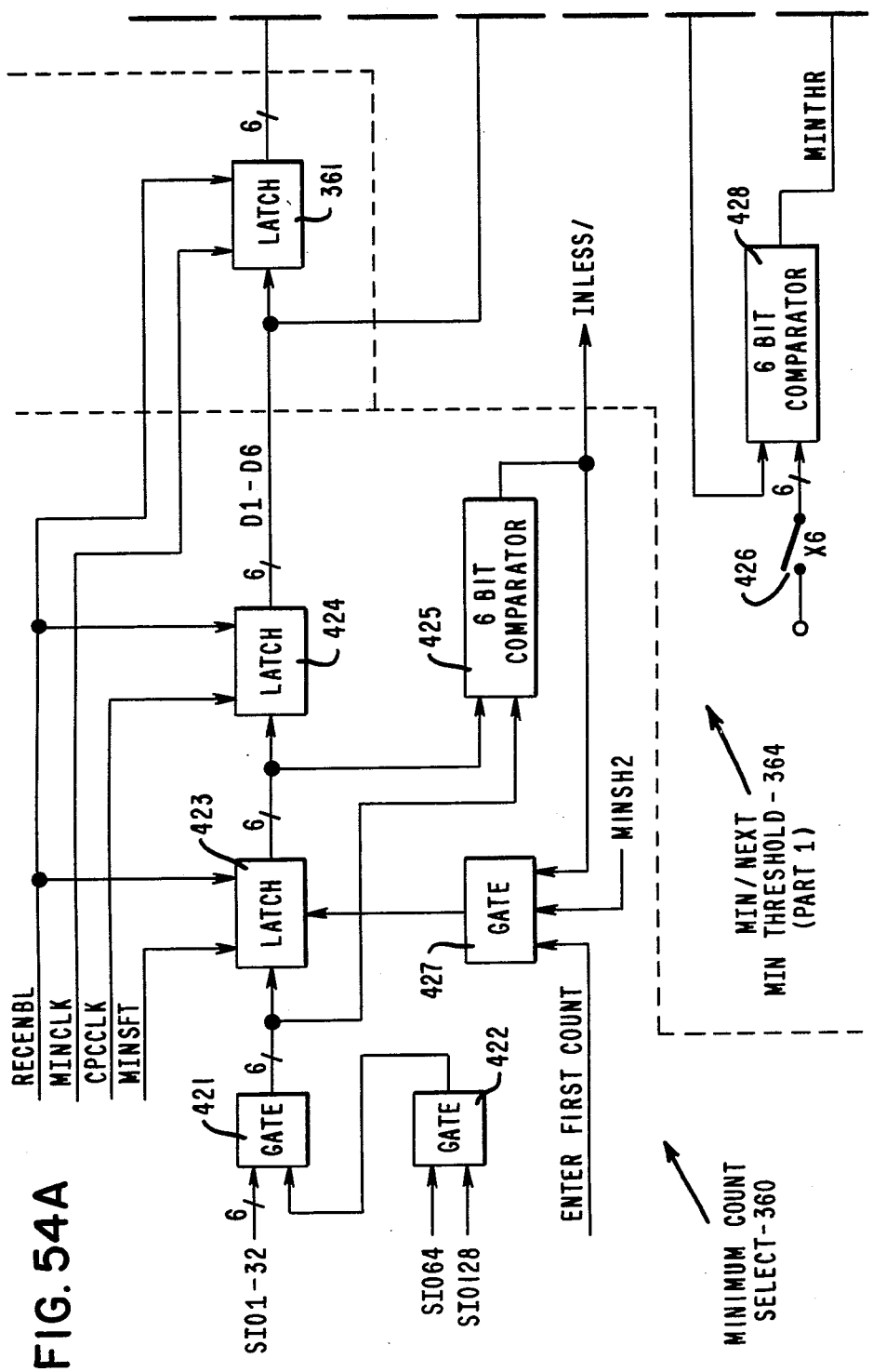
FIGS. 54A and 54B together comprise a schematic block diagram of the Minimum Count Select block, the Minimum Count Latch block, the Next Minimum Count Latch block, the Template Count Comparator, and the Minimum/Next Minimum Threshold block.
Figure 54B:
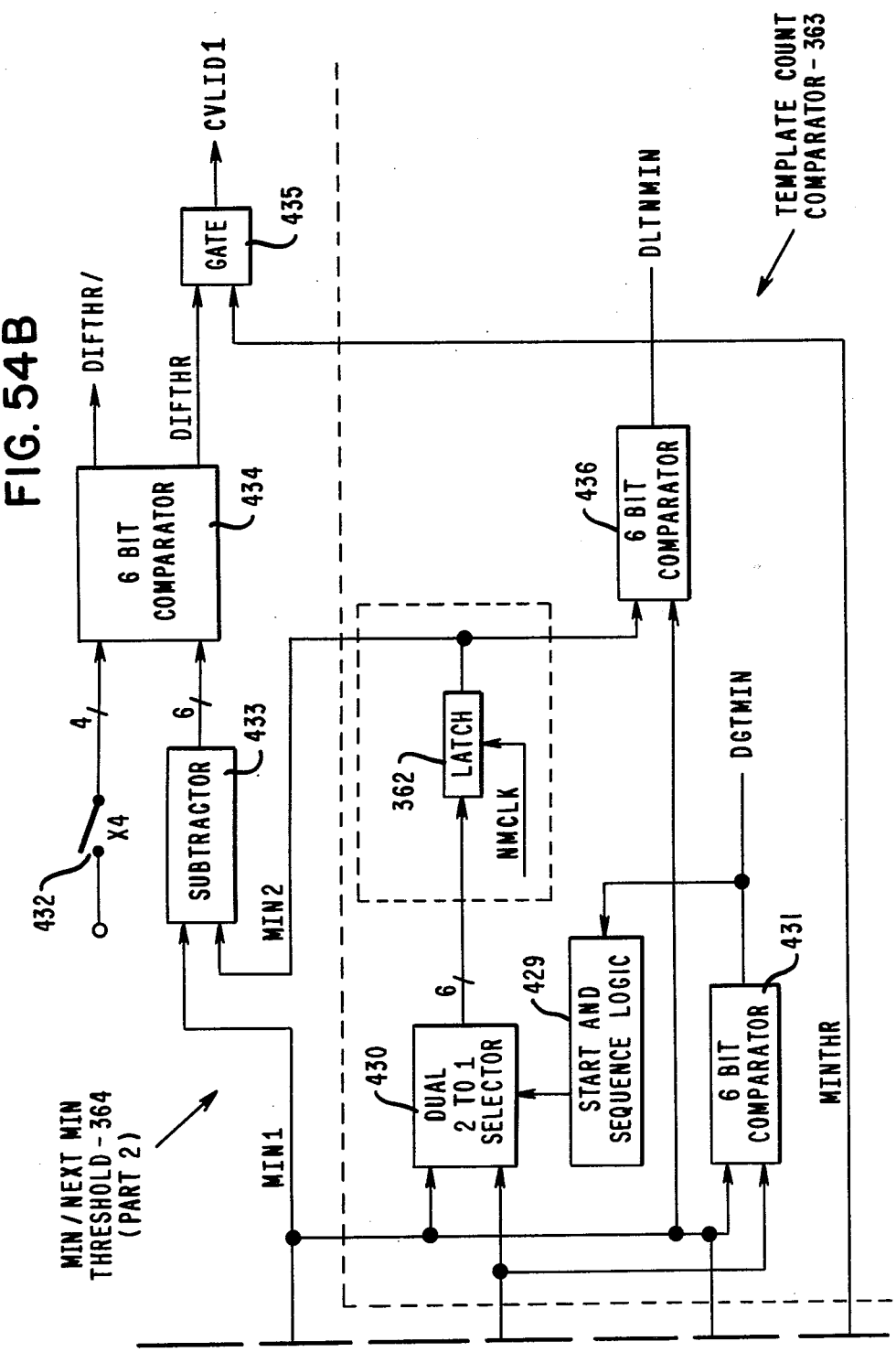

The circuit embodiments in FIGS. 54A and 54B include a number of operations performed by various functional blocks in FIGS. 50A and 50B. These circuits perform the MIN Count Select of block 360, the MIN Count Latch of block 361, the Next MIN Count Latch of block 362, the Template Count Comparator of block 363, and the MIN/Next MIN Threshold of block 364.

Referring to FIG. 54A, gates 421 and 422 receive 8 lines representing the binary count of the mismatch data from buffers 412-415 (FIG. 53) and reduce it to a maximum count of 63 on 6 lines. Namely, if the count is less than 63 it remains unchanged. On the other hand, if it exceeds 63 it is fixed as 63. Latch 423 stores the first count and successive lesser counts based on comparisons of the count data performed in comparator 425. Gate 427 ensures the clocked input of the first count. Latch 424 then stores the minimum count of the 4 shift positions for each template.

The minimum mismatch count (MIN 1) for all templates is sequentially entered and stored in Minimum Count Latch 361. The next minimum mismatch count (MIN 2) for all templates is sequentially entered and stored in latch 362. Note the continuity of the lines joining FIGS. 54A and 54B. The selection of MIN 2 is performed by selector 430, operating in conjunction with comparator 431 and logic 429. The logic gate senses the transfer sequence of data to delay entry of data into latch 362 until a template has been entered into latch 361. MIN 1 and MIN 2 are compared in block 436 to generate the DLTNMIN signal.

Comparator 428 compares the MIN 1 with the value prescribed in threshold switch 426 to ensure that the MIN 1 is less than the selected mismatch threshold of 44. Comparator 434 performs an analogous function in the evaluation of the next threshold, the difference between MIN 1 and MIN 2. Switch 432 establishes the greater than 5 threshold, while subtractor 433 takes the count difference between MIN 1 and MIN 2. When both conditions are satisfied, a CVLID1 signal is generated by gate 435.

External Count Total block 359 (FIG. 50A) and succeeding block 365 (FIG. 50B) impose another pair of requirements, which under limited conditions can override the absence of a CVLID1 signal. Block 359 and 365 evaluate the number of data mismatches for the areas outside the black pattern in the template of each character. The outside areas generally constitute the white areas of the template. The mismatch count for the outside area is retained for the characters corresponding to MIN 1 and MIN 2. The mismatch counts for the two characters are summed for all 4 shift positions, and the sums are designated as MIN 3 and MIN 4, for the MIN 1 and MIN 2 characters respectively. The absence of a CVLID1 signal from block 364 (FIG. 50B) is overridden by the signal from block 365 (FIG. 50B) when all four of the following conditions are satisfied:

Condition (1)—MIN 1 is less than 44.
Condition (2)—MIN 2 minus MIN 1 is less than 5.
Condition (3)—MIN 3 is less than 24.
Condition (4)—MIN 4 is greater than 24.

Figure 55:
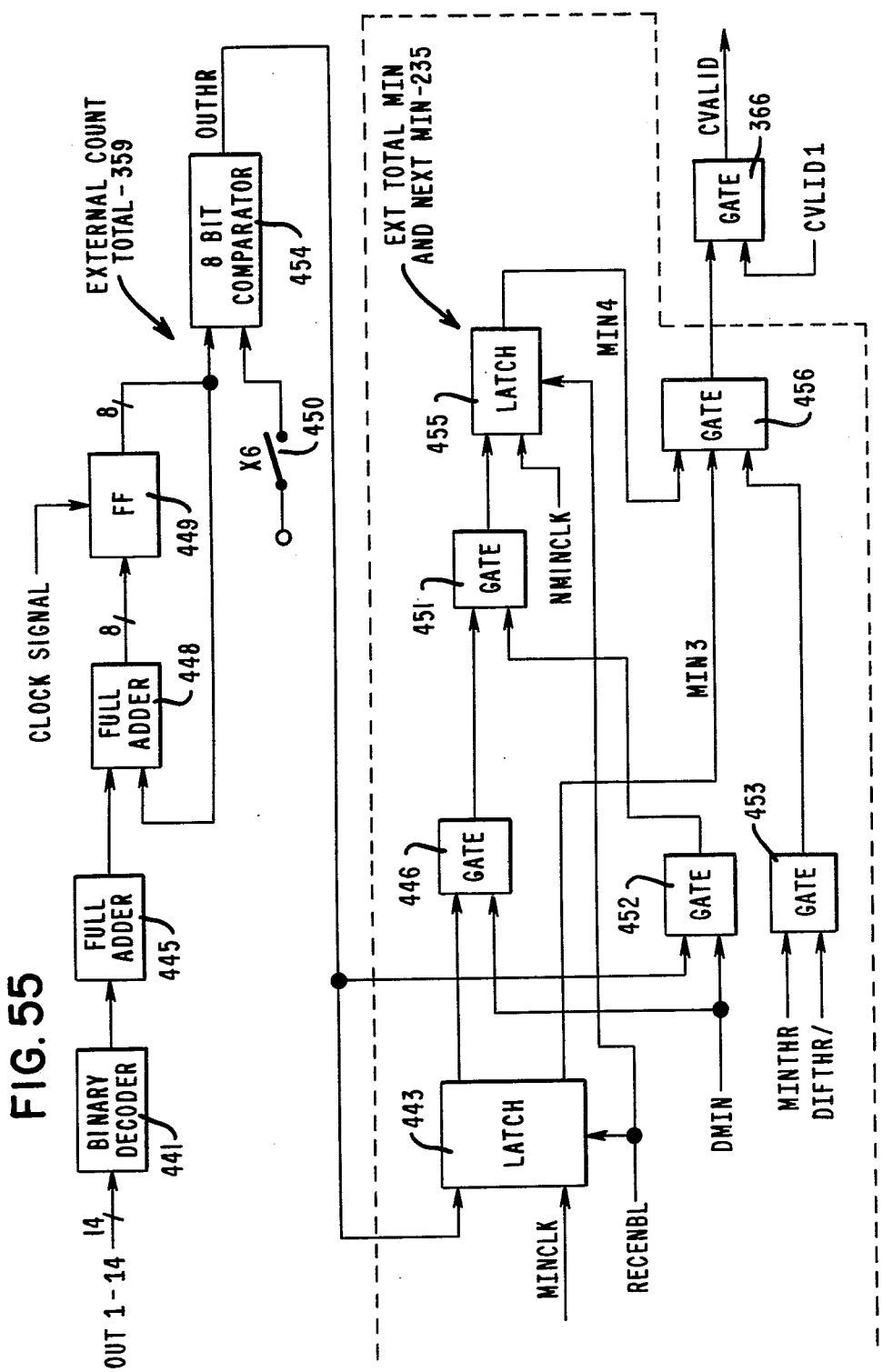
FIG. 55 is a schematic block diagram of the External Count Total block, the External Total Min. and Next Min. block, and the CVALID block.

Referring to the embodiment in FIG. 55, decoder 441 receives 14 lines of data from Data to Template Comparator 356 (FIG. 52), sums it by row in adder 445 and then further sums that data using adder 448 and FF449. Adder 448 and FF449 sum the old count with the new data using a feedback loop. The sum of the outside area bits is compared in block 454 with the number 24 generated by switch 450.

External Total MIN & Next MIN block 365 (FIG. 50B) is developed in the lower segment of FIG. 55. Gate 453 verifies that the MINTHR and DIFTHR/ conditions have been satisfied. Namely, that MIN1 is less than 44 and MIN2-MIN1 is less than 5. The output from gate 453 is combined in gate 456 with signals representing the satisfaction of the count totals for MIN 3 and MIN 4. Latch 443 holds the MIN 3 count using MINCLK as the clock, while latch 455 holds the MIN 4 count using the clock signal NMINCLK. DMIN in combination with gates 446, 451 and 452 ensure that latch 455 receives the correct MIN 4 value. The DMIN signal appears when the current MIN 1 value is to be updated, corresponding to when a new count is to be entered into Minimum Count Latch 361 (FIG. 50B).

Gate 366 in FIGS. 50B and 55 allows the override of CVLID1 when the special outside conditions have been satisfied. The signal generated by gate 366, CVALID, indicates that a character has been matched to a template and thereby recognized.

Figure 56A:
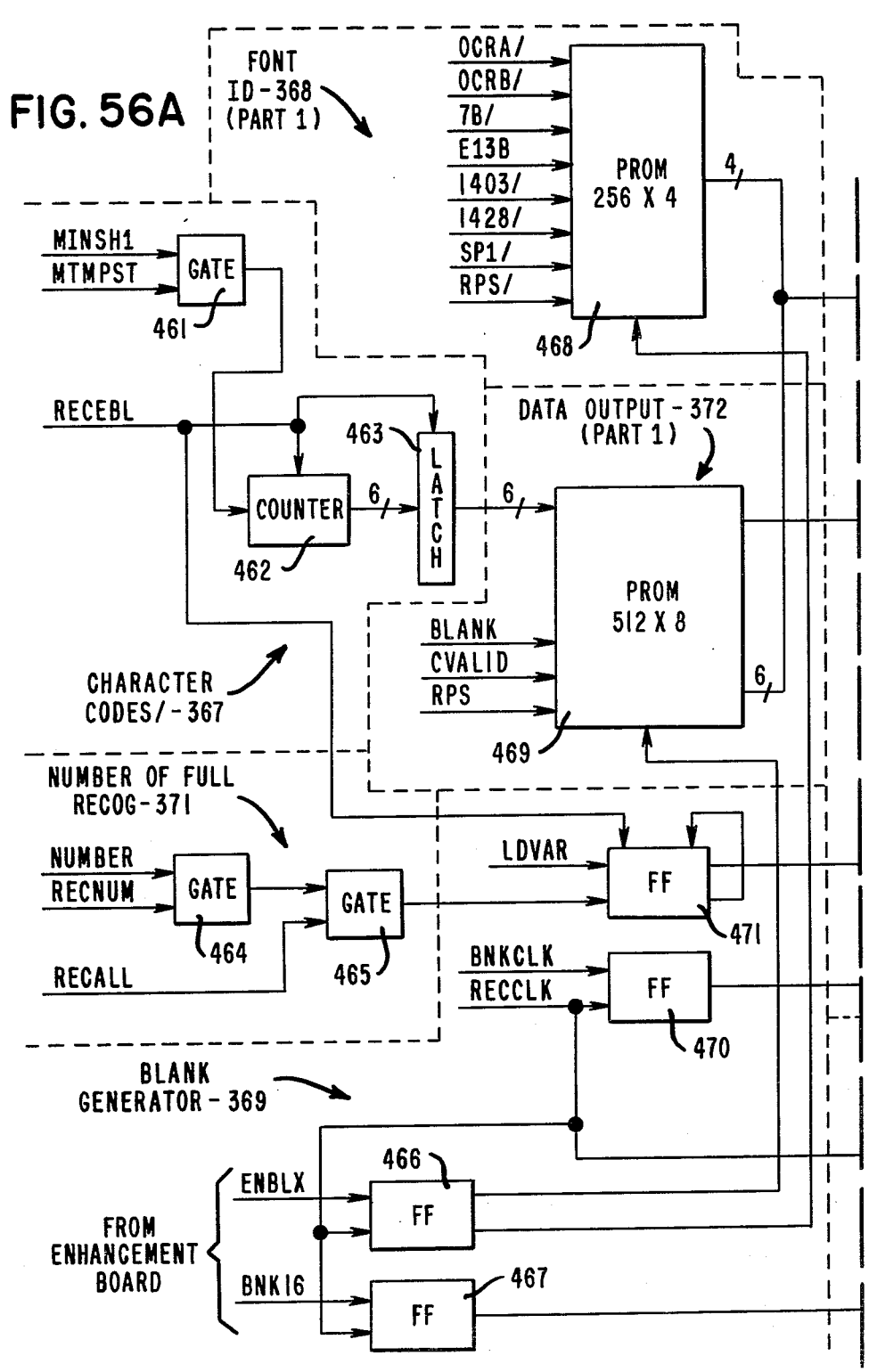
FIGS. 56A and 56B together comprise a schematic block diagram of the Number or Full Recognition block, the Character Codes/ block, the Font ID block, the Blank Generator block and the Data Output block.
Figure 56B:
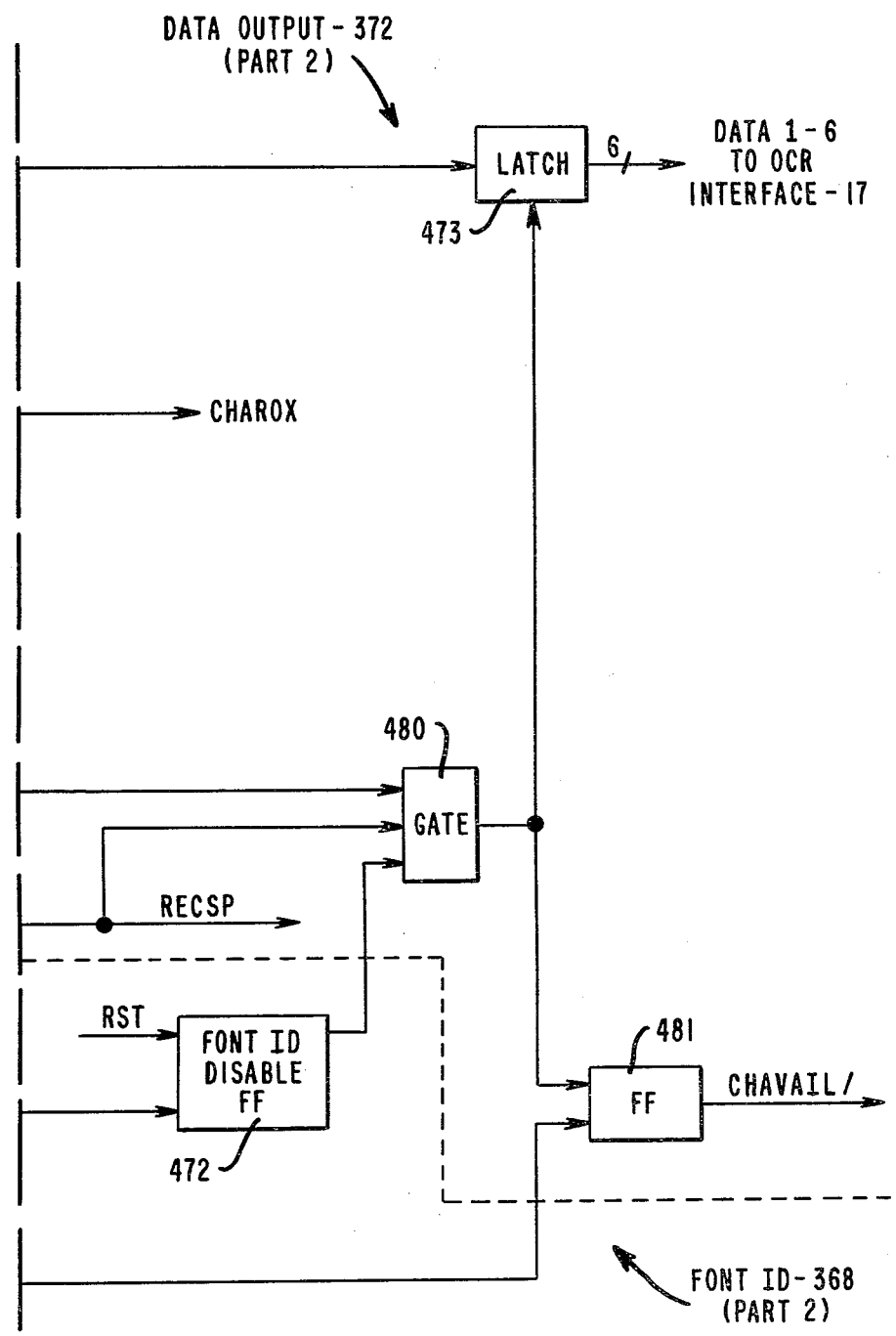

The functions performed by the devices shown in FIGS. 56A and 56B are comparatively diverse, as further indicated by considering FIG. 50B. Begin the consideration with block 367 (FIG. 50B), entitled Character Codes/. Counter 462 is incremented each time shift signal MINSH1 and signal MTMPST appear together at gate 461. The count, representing template addresses, is latched into block 463. The RECEBL signal actuates latch 463 and resets counter 462.

Font ID block 368 in FIG. 50B is divided into parts 1 and 2 in FIG. 56A. Part 1 is comprised of PROM 468, which generates a font ID code when appropriately enabled by FF466. In this manner of utilization, OCR Interface board 17 receives a code representing the selected font as the first of the character data transmitted. Part 2 of block 368, generally shown as font ID disable FF472 (FIG. 56B), removes the font code when required by OCR Interface board 17. The RST signal resets FF472.

Blank Generator block 369 in FIG. 50B also appears in the circuit schematic of FIG. 56A. FF466 is switched when clock signal RECCLK and the document sensing signal ENBLX coincide. FF467 is used in conjunction with FF481 (FIG. 56B) to generate the clock signal CHAVAIL/, which serves as a data transfer synchronization signal for OCR Interface Board 17. FF470 and FF471 are used to signal the end of the recognition process. Gate 480 activates latch 473 and the data transfer signal CHAVAIL/ generated by FF481.

Number or Full Recognition block 371 in FIG. 50B and 56A receives a NUMBER signal from Control box 14 (FIG. 1) when characters other than numbers are to be ignored. RECNUM and RECALL are signals generated in Character Templates block 354 (FIG. 50A) as indicators of template addresses. The RECNUM signal forces the recognition of only numeric characters (0 to 9), while the RECALL signal initiates recognition of both numeric and special symbol characters.

Data Output block 372 in FIG. 50B is also shown in two parts. Part 1 consists of PROM 469 in FIG. 56A. The 4 output lines from PROM 468 represent font ID codes. The outputs of PROM 469 include 6 lines of character codes and a CHAROK signal to indicate the recognition of a valid character. Because PROMs 468 and 469 are tri-state devices, and are operated in the alternative, latch 473 receives data from only one PROM. The six lines of data leaving latch 473 of Data Output block 372 (FIG. 50B) are coupled to OCR Interface board 17 for transmitting codes representing the characters recognized.

Recognition Timing block 357 in FIG. 50A is developed in the circuit schematics of FIGS. 57A, 57B and 57C. Note the presence of a separate 4 MHz crystal, 355, for establishing the separate clock frequencies used on Recognition board 16. One should also make reference to the timing diagrams in FIGS. 58A and 58B to aid in the understanding of the various timing operations and their sequence.

It was previously described that the size of the window varied with the font being processed. The timing signals are similarly affected. Namely, the recognition clock signals used for fonts 7B, E13B and 1428 differ from those used when processing characters of other fonts.

Begin the analysis of Recognition Timing block 357 (FIG. 50A) with the segments designated parts 1 and 2, respectively corresponding to FIGS. 57A and 57B. Crystal 355 and clock signal generator 495 create the basic 4 MHz clock signal used throughout the Recognition board. The signal is designated RECCLK. RECCLK is coupled into counter 488 to generate a sequence of addresses for PROM 489. The outputs from PROM 489 are clocked into latch 501 for external coupling. The timing sequence is reset with template counter set signal RSTTEM/, while the timing variations needed for font 7B, E13B and 1428 are introduced as address changes to PROM 489 by gate 490.

Synchronization of the recognition timing with that of the other boards in the OCR Reader System is introduced into gate 487 and counter 488 through FF491, FF492, shift register delay 493, gate 498, gate 499, and gate 500. The synchronization signals utilized include RECST, FIFORST/, SHIFT and FS1. The respective contributions will undoubtedly be recognized upon considering the sources of these signals and the recognition timing signals shown in FIGS. 58A and 58B.

Part 2 of Recognition Timing block 357 develops the devices used to generate the clock signals, CLK1-CLK4, for the shift sequence. Recall the 4 shifts of the template data matrix when it was compared to the character data matrix. In particular, shift register 510 in FIG. 57B is clocked by RECCLK when appropriately signalled by gate 502. The enable sequence ENBLS2/-ENBLS4/ is similarly generated using RECCLK and a timing signal from latch 501. The contribution of the remaining gates, 503, 505, 511 and 509, is readily perceived from their organization and input signals.

Part 3 of Recognition Timing block 357 is shown in FIG. 57C. Gate 516 generates the CPCCLK signal used to clock in the minimum count of 4 shifts by the circuit in FIG. 54A. In addition, the CPCCLK signal is used as an enable signal for shift register 528. When the CPCCLK signal is present, RECCLK shifts register 528 to generate 3 additional clock signals. The first of the 3 signals is DATLTCH, which is used to latch the DLTNMIN and DGTMIN signals from comparators 436 and 431 into latches 529 and 530, respectively, once for each character template. The MINCLK and NMINCLK signals are generated by gates 546 and 547 when the CPE and CPD signals coincide with DGTMIN and DLTNMIN from latch 530. Recall that the MINCLK signal latches the overall minimum count, NMINCLK latches the next overall minimum count, and DNMIN is used to determine whether the next overall minimum count latched in block 362 should come from block 424 or block 361.

The combination of gates 517, 518 and 519 are used to generate SHSEL1, the multiplex timing used in FIG. 52. Gates 520, 521, 522 and 526 are joined in the manner depicted to generate the MINSFT signal. The MINSFT signal constitutes the clock by which each of the 4 minimum counts for each of the templates is entered as shown in FIG. 54A. The remaining elements in part 3 of the Recognition Timing block consist of gate 523, gate 524 and shift register 527. The output signal from shift register 527 is applied as a clock signal to register 449 in FIG. 55.

FIGS. 58A and 58B schematically depict a set of waveforms embodying the timing used in present Recognition board. The 4 MHz master clock signal, RECCLK, is shown at the top of FIG. 58A, but has been deleted from the continuation appearing in FIG. 58B. Generally, the waveforms in FIG. 58A represent the timing for approximately one-half the recognition cycle for a single template. During this period, the templates are sequentially incremented and the differences between template data and character data are determined and evaluated. FIG. 58B represents the waveform for the second half of recognition timing for the above-noted template, during which the values for MIN 1, MIN 2, and MIN1-MIN2 are determined. The adjustments for fonts 7B, E13B and 1428, noted previously, are illustrated by dashed lines in the plots.

The final functional block on Recognition board 16 is RPS Circuit 353. The circuit is developed in FIG. 59. Briefly, recall that the RPS mode of the OCR Reader System initiates a search of the first 2.5 centimeters of the document for one of 3 special RPS symbols. When any one is recognized, the font corresponding to that symbol is latched into the system. Refer to Table II. When the system fails to either find or recognize such a character within the designated area, the system defaults to the font selected for field 2 in Control box 14 (FIG. 1).

Figure 59:
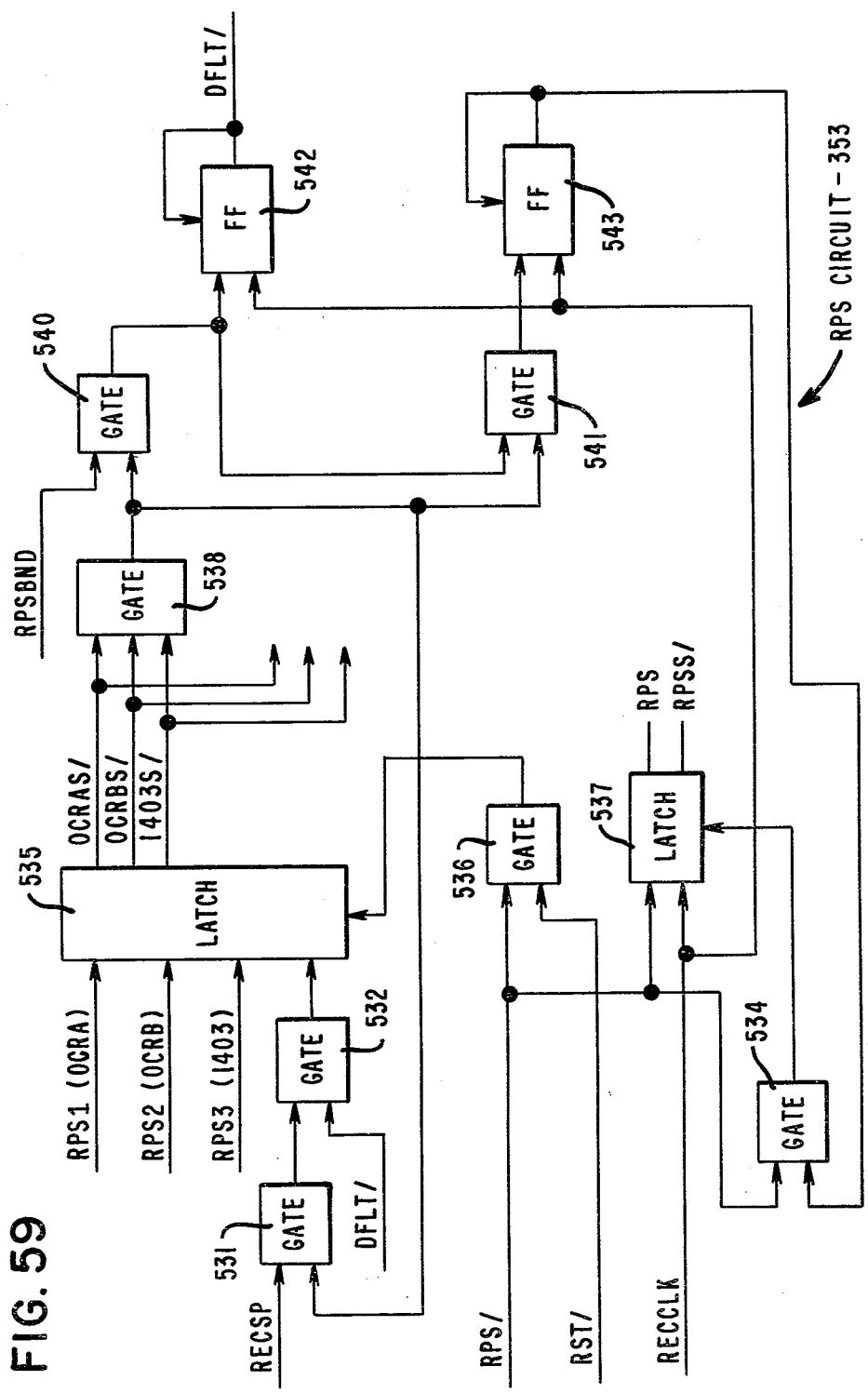
FIG. 59 is a schematic block diagram of the RPS Circuit.

The signal RECSP coupled to gate 351 in FIG. 59 indicates the end of the recognition process and latches data representing the character font recognized into block 535. A clocked default signal, DFLT, is generated by FF542 if gate 540 detects no font data at gate 538 and the RPSBND signal indicates the lapse of the 2.5 cm. Thereafter, the DFLT/ signal disables latch 535 through gate 532. Gate 536 resets latch 535 at the beginning of each document. Latch 537 holds the RPS signal until an RPS symbol is recognized or a default occurs. In either case, gate 541 switches FF543 actuating gate 534 to reset latch 537.

Figure 60:
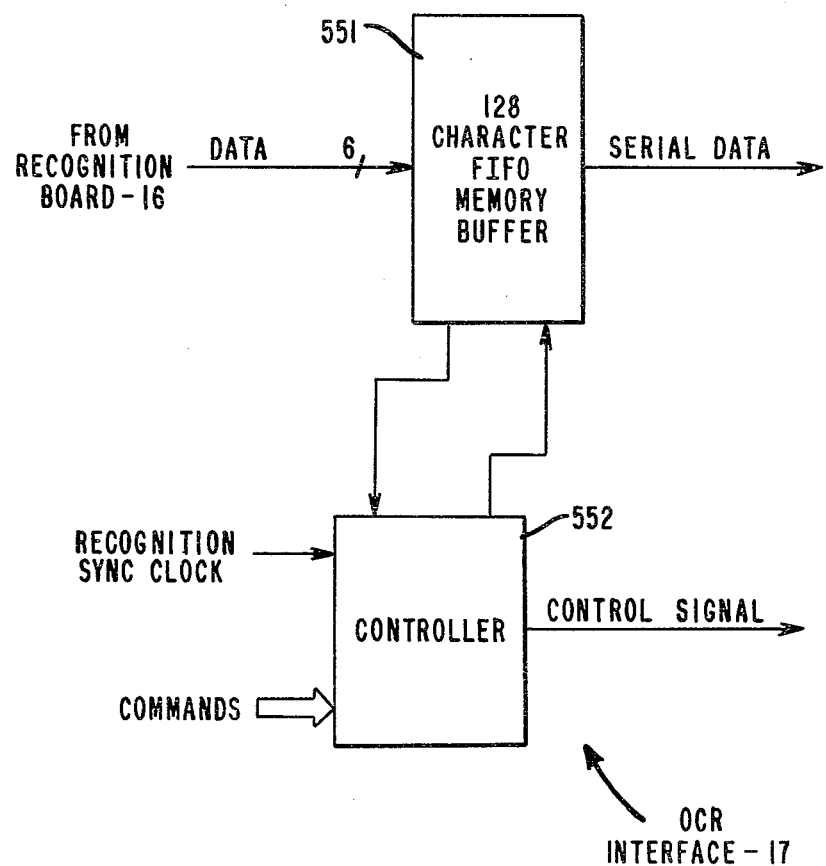
FIG. 60 is a schematic block diagram of the OCR Interface board.

Referring back to the general block diagram of FIG. 1, it is shown that the character data from Recognition board 16 is coupled to OCR Interface board 17. This is accomplished in the manner generally depicted in FIG. 60. Namely, the six lines of data representing the character found and recognized are coupled from latch 473 in FIG. 56B to FIFO memory buffer 551 of the OCR Interface block. As shown in FIG. 60, the character data leaving buffer 551 is transmitted serially.

Controller 552 on the OCR Interface board receives recognition synchronization clock signals and various other commands to control the entry and release of buffered data. Typical functions performed by controller 552 include the decoding of input commands, the resetting of operations from document to document, the sequencing of the data coupled into and out of buffer 551, the monitoring of the buffer for overflow conditions, and the synchronization of the various operations to interface the OCR Reader System with the next stage of equipment. Given the extensive description of the operations performed by the preceding boards, the comparatively rudimentary operations performed on OCR Interface board 17, and its secondary relationship to the fundamental invention, no further development is warranted.

At this point, one undoubtedly recognizes the essential features which characterize the present invention, as well as the complexity of implementing the features into an operable embodiment. In view of the numerous variations by which the features may be practiced, it should be recognized that the scope and spirit of the presently claimed invention fully encompasses such variation of the embodiment.

We claim:

1. An optical character recognition reader system, comprising:
   means for optically capturing contrast data representing a character pattern on a document operated in a time sequence corresponding to a scan of the document;
   means for generating at least two sets of data for each pattern of a character, which sets are distinguishable by the contrast level represented;
   means for enhancing the contrast of a character pattern represented by said captured data, by analyzing the data representing adjacent elements and changing the data on the basis of data representing adjacent elements;
   means for analyzing groupings of data in a window to establish the presence of a character pattern within the window; and
   means for comparing the data within the window with data representing templates of character patterns to establish a substantial match.

2. The system recited in claim 1, wherein said means for comparing the data within the window with data representing templates of character patterns to establish a substantial match comprises:
   means for positioning the data representing templates with respect to the data within the window;
   means for comparing the data representing templates with the data within the window for mismatches while successively shifting the relative positions of the template and window data; and
   means for counting the number of data mismatches at each shift position.

3. The systems recited in claim 2, wherein said means for enhancing the contrast of the character pattern represented by said captured data comprises:
   means for selectively eliminating data from the first set of data when the data in the first and second sets establishes a prescribed arrangement of the data representing adjacent elements in the pattern.

4. The system recited in claim 3, wherein said means for generating at least two sets of data for each pattern of a character generates a first set corresponding to gray contrast level character patterns and a second set corresponding to black contrast level character patterns, and said means for selectively eliminating data from the first set of data converts gray contrast data to black or white data on the basis of a prescribed arrangement of the gray and black contrast data in the adjacent elements of the pattern.

5. The system recited in claim 4, wherein said means for analyzing groupings of data in a window comprises, a logic block for simultaneously evaluating a multiplicity of conditions which, establish the presence of a character pattern within the window, verify the appropriate relative position of the character with respect to the window, and ignore extraneous patterns, before enabling the operation of said means for comparing the data within the window with the data representing templates of character patterns.

6. The systems recited in claims 4 or 5, further including a means for converting black contrast data to white data on the basis of a prescribed arrangement of the black and white contrast data in the adjacent elements of the pattern.

7. The optical character recognition reader systems recited in claims 1, 2, 4, or 5, further comprising:
   means for automatically selecting a font for a character pattern by recognizing a designated symbol.

* * * * *